US009467446B2

(12) United States Patent
Fausak et al.

(10) Patent No.: US 9,467,446 B2
(45) Date of Patent: Oct. 11, 2016

(54) RUNTIME API FRAMEWORK FOR CLIENT-SERVER COMMUNICATION

(71) Applicant: DELL PRODUCTS L.P., Round Rock, TX (US)

(72) Inventors: Andrew T. Fausak, San Jose, CA (US); Oleg Rombakh, San Jose, CA (US)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 14/985,054

(22) Filed: Dec. 30, 2015

(65) Prior Publication Data
US 2016/0112420 A1 Apr. 21, 2016

Related U.S. Application Data

(63) Continuation of application No. 13/918,774, filed on Jun. 14, 2013, now Pat. No. 9,300,669.

(51) Int. Cl.
*H04L 29/06* (2006.01)
*H04L 29/08* (2006.01)

(52) U.S. Cl.
CPC ......... *H04L 63/0884* (2013.01); *H04L 63/029* (2013.01); *H04L 63/0272* (2013.01); *H04L 63/0428* (2013.01); *H04L 63/10* (2013.01); *H04L 63/102* (2013.01); *H04L 67/1004* (2013.01); *H04L 67/2823* (2013.01); *H04L 67/40* (2013.01); *H04L 63/0807* (2013.01); *H04L 67/08* (2013.01)

(58) Field of Classification Search
CPC ............. H04L 63/0884; H04L 63/029; H04L 67/1004; H04L 63/102; H04L 67/2823
See application file for complete search history.

(56) References Cited

U.S. PATENT DOCUMENTS

| 6,078,960 | A  |   | 6/2000  | Ballard |
|-----------|----|---|---------|---------|
| 6,345,300 | B1 | * | 2/2002  | Bakshi ............... H04L 63/029 709/203 |
| 6,374,299 | B1 | * | 4/2002  | Ford .................. H04L 67/16 709/227 |
| 7,337,217 | B2 |   | 2/2008  | Wang ..................... 709/217 |
| 7,415,537 | B1 |   | 8/2008  | Maes ................. 707/999.01 |
| 7,587,499 | B1 |   | 9/2009  | Haghpassand ........... 709/229 |
| 7,596,791 | B2 |   | 9/2009  | Wei et al. ............... 719/316 |
| 7,805,517 | B2 |   | 9/2010  | Shim et al. .............. 709/227 |
| 7,873,734 | B1 |   | 1/2011  | Eidelman et al. .......... 709/227 |
| 8,024,441 | B2 |   | 9/2011  | Kommula et al. |
| 8,438,473 | B2 |   | 5/2013  | Mak et al. .............. 715/234 |
| 8,458,363 | B2 |   | 6/2013  | Rosenblatt et al. ........ 709/248 |
| 8,478,839 | B2 |   | 7/2013  | Mihara .................. 709/217 |
| 8,612,862 | B2 |   | 12/2013 | Mascarenhas et al. ..... 715/738 |
| 8,856,353 | B2 |   | 10/2014 | Moen ..................... 709/227 |

(Continued)

OTHER PUBLICATIONS

Non-Final Office Action issued in US Appl. No. 13/918,780; 60 pages, May 11, 2015.

(Continued)

*Primary Examiner* — Jeffrey Pwu
*Assistant Examiner* — William Corum, Jr.
(74) *Attorney, Agent, or Firm* — Baker Botts L.L.P.

(57) ABSTRACT

In particular embodiments, a method includes receiving, by a computing device including an import/export framework, encoded client data. The client data may be encoded by a generic transcoding service. The method includes performing load-balancing based at least in part on the client data, authorizing the client's access of a remote application, and exporting the encoded client data to the remote application.

18 Claims, 24 Drawing Sheets

(56) References Cited

U.S. PATENT DOCUMENTS

| | | |
|---|---|---|
| 8,935,419 B2 | 1/2015 | Takeshima et al. ........... 709/229 |
| 9,015,310 B2 | 4/2015 | Ochi ............................. 709/224 |
| 9,244,912 B1 | 1/2016 | Kominac et al. |
| 2001/0016881 A1 | 8/2001 | Sanchez et al. ............. 709/328 |
| 2002/0099936 A1 | 7/2002 | Kou et al. ..................... 713/151 |
| 2002/0133597 A1 | 9/2002 | Jhingan et al. ............... 709/228 |
| 2003/0028643 A1 | 2/2003 | Jabri ............................. 709/226 |
| 2003/0051164 A1 | 3/2003 | Patton ........................... 713/201 |
| 2003/0061288 A1 | 3/2003 | Brown et al. ................. 709/206 |
| 2003/0061299 A1 | 3/2003 | Brown et al. ................. 709/214 |
| 2003/0061317 A1 | 3/2003 | Brown et al. ................. 709/221 |
| 2004/0117486 A1 | 6/2004 | Bourne et al. ................ 709/228 |
| 2004/0139212 A1 | 7/2004 | Mukherjee ..................... 709/230 |
| 2004/0141003 A1 | 7/2004 | Nivers et al. ................. 345/745 |
| 2005/0055435 A1 | 3/2005 | Gbadegesin .................. 709/224 |
| 2006/0039388 A1 | 2/2006 | Shur ............................. 370/401 |
| 2006/0101160 A1 | 5/2006 | Coulombe |
| 2006/0140591 A1 | 6/2006 | Estevez et al. |
| 2006/0230105 A1 | 10/2006 | Shappir |
| 2008/0313545 A1 | 12/2008 | Patel |
| 2009/0237728 A1 | 9/2009 | Yamamoto ................... 358/1.15 |
| 2011/0153716 A1 | 6/2011 | Malakapalli |
| 2012/0002814 A1 | 1/2012 | Wei et al. |
| 2012/0102148 A1* | 4/2012 | Arolovitch .............. H04L 12/66 709/217 |
| 2012/0102154 A1 | 4/2012 | Huang et al. |
| 2012/0151369 A1 | 6/2012 | Kominac et al. ............. 715/740 |
| 2012/0151371 A1 | 6/2012 | Kominac et al. ............. 715/740 |
| 2012/0151373 A1* | 6/2012 | Kominac .......... G06F 17/30905 715/740 |
| 2013/0018939 A1 | 1/2013 | Chawla |
| 2013/0325934 A1 | 12/2013 | Fausak et al. ................ 709/203 |
| 2014/0189797 A1 | 7/2014 | Nori et al. ........................ 726/4 |
| 2014/0372508 A1 | 12/2014 | Fausak et al. |
| 2014/0372509 A1 | 12/2014 | Fausak et al. ................ 709/203 |
| 2014/0372510 A1 | 12/2014 | Fausak et al. ................ 709/203 |

OTHER PUBLICATIONS

Non-Final Office Action issued in US Appl. No. 13/918,789; 44 pages, Apr. 24, 2015.

Non-Final Office Action issued in US Appl. No. 13/918,797; 9 pages, Apr. 6, 2015.

* cited by examiner

US 9,467,446 B2

RUNTIME API FRAMEWORK FOR CLIENT-SERVER COMMUNICATION

CROSS-REFERENCE TO RELATED APPLICATIONS

This application is a continuation of application Ser. No. 13/918,774 titled "Runtime API Framework for Client-Server Communication" and filed on Jun. 14, 2013, which is incorporated herein by reference.

FIELD

The disclosure relates in general to client-server communication, and more particularly to, a system and method for facilitating client-server communication.

BACKGROUND

Many known client-side protocols (CSP) for communicating with a remote computing device, for example, remote desktop protocol (RDP), independent computing architecture (ICA), personal computer over Internet protocol (PCoIP), and virtual network computing (VNC), are known. Under these protocols, a CSP's back-end (CBE) may be communicatively coupled with a server and the client may run an application within an operating system of the remote computing device via the server. The data from the application within the operating system of the remote computing device may be presented via the CSP's front-end (CFE) input/output devices (e.g., screen, speaker, etc.) of the client directly or by alternate protocol, and similarly, input may be received via the input devices (e.g., keyboard, mouse, microphone, etc.) or by alternate protocol of the user-input-client (UIC). However, other approaches for specialized proxy interfacing with the CBE or CFE data perspective may be extremely advantageous and desirable.

DETAILED DESCRIPTION

Figure 1:
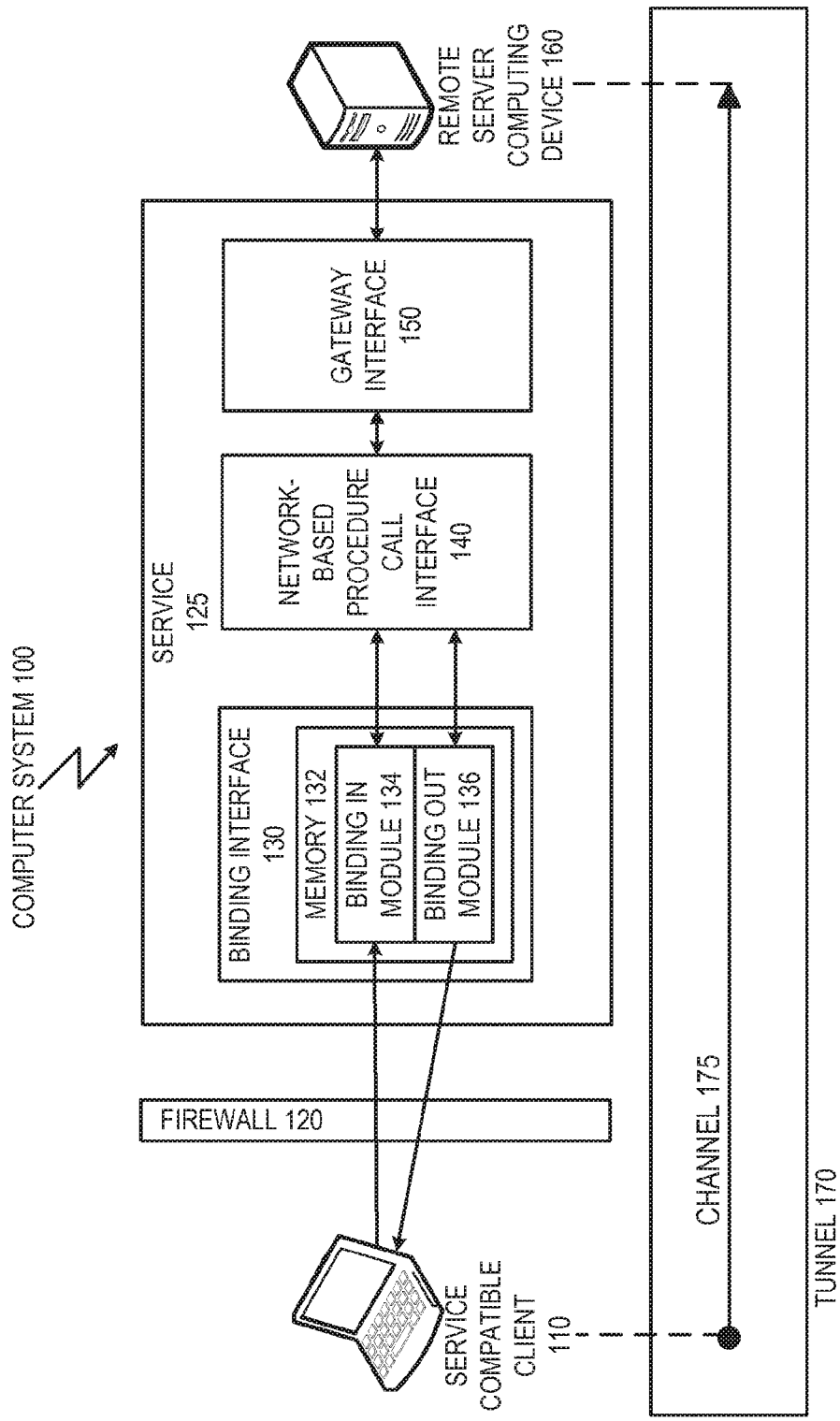
FIG. 1 illustrates an example of a client-server computer system with a service compatible client.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In one aspect, the subject technology relates to a CBE remote procedure call frame and filter (RPCFF) host that facilitates interfacing a proprietary remote server (e.g., a desktop computer running a Microsoft Window® operating system implementing Microsoft Remote Procedure Call®) with a non-proprietary client computing device (e.g., a laptop computer implementing a Linux Ubuntu® operating system). The RPCFF host may facilitate receiving, from the client computing device not configured to implement the proprietary remote procedure call protocol (e.g., Microsoft RPC), a request to communicate with the remote server configured to implement the proprietary remote procedure call protocol. The RPCFF host may facilitate providing, via a remote procedure call layer, network level authentication for the client computing device. The RPCFF host may provide a data path for a logical role on the remote server without implementing a server stack in the proprietary remote procedure call protocol. The logical role may be configured to implement the proprietary remote procedure call protocol. The RPCFF host may define a communication syntax, for the data path, between the client computing device and the logical role. The communication syntax may be different from the proprietary remote procedure call protocol. The communication syntax may involve translating between a universal communication protocol (e.g. Secure Shell) and the proprietary remote procedure call protocol. The RPCFF host may facilitate communicating data, according to the communication syntax, via the data path, between the client computing device and the logical role.

In one implementation, the subject technology relates to a remote gateway client proxy. The CBE proxy assists a service incompatible client computing device in communicating with a remote server computing device and machines in a service, including a network-based procedure call interface and a gateway interface.

Client-server computer systems are oftentimes implemented to allow users of client computing devices to access data stored on server computing devices that are located remote to the client computing devices. However, one disadvantage of client-server computer systems is that a particular client computing device might not be able to interface with a particular server computing device if the client computing device lacks an operating system that is associated with the server computing device. For example, a server computing device implementing a specialized operating system, such as Microsoft Windows Server 2008, may only be able to interact with client computing devices implementing certain Microsoft operating systems, such as Windows XP or Vista. Client computing devices implementing other operating systems, such as Google Android or Apple 105 operating systems, may not be able to fully interact with the server computing device. As the foregoing illustrates, what is needed in the art is a technique to allow a client computing device implementing an arbitrary operating system to fully interact with a server computing device implementing a specialized operating system.

Disadvantages of known client-server computing systems include that these systems rely heavily on proprietary protocols associated with the server computing device. For example, remote procedure call (RPC) is a Microsoft proprietary protocol. Only operating systems provisioned by Microsoft with RPC can use any Microsoft role, such as terminal services gateway (TSGW). This requires a very large footprint of code. Some of the shortcomings are that only Microsoft supplies the solution, the code size is large, and access through this mechanism is by design limited to Microsoft products.

In one aspect, the subject technology provides, among other things, a client-side solution that can interface Microsoft's Remote Desktop Gateway/Terminal Services Gateway (RDGW/TSGW) service, which implies that Microsoft's RPC are used. Therefore, in theory, it is not possible to interface a non-Microsoft client to Microsoft's TSGW since that non-Microsoft client doesn't have Microsoft's RPC capabilities. It is therefore the intrinsic nature of one aspect of the subject technology to "bridge" the RPC requirements without actually having an RPC software stack. This is accomplished by "hard coding" all input and output packets with data structures. Only data payloads change. Non-payload information remains constant. This is referred to in the industry as a "specialized packet filter."

In one approach, RPC is utilized to implement TSGW/RDGW service access. One alternative described herein would involve a specialized packet filter, or a Microsoft RPC clone.

In one aspect, advantages and benefits of the subject technology may include interfacing of RPC for tunneling of data through a firewall in a Microsoft environment with a non-Microsoft client. Furthermore, the ability to tunnel data by use of RPC without an RPC stack using a specialized packet filter is another objective. As a result, aspects of the subject technology can provide a clear competitive advantage that enables clients to access within corporate firewalls using standard Microsoft services or roles, or services or roles that traditionally have required the client computing device to have an operating system that is "compatible" with the server computing device.

First Example of Client-Server Computer System

FIG. 1 illustrates an example of a client-server computer system 100. As shown, the computer system 100 includes service compatible client 110 having CBE access to firewall 120, service 125, and remote server computing device 160. The service 125 includes binding interface 130, network-based procedure call interface 140, and gateway interface 150.

In one aspect, the service 125 is a Microsoft service, the network-based procedure call interface 140 is a remote procedure call (RPC) server, and the gateway interface 150 is a terminal services gateway (TSGW) or remote desktop gateway (RDGW) server. The service compatible client 110 may implement a Microsoft Windows operating system, such as XP or Vista.

The service compatible client 110 can be a laptop computer, a desktop computer, a tablet computer, a personal digital assistant (PDA), a mobile phone, or any similar device. The service compatible client 110 may implement an operating system compatible with service 125. As shown, the service compatible client 110 is connected with the binding interface 130 over the firewall 120, which may function to create or deny network connections based on a set of rules. In one aspect, the communication between the service compatible client 110 and the service 125 is implemented in RPC.

As shown, the binding interface 130 includes a memory 132. The memory 132 includes a binding in module 134 and a binding out module 136. The binding in module 134 and binding out module 136 may be implemented in all software, all hardware or a combination of software and hardware. As illustrated, the binding in module 134 receives input messages from the service compatible client 110 in a format associated with the network-based procedure call communications of the service 125 (e.g., RPC if the service 125 implements Microsoft Server) and transmits these input messages to the network-based procedure call interface 140. The binding out module 136 receives messages from the network-based procedure call interface 140 and provides these messages to the service compatible client 110. In one aspect, the service 125 is a Microsoft service, and the messages passing through the binding in module 134 and the binding out module 136 are in RPC.

In one aspect, the network-based procedure call interface 140 is an RPC server that implements an RPC protocol to allow commands in messages from the service compatible client 110 to be executed on the remote server computing device 160. In one aspect, the commands in the messages from the service compatible client 110 are bound to an address space of the remote server computing device 160 using the gateway interface 150. In one aspect, the gateway interface 150 implements Microsoft terminal services gateway (TSGW), Microsoft remote desktop gateway (RDGW) or a similar protocol that is associated with the operating system of the server computing device 160.

In one aspect, a tunnel 170 is created between the service compatible client 110 and the remote server computing device 160, facilitating communication between the service compatible client 110 and remote server computing device 160. In one aspect the tunnel 170 includes a channel 175 connecting the service compatible client 110 with the remote server computing device 160. In one aspect, there are multiple remote server computing devices 160 connected to a single service compatible client 110 using a single tunnel 170 and multiple channels 175.

Second Example of Client-Server Computer System

Figure 2:
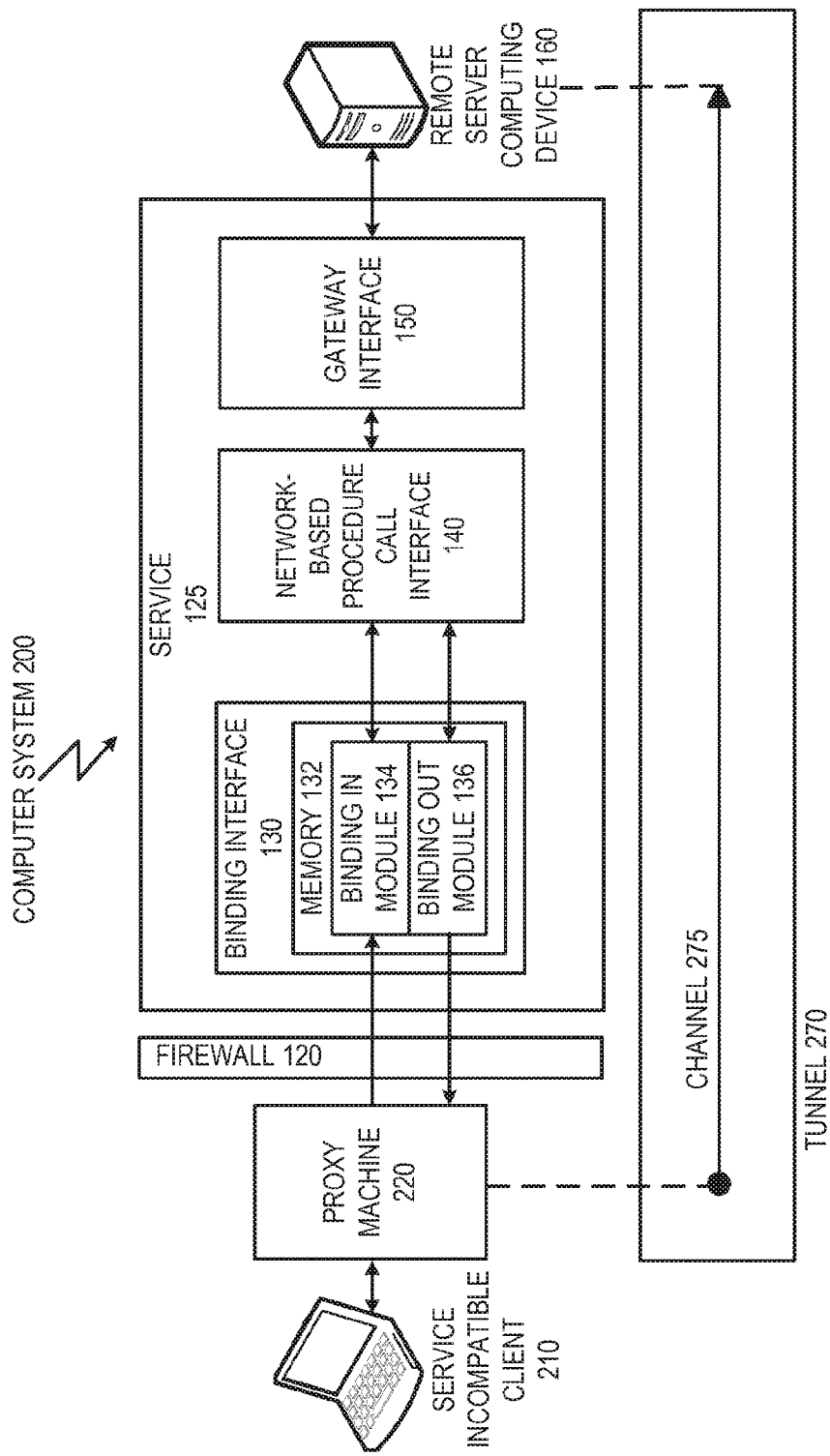
FIG. 2 illustrates an example of a client-server computer system with a service incompatible client in accordance with one aspect of the disclosure.

FIG. 2 illustrates an example of a client-server computer system 200 with a service incompatible client 210 in accordance with one aspect of the disclosure. As shown, the computer system 200 includes service incompatible client 210, proxy machine 220 which may include CSP, firewall 120, service 125, and remote server computing device 160. The service 125 includes binding interface 130, network based procedure call interface 140, and gateway interface 150.

Figure 19:
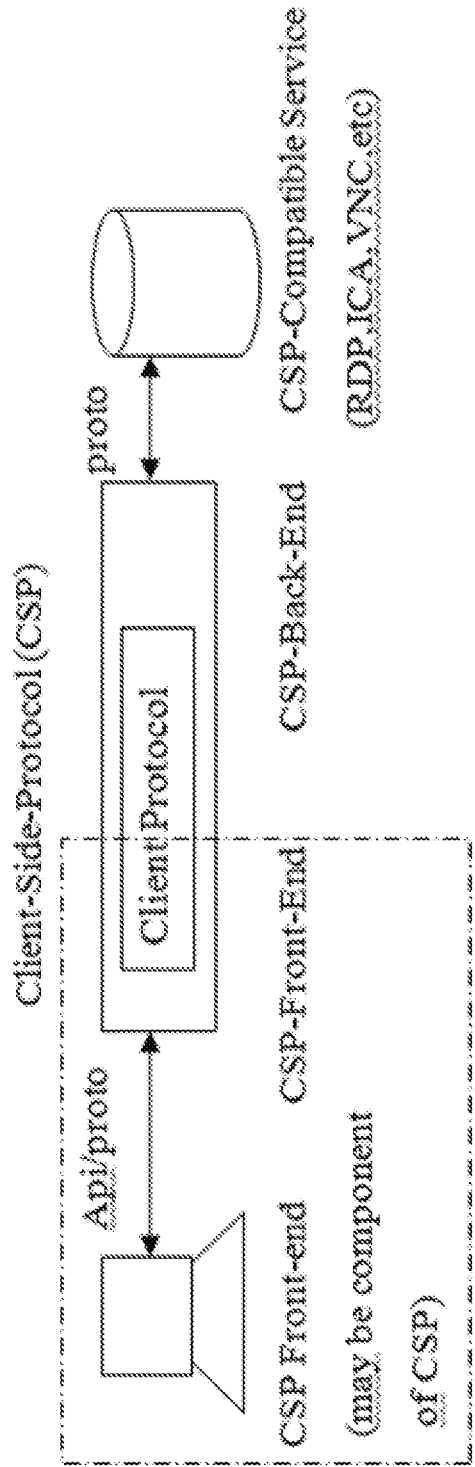
FIG. 19 illustrates CSP connections through Front-end and Back-end interfaces.

When provided as complete service, firewall 120 may be located before Proxy Machine 220. FIG. 19 illustrates an example of CSP connections through front-end and back-end interfaces. A firewall may exist between the CSP front-end and the client protocol. A firewall may also exist between the CSP back-end and a CSP-compatible server.

In one aspect, the service 125 is a Microsoft service, the network-based procedure call interface 140 is a remote procedure call (RPC) server, and the gateway interface 150 is a terminal services gateway (TSGW) or remote desktop gateway (RDGW) server. The service incompatible client 210 may implement a non-Microsoft operating system, such as Apple iOS or Google Android.

The gateway interface 150 may provide a role service that allows authorized remote client computing devices to connect to network resources on an internal corporate or private network. The network resources can be servers or computers with a remote desktop protocol (e.g., Microsoft Remote Desktop Protocol®) enabled.

The gateway interface 150 may use Remote Desktop Protocol (RDP) over HTTPS to establish a secure, encrypted connection between the remote client computing devices and the internal network resources which the remote client computing devices attempt to access.

The gateway interface 150 may provide a client computing device with access to all network resources. Alternatively, the gateway interface 150 may provide a client computing device with access to only one or more network resources that the client computing device attempts to access, for example, via a point-to-point RDP connection.

In one aspect, a remote procedure call may be an inter-process communication that allows a computer program to cause a subroutine or procedure to execute in another address space (commonly on another computer on a shared network) without the programmer explicitly coding the details for this remote interaction. For example, a client computing device may cause a subroutine or procedure to execute in the address space of the server. In one implementation, the programmer may write essentially the same code whether the subroutine is local to the executing program, or remote. In one example, remote procedure call may include remote invocation or remote method invocation.

In one example implementation, a remote procedure call may be initiated by the client, which may send a request message to a known remote server to execute a specified procedure with supplied parameters. The remote server may send a response to the client, and the application continues its process. In one example, the server may receive one remote procedure call at a time from the client. Alternatively, the client may send one or more asynchronous requests to the server, for example, one or more XHTTP calls. (4) The local operating system on the server may pass the incoming packets to the server One difference between remote procedure calls and local calls is that remote procedure calls may, in some cases, fail due to unpredictable network problems. In some implementations, callers of remote procedure calls may deal with such failures without knowing whether the remote procedure was actually invoked. In some example, remote procedure calls may be used in carefully written low-level subsystems.

In one aspect, a sequence of events during a remote procedure call may be as follows. However, other sequences of events during a remote procedure call may also be used in conjunction with the subject technology.

(1) The client may call the client stub. The call may be a local procedure call. Parameters may be pushed on to an OSI stack.

(2) The client stub may pack the parameters (e.g., using marshalling) into a message and make a system call to send the message.

(3) The client's local operating system may send the message from the client to the server.

stub.

(5) Finally, the server stub may call the server procedure. The reply may follow, for example, the same steps in the reverse direction.

In one example, a stub may be a piece of code used for converting parameters passed during a remote procedure call.

A remote procedure call may, in one example, allow a client to remotely call procedures on a server. The client and server may use different address spaces, so conversion of parameters used in a function call may have to be performed to allow the values of parameters passed during the remote procedure call to be used, as pointers to the memory may point to different data on the client and on the server. The client and server may also use different data representations even for simple parameters (e.g., big-endian versus little-endian for integers). Stubs are used to perform the conversion of the parameters, so a remote procedure call from the client looks, to the server, like a local procedure call for the server, and vice versa.

In one implementation, stub libraries are installed on client and server side. A client stub is responsible for conversion of parameters used in a function call and deconversion of results passed from the server after execution of the function. A server skeleton, the stub on server side, is responsible for deconversion of parameters passed by the client and conversion of the results after the execution of the function.

A stub may be generated either manually or automatically.

Manually: In this approach, the remote procedure call implementer may provide a set of translation functions from which a programmer can construct stubs.

Automatically: An interface description language (IDL), may be used for defining the interface between client and server. For example, an interface definition has information to indicate whether, each argument is input, output or both—only input arguments may need to be copied from client to server and only output elements may need to be copied from server to client.

In one example, in a remote procedure call, the client and the server are connected via a network (e.g., the Internet, an intranet or a Virtual Private Network), via a remote desktop protocol connection (e.g., via Microsoft Remote Desktop Protocol®, via Citrix Independent Computing Architecture (ICA)®, or via VMWare VMView®), via a wired connection, or via a wireless connection. In one example, a network-based procedure call may be a remote procedure call transmitted from a client to a server via a network (e.g., the Internet). The client and the server may be connected via a network.

The service incompatible client 210 is coupled with a proxy machine 220, which communicates with the binding interface 130. The binding interface 130 may function to bind a proprietary (e.g., Microsoft®) client interface to the proprietary (e.g., Microsoft®) server interface. For example, the binding interface 130 may bind the Windows® client interface to a Microsoft® RPC interface. In a first aspect, the proxy machine 220 is a component of the service incompatible client 210. In a second aspect, the proxy machine 220 may be located outside the service incompatible client 210 on the same side of the firewall 120 as the service incompatible client 210, as illustrated. In a third aspect, the proxy machine 220 is located within the firewall 120. In a fourth aspect, the proxy machine 220 is a component of the service 125. In a fifth aspect, the proxy machine 220 is located on the same side of the firewall as the service 125 but is not a component of the service 125. Persons skilled in the art may realize that other locations of the proxy machine are possible and consistent with the subject technology.

The service incompatible client 210 can be a laptop computer, a desktop computer, a tablet computer, a personal digital assistant (PDA), a mobile phone, or any similar device. The service incompatible client 210 may implement an arbitrary operating system incompatible with service 125. For example, if service 125 implements Microsoft Server, the service incompatible client 210 may implement an Apple 105 or a Google Android operating system.

As shown, the service incompatible client 210 is connected with the proxy machine 220. In one aspect, the proxy machine 220 is internal to the service incompatible client 210 and the connection between proxy machine 220 and service incompatible client 210 is a hard wire or other internal connection. In another aspect, the proxy machine 220 is external to the service incompatible client 210 and a native Internet protocol (IP) connection is implemented between the service incompatible client 210 and the proxy machine 220. In one aspect, the service incompatible client 210 can only communicate using native IP communications and the proxy machine 220 handles the communications with the service 125 transparently to the service incompatible client 210. The proxy machine 220 is also connected with the binding interface 130. In one aspect, the service incompatible client 210 communicates with the proxy machine using a native IP communication technique or a similar universal format. However, the service 125 is designed to accept messages in the network-based procedure call communication format for the service 125 (e.g., RPC if the service 125 is running Microsoft Server). The proxy machine 220 converts messages from the universal format (e.g., native IP communication) to the network-based procedure call format of the service 125 (e.g., RPC) based on an encoding for the network-based procedure call format of the service 125. The operation of the proxy machine 220 is described in more detail in conjunction with FIGS. 3-4 below.

As shown, the binding interface 130 includes a memory 132. The memory 132 includes a binding in module 134 and a binding out module 136. The binding in module 134 and binding out module 136 may be implemented in all software, all hardware or a combination of software and hardware. As illustrated, the binding in module 134 receives input messages from the proxy machine 220 in a format associated with the network-based procedure call communication of the service 125 and transmits these input messages to the network-based procedure call interface 140. The binding out module 136 receives messages from the network-based procedure call interface 140 and provides these messages to the proxy machine 220. The proxy machine 220 then translates these messages into a universal format and provides them to the service incompatible client 210. In one aspect, the service 125 is a Microsoft service, and the messages passing through the binding in module 134 and the binding out module 136 are in RPC.

In one aspect, the proxy machine 220 uses a RPC-filter to setup the gateway interface 150. Once the gateway interface 150 is established or setup, the gateway interface 150 may also be used to communicate RPC commands, including OPNUM commands. In one aspect, the network based procedure call interface 140 is an RPC server that implements an RPC protocol to allow commands in messages from the proxy machine 220 to be executed on the remote server computing device 160. In one aspect, the commands in the messages from the proxy machine 220 are bound to an address space of the remote server computing device 160. In one aspect, the gateway interface 150 implements Microsoft terminal services gateway (TSGW), Microsoft remote desktop gateway (RDGW) or a similar protocol that is associated with the operating system of the remote server computing device 160. If the gateway interface 150 implements TSGW, then the gateway interface 150 may exchange data using OPNUM, a specialized syntax described in the TSGW specification. The OPNUM operations occur via a specialized RPC packet filter. RPC messages may be bound to TSGW messages using data exchanging or another technique of modifying memory representations of data. The remote server computing device 160 may include a remote desktop protocol (RDP) server as the target host. The proxy machine 220 may include the functions of the RPC packet filter to allow the client to transmit data to the server. In one aspect, RPC messages use marshalling for data exchange in conjunction with interchange data language (IDL). RPC messages may be bound to TSGW messages using marshalling or another technique of modifying memory representations of data. The remote server computing device 160 may include a remote desktop protocol (RDP) server as the target host.

The gateway interface 150 may be any gateway interface. For example, the gateway interface 150 may include a common gateway interface, a web server gateway interface, or a simple common gateway interface. In one example, the gateway interface 150 may have two sides, a server side of the gateway interface 150 and a client side of the gateway interface 150. The server side of the gateway interface 150 may call the client side of the gateway interface 150, providing environment information plus a callback function (for the client side of the gateway interface 150 to use to convey headers to the server side of the gateway interface 150), and receiving content (e.g., from the remote server computing device 160) in return.

In one aspect, marshalling may refer to techniques for transforming the memory representation of an object to a data format suitable for storage or transmission. Marshalling may be used when data must be moved between different parts of a computer program or from one program or machine to another (e.g., from a client to a server or from a server to a client). In one implementation, marshalling may be similar to serialization and may be used to communicate to remote objects with an object, in this case a serialized object. Marshalling may, in some cases, simplifies complex communication, using custom/complex objects to communicate instead of primitives.

In one aspect, an RPC packet filter may be utilized by to a client (e.g., client 210) not having access to an RPC stack for creating RPC commands to transmit to the server. A client may provide information that the client plans to transmit to the proxy machine 220. The proxy machine 220 may combine the information that the client plans to transmit with a RPC header (e.g., in the session layer, layer 5, of the open systems interconnection model). As a result, a client that does not modify, or does not have the ability to modify, the RPC layer in the open systems interconnection (OSI) model can still be able to populate fields in RPC transmissions via operation of the proxy. Lower layers of the OSI model in the RPC packet filter may include pre-filled RPC header data. Upper layers of the OSI model in the RPC packet filter may include client data. The proxy machine 220 may include the functions of the RPC packet filter to allow the client to transmit data to the server.

The OSI model may be used to represent data communications and networking. In one aspect, the OSI model may include the following layers: (1) physical layer, (2) data link layer, (3) network layer, (4) transport layer, (5) session layer, (6) presentation layer, and (7) application layer.

The physical layer (layer 1) may be responsible for the specifications of the transmission media (e.g., cable, wire, or wireless radio) and the electrical signal that goes into the transmission media. The physical layer may include one or more of the following functions: (a) providing the electrical and physical interface to the network, (b) specifying the type of medium, or (c) specifying how signals are transmitted within the medium. Example physical layer protocols include IEEE 802.11, IEEE 802.15, Bluetooth®, and universal serial bus (USB).

The data link layer (layer 2) may create the entity (the packet or frame) which is put on the transmission media. The data link layer may include one or more of the following functions: (a) controlling access to the communication channels, (b) controlling the flow of data within the communication channels, (c) organizing the data into logical frames, (d) identifying specific computers on the network, or (e) detecting communication errors. Example data link layer protocols include Frame Relay and Network Switch.

The network layer (layer 3) may be responsible for getting information to the correct computer or the correct network. The network layer may include one or more of the following functions: (a) moving information to the correct address, (b) assembling and disassembling packets or frames, (c) determining addressing and routing, or (d) determining the best path. Example network layer protocols include Internet Protocol (IP) and AppleTalk.

The transport layer (layer 4) may be responsible for providing extra connection services including error correction. The transport layer may include one or more of the following functions: (a) controlling data flow, e.g., slowing down transmissions if buffers are about to overflow, (b) fragmenting and reassembling data, (c) acknowledging successful transmissions, or (d) correcting faulty transmissions. Example transport layer protocols include transmission control protocol (TCP) and user datagram protocol (UDP).

The session layer (layer 5) may be responsible for controlling the setup, termination, and other mechanisms of a session. In one example, a session may include an agreement to communicate between two entities (e.g., modules or machines). The session layer may include one or more of the following functions: (a) establishing and maintaining connections, (b) dealing with name recognition, (c) dealing with synchronization of data transmissions by placing checkpoints within the data stream so that, if interrupted, the transmission can take up where it left off, or (d) handling remote procedure calls, e.g., running a program on a remote computer. Example session layer protocols include RPC, Network Basic Input/Output System (NetBIOS), Session Announcement Protocol (SAP), Point-to-Point Tunneling Protocol (PPTP), and Socket Secure (SOCKS).

The presentation layer (layer 6) may be responsible for providing syntax and grammatical rules for presenting data to the application layer (layer 7), including encoding, decoding, and otherwise converting data. The presentation layer may include one or more of the following functions: (a) maintaining representation of character sets (e.g., American Standard Code for Information Interchange (ASCII) or Unicode), (b) compressing or decompressing of data, e.g., for a communication protocol of the data link layer, (c) encrypting or decrypting of data, e.g., via one or more of the Data Encryption Standard (DES), RSA, or Secure Socket Layer (SSL) protocols, (d) implementing bit order translation, (e) implementing byte order translation, or (f) maintaining file structure. Example presentation layer protocols include SSL, Transport Layer Security (TLS), External Data Representation (XDR), or Multipurpose Internet Mail Extension (MIME).

The application layer (layer 7) may be responsible for providing network services to computing devices (e.g., clients or servers) and applications running on computing devices. The application layer may provide one or more of the following functions: (a) providing an interface between an operating system of a computing device and a network or communication path, or (b) providing network services such as file transfer, mail services, or terminal emulation. Example application layer protocols include Hypertext Transfer Protocol (HTTP), Secure Shell (SSH), File Transfer Protocol (FTP), Session Initiation Protocol (SIP), Network Time Protocol (NTP), RealTime Transport Protocol (RTP), BitTorrent Protocol, and SPDY.

In one aspect, a tunnel 270 is created between the proxy machine 220 and the remote desktop computing device 160, facilitating communication between the proxy machine 220 and the remote desktop computing device 160. In one aspect the tunnel 270 includes a channel 275 connecting the proxy machine 220 with the remote server computing device 160. In one aspect, there are multiple remote server computing devices 160 connected to a single proxy machine 220 using a single tunnel 270 and multiple channels 275.

In one aspect, the proxy machine 220 of the subject technology may include the following elements:

(1) NLA (network layer authentication) referred to as "credssp" comprising NTLM/Kerberos (NT LAN Manager/Kerberos).

(2) HTTPS/SSL (hypertext transfer protocol secure/secure socket layer)—encryption based security.

(3) RPC Authentication—provides NLA at RPC layer.

(4) RPC Bridge/Filter—This provides stack elevation and demotion without RPC.

(5) Tunnel Creation—by use of the RPC bridge/filter.

(6) Channel Creation—by use of the RPC bridge/filter.

(7) Data Exchange—by use of the RPC bridge/filter.

In one aspect, stack elevation and demotion may refer to using a higher layer in the OSI model to traffic lower layer data, for example, via a tunnel (e.g., tunnel 170 or tunnel 270). Two modules (e.g., the proxy machine 220 and the remote server computing device 160) separated by a firewall (e.g., firewall 120) may use a communication protocol for a higher layer in the OSI model to traffic data associated with a lower layer in the OSI model. For example, Internet Protocol (IP) data (associated with the network layer, layer 3) may be trafficked via Hypertext Transfer Protocol (HTTP, associated with the application layer, layer 7) transmission techniques.

In some implementations of the OSI stack model, lower number layer data may not be transmitted over higher number layer protocols. Thus, stack elevation and demotion may provide a contradiction to the OSI stack to the degree that lower layer data may be transmitted via a higher layer protocol. As a result of stack elevation and demotion, the OSI layer stack may represent a bidirectional stream of data, rather than a unidirectional stream of data, as in some other implementations.

Under typical operation of the OSI model (without stack elevation and demotion), lower number layers have access to higher number layers, but higher number layers do not have access to lower number layers. For example, under typical operation of the OSI model, the physical layer (layer 1) may know which data link layer (layer 2) protocols are implemented, but not vice versa. Under stack elevation and demotion, the data link layer (layer 2) may know which physical layer (layer 1) protocols are being implemented, and vice versa. As a result, the OSI layer stack may represent a bidirectional stream of data, rather than a unidirectional stream of data (from low number layers to high number layers only).

Furthermore, if m and n represent layer numbers of the OSI model stack, where m<n, under stack elevation and demotion, data blocks of layer number m (lower number layer) may be trafficked via a layer number n (higher number layer) protocol. While in a typical implementation a protocol at layer n includes protocol IDs for layers n+1 to 7, with stack elevation and demotion from layer m to layer n, where m<n, data for layer n includes protocol IDs for layers m+1 to 7.

In one aspect of the subject technology, NLA may authenticate the user for access to the TSGW server; HTTPS/SSL may be used as the fundamental transport protocol; and RPC authentication may be a component of the RPC filter. According to one aspect, it is required to assure that a given user has permission to access the RPC layer; RPC Bridge may be the method of providing a data-path to the logical role/service known as TSGW. Tunnel Creation is one example of a command set to TSGW using RPC that creates an "hole" through a firewall. Channel Creation is one example of a command set to TSGW using RPC that creates a logical "channel" to a target host. According to one aspect, it is the channel by which data is transferred to and from a target host within a firewall. Data Exchange may be the process of using a Channel for sending or receiving data through a TSGW server.

In one example, a tunneling protocol (e.g., the tunneling protocol of tunnel 270 and channel 275) may be used when one network protocol (the delivery protocol) encapsulates a different payload protocol. By using tunneling, the computer system 200 can, for example, carry a payload over an incompatible delivery-network, or provide a secure path through an untrusted network.

In one example, tunneling may contrast with a layered protocol model such as those of OSI or TCP/IP. The delivery protocol may, in some cases, operate at a higher level in the model (e.g., OSI model) than does the payload protocol, or at the same level.

Tunneling protocols may use data encryption to transport insecure payload protocols over a public network (such as the Internet), thereby providing, e.g., virtual private network (VPN) functionality. For example, the IPsec protocol includes an end-to-end transport mode, but can also operate in a tunneling mode through a trusted security gateway.

In one example, a secure shell (SSH) tunnel may include an encrypted tunnel created through a SSH protocol connection. A SSH tunnel may be used to transfer unencrypted traffic over a network through an encrypted channel. For example, Microsoft Windows® machines can share files using the Server Message Block (SMB) protocol, a non-encrypted protocol. In one example, in a Microsoft Windows® file-system mounted remotely through the Internet, an eavesdropper snooping on the connection could see transferred files. However, to mount the Windows® file-system securely, a SSH tunnel that routes all SMB traffic to the remote fileserver through an encrypted channel may be established. Even though the SMB protocol itself may contain no encryption, the encrypted SSH channel through which the SMB protocol data travels may offer security.

In one example, a SSH tunnel may be set up by configuring a SSH client to forward a specified local port to a port on the remote machine. Once the SSH tunnel has been established, the SSH client can connect to the specified local port to access the network service. The local port need not have the same port number as the remote port.

SSH tunnels may provide a means to bypass firewalls that prohibit certain Internet services—so long as a site allows outgoing connections. For example, an organization may prohibit a user from accessing Internet web pages (port 80) directly without passing through the organization's proxy filter (which provides the organization with a means of monitoring and controlling what the user sees through the web). But users may not wish to have their web traffic monitored or blocked by the organization's proxy filter. If users can connect to an external SSH server, they can create a SSH tunnel to forward a given port on their local machine to port 80 on a remote web-server.

Some example SSH clients support dynamic port forwarding that allows creation of a SOCKS 4/5 proxy. As a result, applications can be configured to use a local SOCKS proxy server, giving applications more flexibility than creating a SSH tunnel to a single port. SOCKS can free a client from the limitations of connecting only to a predefined remote port and server. If an application does not support SOCKS, one can use a "socksifier" to redirect the application to the local SOCKS proxy server.

In one example, tunneling may be used to "sneak through" a firewall, using a protocol that the firewall would normally block, but is "wrapped" inside a protocol that the firewall does not block, such as hypertext transfer protocol (HTTP). If the firewall policy does not specifically exclude this kind of "wrapping," such wrapping can function to get around the intended firewall policy.

Another example HTTP-based tunneling method uses the HTTP CONNECT approach. A client may issue the HTTP CONNECT command to a HTTP proxy. The proxy then makes a TCP connection to a particular server port, and relays data between that server port and the client connection. As HTTP CONNECT may create a security hole, CONNECT-capable HTTP proxies may restrict access to the CONNECT approach. The proxy may, in one example, allow access only to a white list of specific authorized servers.

Native Client Tunnel Service

In particular embodiments, a client (e.g., client 210) may be a thin client primarily including web browsing functionality with CFE traffic generated for web-browser. A Native Client tunneling service may be provided to enable CBE traffic from the client to access hosts through tunneling (e.g., VPN) mechanisms that may not otherwise be available in browser-only environments. The Native Client tunnel service may provide a means to create a tunneling protocol (e.g., for VPN) within the browser of the client using Native Client conventions found in browsers (e.g., GOOGLE CHROME). The NaCl tunneling service may enable a port-forwarding mechanism that appears to connect to the local host but re-transmits the data via a tunneling protocol to the appropriate target host (e.g., remote server computing device 160) that may lie behind a firewall (e.g., firewall 120). The NaCl tunneling service may enable end-to-end communication from a browser to a target host within a firewall without requirement of external functions outside of the browser.

The NaCl tunneling service may include multiple elements. The NaCl tunneling service may include native CHROME library support for an embedded solution. The service may include a dialogue menu for a user to specify a target host, port-forwarding, tunnel protocol devices, and the type of tunneling protocol. The service may also include SSH tunneling support through port forwarding or tunneling devices (e.g., to enable local connections to connect to a remote host through a remote firewall using the SSH protocol). The service may also include TSGW tunneling support through port forwarding or tunneling devices (e.g., to enable local connections to connect to a remote host through a remote firewall using the TSGW protocol).

The NaCl tunneling service may perform the following steps. First, an HTML client may load and execute an HTML script with the NaCl specification. The user of the client may specify (e.g., via the dialogue menu) connection information including credentials for the tunnel. A port forward or tunnel device may be created. The browser of the client may then connect to the target host through the port-forward or tunnel device. These steps may allow for a local connection that provides remote access to a host through a firewall using a tunnel protocol. This may, for example, provide a full-featured VPN architecture from within a browser, enabling access to or from any machine within a firewall using appropriate tunnel protocols.

Example of Proxy Machine

Figure 3:
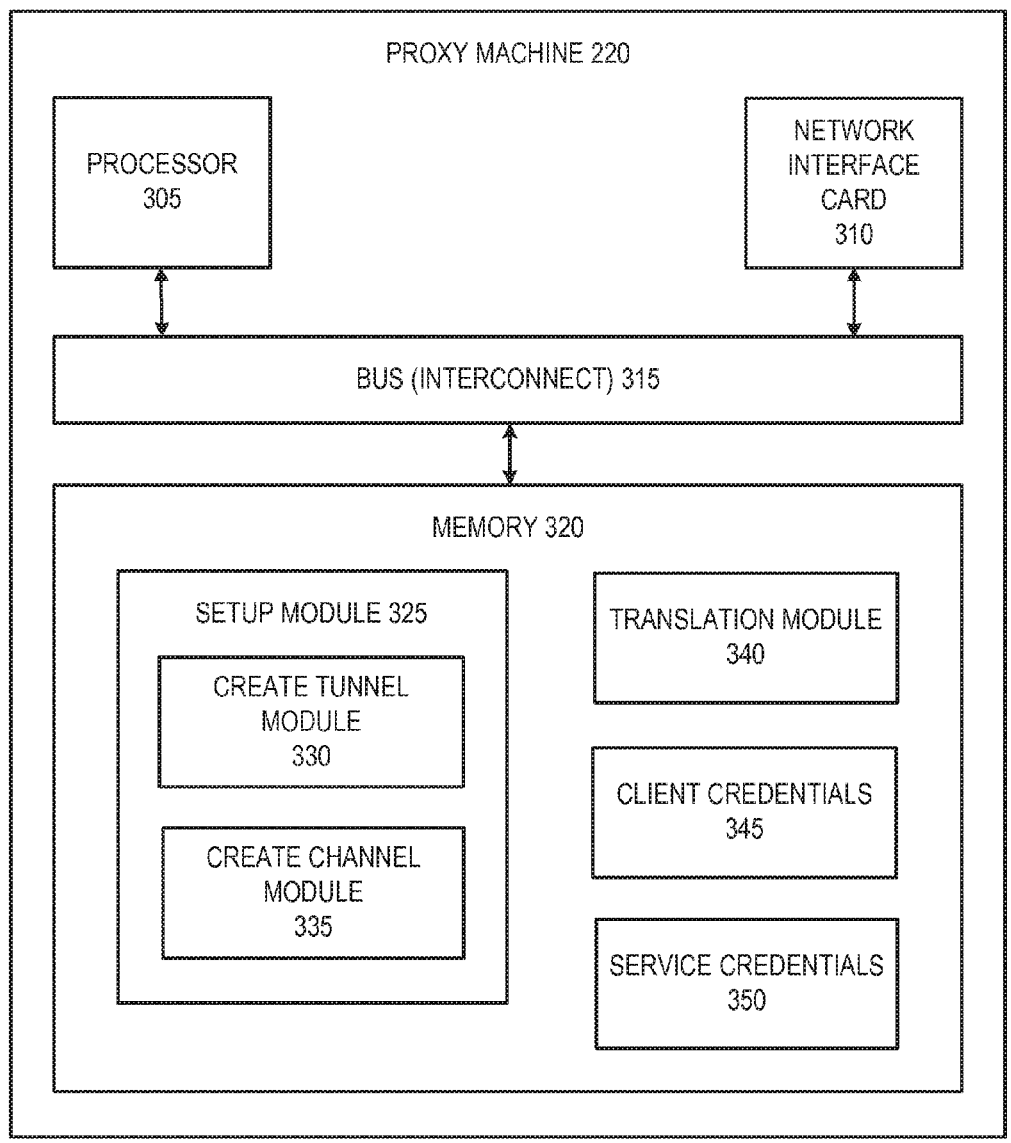
FIG. 3 illustrates an example of a proxy machine in accordance with one aspect of the disclosure.

FIG. 3 illustrates an example of a proxy machine 220 in accordance with one aspect of the disclosure. As shown, the proxy machine 220 includes a processor 305, a network interface card 310, and a memory 320 connected by a bus or interconnect 315.

The processor 305 functions to execute instructions that are provided to the processor 305 from the memory 320 or other storage locations. The network interface card 310 allows the proxy machine 220 to connect to a network, such as the Internet, a cellular network, a local area network (LAN) or an intranet. The memory 320 stores data and instructions that can be implemented or modified by the processor 305.

As shown, the memory 320 includes a setup module 325, a translation module 340, client credentials 345, and service credentials 350. The setup module 325 is configured to initiate the communication between the service incompatible client 210, the proxy machine 220, and the service 225. As illustrated, the setup module 325 includes a create tunnel module 330 and a create channel module 335.

The create tunnel module 330 facilitates the creation of the tunnel 270 between the proxy machine 220 and the service 125. The create channel module facilitates the creation of channel 275 within the tunnel 270. While only one channel 275 is illustrated, in one aspect, multiple channels 275 may be created. In one aspect, channel 275 connects the proxy machine 220 with the remote server computing device 160. The operation of the setup module is described in more detail in conjunction with FIG. 7, below.

The translation module 340 facilitates the translation of messages between the universal format for communication with the service incompatible client 210 and the network-based procedure call format of the service 125 (e.g. RPC). In one embodiment, the network-based procedure call format of the service is RPC and RPC encodings of commands and data are stored with the translation module 340 to allow the translation module to convert messages between the universal format and RPC.

As shown, the memory 320 further includes client credentials 345 and service credentials 350. In one aspect, the client credentials 345 include a username, a password, a domain name, and a host name. In one aspect, the service credentials 350 include valid usernames of users of the service, valid passwords associated with the usernames, a domain name, and a host name.

The proxy machine 220 and/or a module for setting up the proxy machine 220 may reside within (e.g., embedded in) a router for establishing a port forward or a virtual private network (VPN) through a gateway service (e.g., a TSGW service or service 125). In some implementations, RPC code may not be available on client devices running non-proprietary (e.g., non-Microsoft) operating systems operating without a proxy machine or running RPC, or such clients may require a large amount of code. Hence, in one aspect, having a proxy machine embedded in a router for establishing a VPN or port forward through a gateway service is currently not possible due to the amount of code required and the fact that the RPC code is not available on non-proprietary (e.g., non-Microsoft) operating systems. It should be noted that TSGW is one example of a gateway protocol. Any other gateway protocol (e.g., a proprietary gateway protocol) may be used in conjunction with the subject technology. Also, in some aspects, the subject technology may include any modification, augmentation, or omission to the RPC layer. Proxy may be used to translate CFE traffic, CBE traffic, or both CFE traffic and CBE traffic.

Example of Translation Module

Figure 4:
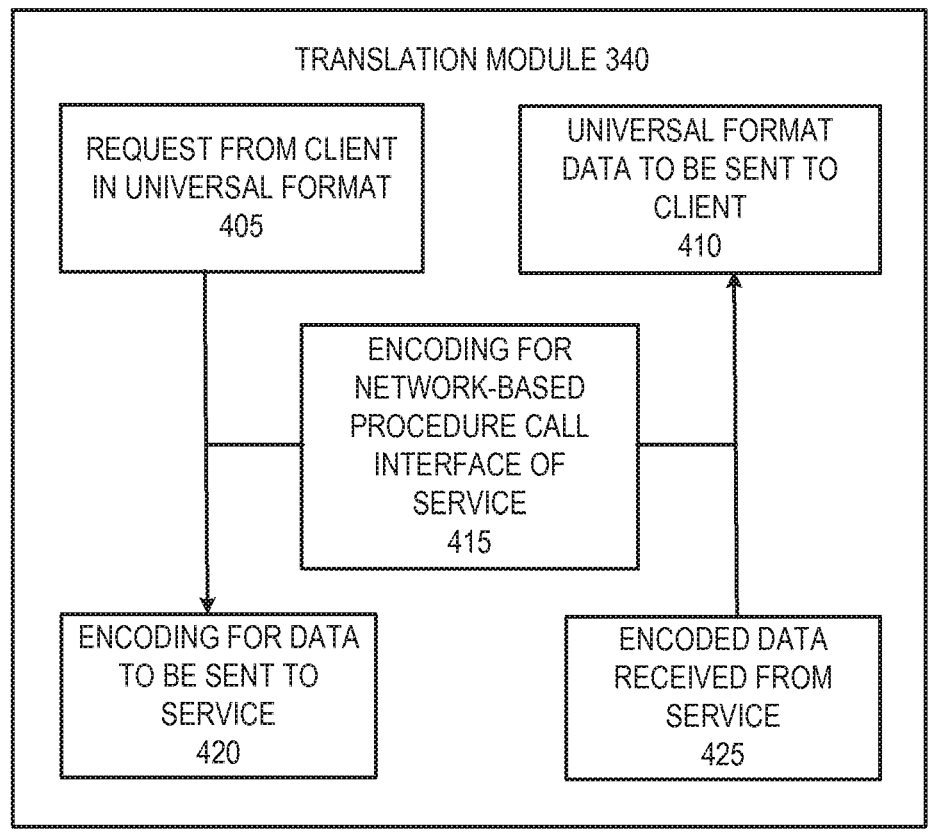
FIG. 4 illustrates an example of a translation module in accordance with one aspect of the disclosure.

FIG. 4 illustrates an example of a translation module 340 in accordance with one aspect of the disclosure.

As shown, the translation module 325 includes a request 405 from a client in a universal format, universal format data 410 to be sent to the client, encoding 415 for the network-based procedure call interface of the service 125, encoding 420 for data to be sent to the service, and encoded data 425 received from the service. In one aspect, the network-based procedure call interface of the service 125 is in RPC.

In one aspect, the translation module 340 receives a request 405 from the service incompatible client 210 in a universal format. The translation module 340 uses the encoding 415 for the network-based procedure call interface of the service to encode the request 405 in the network-based procedure call communication format, resulting in an encoding 420 for data to be sent to the service 125. In one aspect, the translation module 340 then facilitates sending this encoding 420 to the service 125.

In one aspect, the translation module 340 receives encoded data 425 from the service 125. The translation module 340 then decodes the encoded data 425 from the service 125 based on the encoding 415 for the network-based procedure call interface of the service 125. The result is universal format data 410 that can be sent to the service incompatible client 210. In one aspect, the translation module 340 then facilitates sending the universal format data 410 to the service incompatible client 210.

Example of Computing Device

Figure 5:
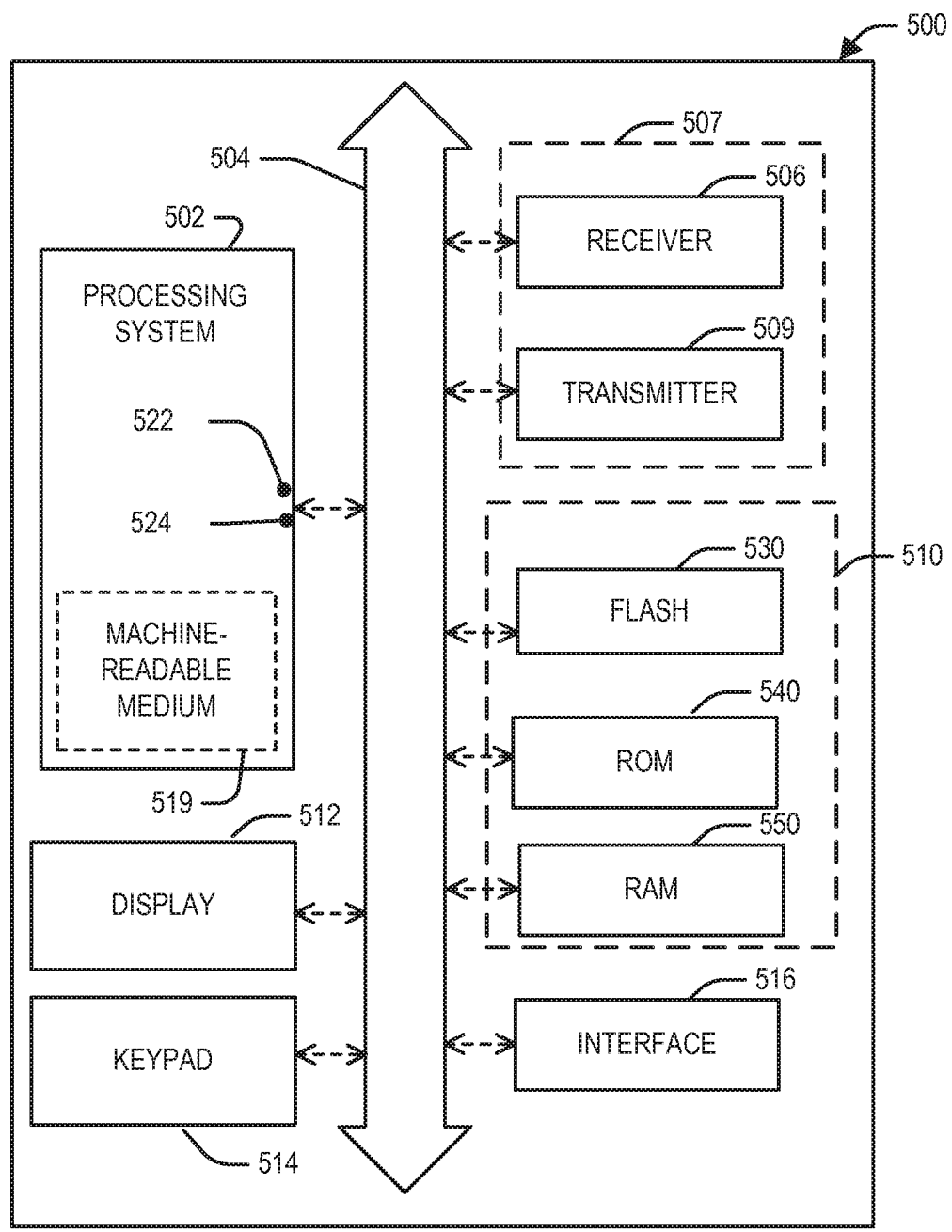
FIG. 5 is a conceptual block diagram illustrating an example of a computing device.

FIG. 5 is a conceptual block diagram illustrating an example of a computing device.

A computing device 500 may be, for example, a service compatible client 110, a service incompatible client 210, a proxy machine 220, a binding interface 130, a RPC server 140, a gateway interface 150 or a remote server computing device 160. A computing device may comprise one or more computing devices.

A computing device 500 may include a processing system 502. The processing system 502 is capable of communication with a receiver 506 and a transmitter 508 through a bus 504 or other structures or devices. It should be understood that communication means other than busses can be utilized with the disclosed configurations. The processing system 502 can generate commands, messages, and/or other types of data to be provided to the transmitter 509 for communication. In addition, commands, messages, and/or other types of data can be received at the receiver 506, and processed by the processing system 502.

The processing system 502 may operate in conjunction with a general-purpose processor or a specific-purpose processor for executing instructions and may further include a machine-readable medium 519 for storing data and/or instructions for software programs. The instructions, which may be stored in a machine-readable medium 510 and/or 519, are executable by the processing system 502 to control and manage access to the various networks, as well as provide other communication and processing functions. The instructions may also include instructions executable by the processing system 502 for various user interface devices, such as a display 512 and a keypad 514. The processing system 502 may include an input port 522 and an output port 524. Each of the input port 522 and the output port 524 may include one or more ports. The input port 522 and the output port 524 may be the same port (e.g., a bi-directional port) or may be different ports.

The processing system 502 may be implemented using software, hardware, or a combination of both. By way of example, the processing system 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client computing device, an HTTP server, a web server) or by a processing system (e.g., an operating system, an HTTP server, or a web server). Instructions can be, for example, a computer program including code.

A machine-readable medium can be one or more machine-readable media. A machine-readable medium (e.g., 510) may include storage external to an operating system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. The machine-readable medium 519 may be a non-transitory machine-readable medium. A non-transitory machine-readable medium may include one or more volatile and/or non-volatile memories. A machine-readable medium 519 may include storage integrated into a processing system, such as might be the case with an application specific integrated circuit (ASIC). A memory may be a machine-readable medium (e.g., 510 or 519) or a part thereof.

According to one aspect of the disclosure, a machine-readable medium is a computer readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer readable storage medium, or a non-transitory computer-readable storage medium.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processing system 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network System

Figure 6:
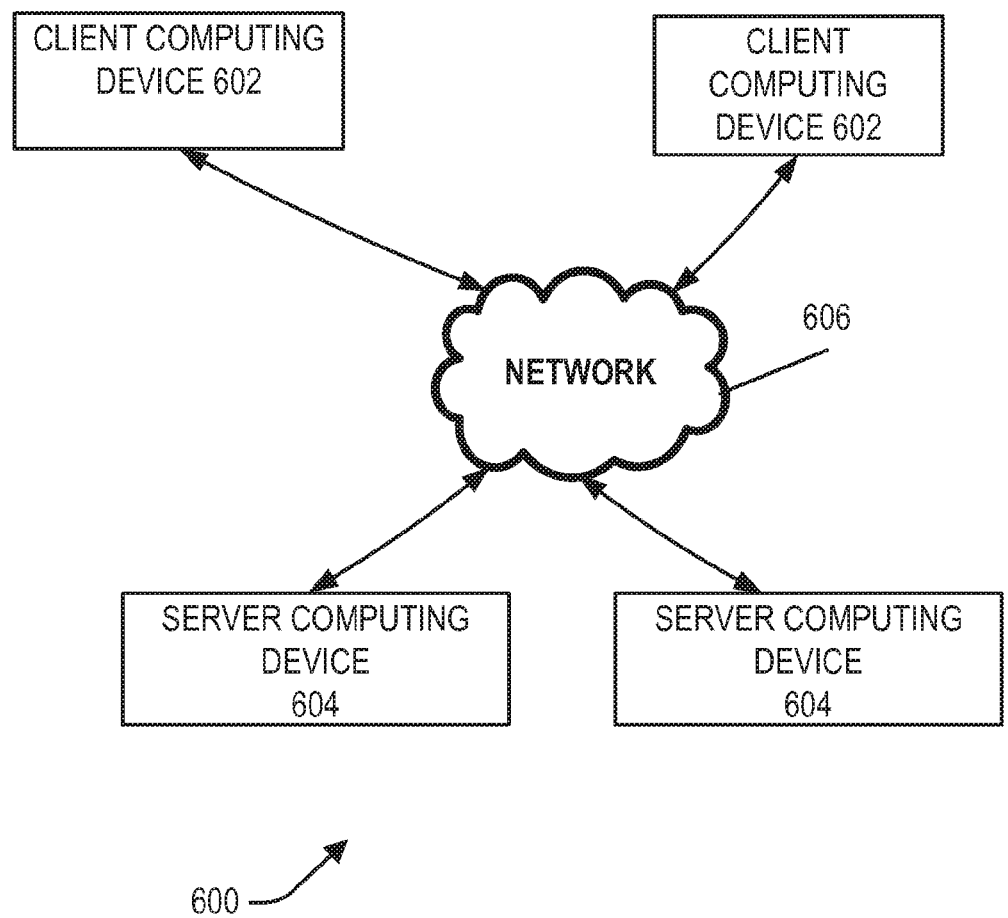
FIG. 6 illustrates a simplified diagram of an example of a network system.

FIG. 6 illustrates a simplified diagram of an example of a computer network system in accordance with an aspect of the present disclosure.

A computer network system 600 may include one or more client computing devices 602 (e.g., laptop computers, desktop computers, tablets, PDAs, mobile phones, etc.) in communication with one or more server computing devices 604 (e.g., a server such as an HTTP server, a web server, an enterprise server, etc.) via a network 606. In one aspect, a server computing device 604 is configured to allow remote sessions (e.g., remote desktop sessions) wherein users can access applications and files on the server computing device 604 by logging onto the server computing device 604 from a client computing device 602. Such a connection may be established using any of several well-known techniques such as the remote desktop protocol (RDP) on a Windows-based server or the techniques disclosed herein for a non-Windows-based server.

In one aspect of the disclosure, a client computing device 602 may be an end-user computing device, such as a laptop or desktop computer. In one aspect, a server computing device 604 may be a terminal services gateway (TSGW) server or a remote desktop gateway (RDGW) server.

By way of illustration and not limitation, a client computing device 602 can represent a computer, a mobile phone, a laptop computer, a tablet, a thin computing device, a personal digital assistant (PDA), a portable computing device, a virtual machine, or a suitable device with a processor. In one example, a client computing device 602 is a smart phone (e.g., iPhone, Android phone, Blackberry, etc.). In certain configurations, a client computing device 602 can represent an audio player, a game console, a camera, a camcorder, an audio device, a video device, a multimedia device, or a device capable of supporting a connection to a remote computing device. In an advantageous example, a client computing device 602 is mobile. In another advantageous example, a client computing device 602 is a hand-held device. In another example, a client computing device 602 can be stationary. In one example, a client computing device 602 may be a device having at least a processor and memory, where the total amount of memory of the client computing device 602 is less than the total amount of memory in a server computing device 604. In an advantageous example, a client computing device 602 does not have a hard disk. In one advantageous aspect, a client computing device 602 has a display smaller than a display supported by a server computing device 604.

In one aspect, a server computing device 604 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server computing device 604 can be stationary. In another aspect, a server computing device 604 can be mobile. In certain configurations, a server computing device 604 may be any device that can represent a computing device. In one aspect, a server computing device 604 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client computing device 602 and a server computing device 604 are remote with respect to each other, a client computing device 602 may connect to a server computing device 604 over a network 606, for example, via a modem connection, a LAN connection including the Ethernet or a broadband WAN connection including DSL, Cable, TI, T3, Fiber Optics, Wi-Fi, or a mobile network connection including GSM, GPRS, 3G, WiMax or other network connection. A network 606 can be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

Figure 7:
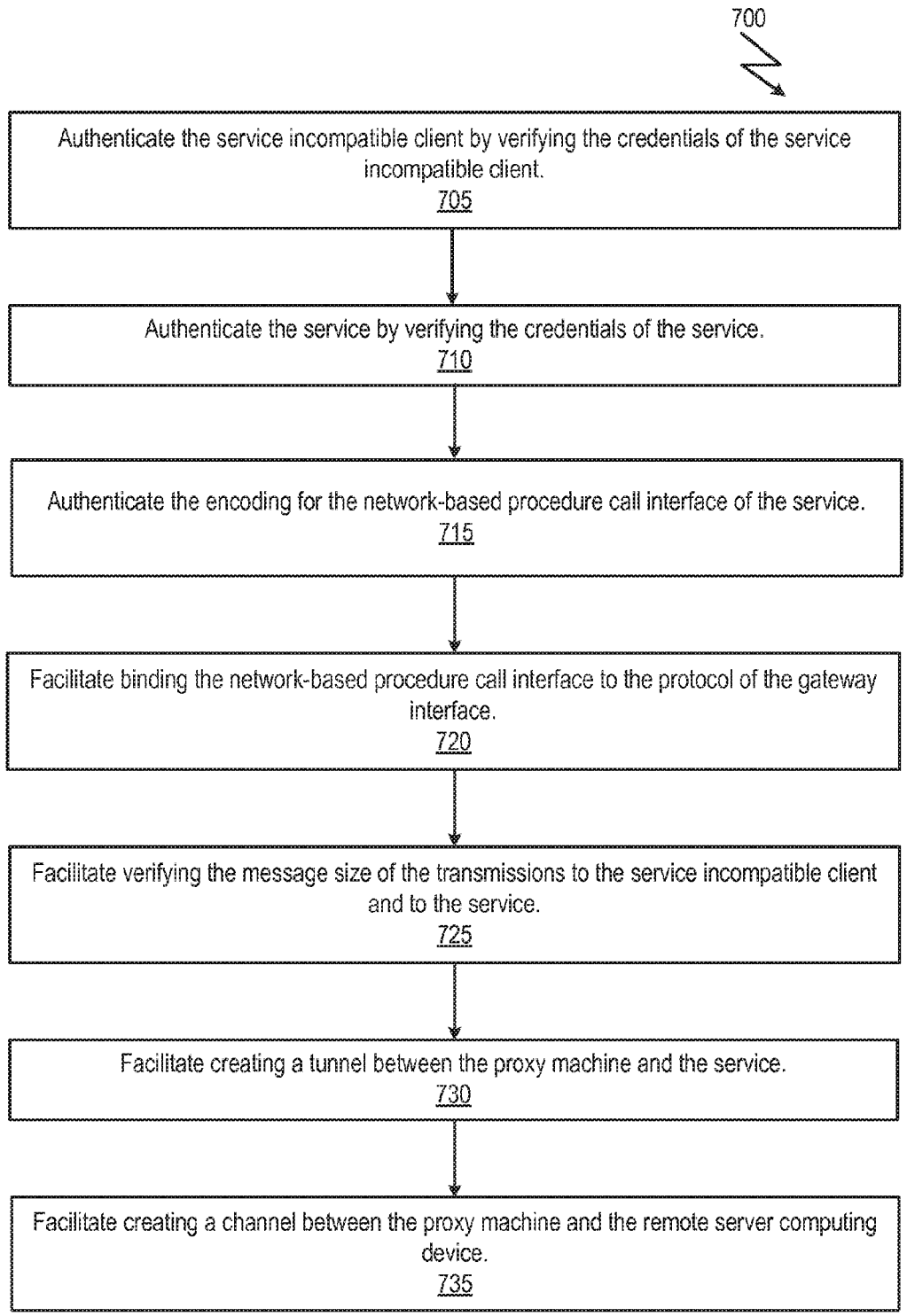
FIG. 7 illustrates an example of a process of facilitating creating a tunnel and channels between the proxy machine and the remote server computing device in accordance with one aspect of the disclosure.

Example of Process of Facilitating Creating Tunnel and Channels Between Proxy Machine and Service In accordance with one aspect of the disclosure, FIG. 7 illustrates an example of a process 700 of facilitating creating a tunnel 270 and channel 275 between the proxy machine 220 and the remote server computing device 160.

At process 705, the setup module 325 in the proxy machine 220 authenticates the service incompatible client 210. In one aspect, the authentication is accomplished by verifying the client credentials 345. The client credentials 345 may include a username, a password, a domain name, and a host name. Persons skilled in the art will recognize other techniques through which the setup module 325 could authenticate the service incompatible client 210.

At process 710, the setup module 325 in the proxy machine 220 authenticates the service. In one aspect, the authentication is accomplished by verifying the service credentials 350. The service credentials 350 may include valid usernames of users of the service, valid passwords associated with the usernames, a domain name, and a host name.

At process 715, the setup module 325 in the proxy machine 220 authenticates the encoding 415 for the network-based procedure call interface of the service 125 stored in association with the translation module 340 in the proxy machine 220. In one aspect, the service 125 implements Microsoft Server and the network-based procedure call interface of the service 125 is Microsoft RPC.

At process 720, the setup module 325 in the proxy machine 220 facilitates binding the network-based procedure call data of the service 125 to the protocol of the gateway interface 150. In one aspect, the protocol of the gateway server is TSGW or RDGW.

At process 725, the setup module 325 in the proxy machine 220 facilitates verifying the message size of the transmissions to the service incompatible client 210 and to the service 125. In one aspect, the messages to the service incompatible client are in a universal format. In one aspect, marshalling is used to ensure that messages from the proxy machine 220 to the service 125 are of the appropriate message size.

At process 730, the create tunnel module 330 in the setup module 325 in the proxy machine 220 facilitates creating a tunnel 270 between the proxy machine 220 and the remote server computing device 160. In one aspect, the tunnel 270 facilitates communication between the proxy machine 220 and the remote server computing device 160 using the network-based procedure call communication of the service 125.

At process 735, the create channel module 335 in the setup module 325 in the proxy machine 220 facilitates creating channel 275 between the proxy machine 220 and the remote sever computing device 160. In one aspect, there may be multiple remote server computing devices 160 and multiple channels 275 may be created.

Example of Process of Facilitating Communication Between Client and Service

Figure 8:
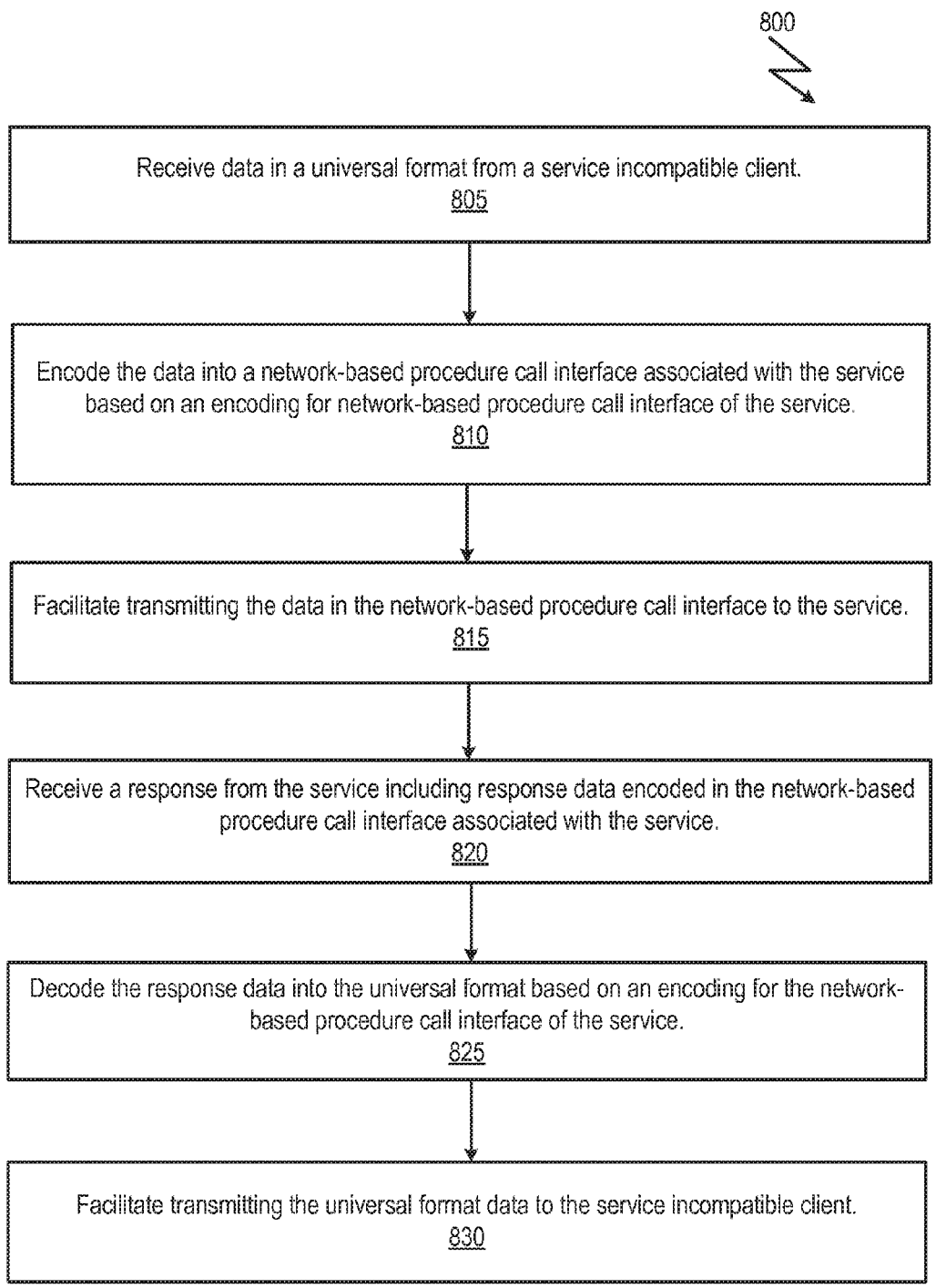
FIG. 8 illustrates an example of a process of facilitating communication between the service incompatible client and the remote server computing device in accordance with one aspect of the disclosure.

In accordance with one aspect of the disclosure, FIG. 8 illustrates an example of a process 800 of facilitating communication between the service incompatible client 210 and the remote server computing device 160.

At process 805, the translation module 340 in the proxy machine 220 receives data in a universal format from the service incompatible client 210. In one aspect, the data is a request 405 from the service incompatible client 210. In one aspect the request 405 is received by the proxy machine 220 over a native IP connection.

At process 810, the translation module 340 in the proxy machine 220 encodes the data into an network-based procedure call interface associated with the service 125 based on an encoding 415 for the network-based procedure call interface of the service 125. In one aspect, the result is an encoding of data 420 to be sent to the service. In one aspect, the format for the network-based procedure call communication of the service 125 is RPC an the encoding 415 includes a set of RPC commands and data. In one aspect, the encoding 415 includes a set of commands and data in the network-based procedure call interface of the service 125.

At process 815, the translation module 340 in the proxy machine 220 facilitates transmitting the data 420 into the network-based procedure call interface associated with the service 125. In one aspect, the data 420 is transmitted to the service 125 over the tunnel 270.

At process 820, the translation module 340 in the proxy machine 220 receives a response from the service including response data 425 encoded in the network-based procedure call interface associated with the service 125. In one aspect, the response data 425 is a response to the data 420 that was submitted to the service 125. In one aspect, the response data 425 is received over the tunnel 270.

At process 825, the translation module 340 in the proxy machine 220 decodes the response data into the universal format based on the encoding 415 for the network-based procedure call interface of the service. In one aspect, the result of the decoding is universal format data 410 to be sent to the service incompatible client 210.

At process 830, the translation module 340 in the proxy machine 220 facilitates transmitting the universal format data 410 to the service incompatible client 210. In one aspect, the universal format data 410 is transmitted to the service incompatible client 210 over a native IP connection.

In one example, a process of the subject technology is described as follows:
Setup (Inbound)
(1) NTLM Authentication through HTTP over SSL.
(2) NTLM Authentication through RPC over SSL over HTTP.
(3) HTTP to RPC Bindings.
Setup (Outbound)
(4) NTLM Authentication through HTTP over SSL.
(5) NTLM Authentication through RPC over SSL over HTTP.
(6) HTTP to RPC Bindings.
Setup (RPC)
(7) RPC to TSGW Bindings.
(8) RPC Marshal size (32 bit).
TSGWviaRPC
(9) Operations 1-9 (OPNUM).

One function of the process outlined above may be the setup of an inbound web-service authenticated HTTPS pathway, and the setup of authenticated RPC inbound access. The process may also provide the setup of outbound web-service authenticated HTTPS pathway, and the setup of outbound authenticated RPC access. The process may also provide the setup of RPC binding to TSGW role and the setup of RPC marshalling data size (32 bit fields). The use of OPNUM can provide tunnel creation, tunnel authentication, channel creation, and channel binding. In one example, all OPNUM operations occur by use of a specialized RPC packet filter. These steps may be required to meet Microsoft's requirements for accessing TSGW role providing this service if the service 125 implements a Microsoft operating system such as Microsoft Server.

In one aspect, a unique HTTPS connection is created for inbound and outbound data. These are logically bound (by use of RPC protocol) to establish a single logical connection to RPC services. These are in turn bound to a TSGW using RPC protocol through a fixed filter mechanism. The result is the ability to exchange data using OPNUM. OPNUM are specialized syntax described by TSGW specification. In one aspect, these require RPC pathway from outside firewall to utilize. Once established, a Tunnel and Channel may be created for transporting of data from a client to a Target server, such as a RDP server. The result achieved may be a tunnel through the firewall 120 to Microsoft TSGW role with a channel (data path) from/to target host of the remote server computing device 160.

In one aspect, commands implementing various RPC commands such as OPNUM are received either by functional passing of parameters (when included within the service compatible client 110 or the proxy machine 220) or through protocol syntax. The subject technology can interface the features of the proxy machine 220 through commands by function or by protocol syntax.

Example of Remote Gateway Client Proxy

Figure 9:
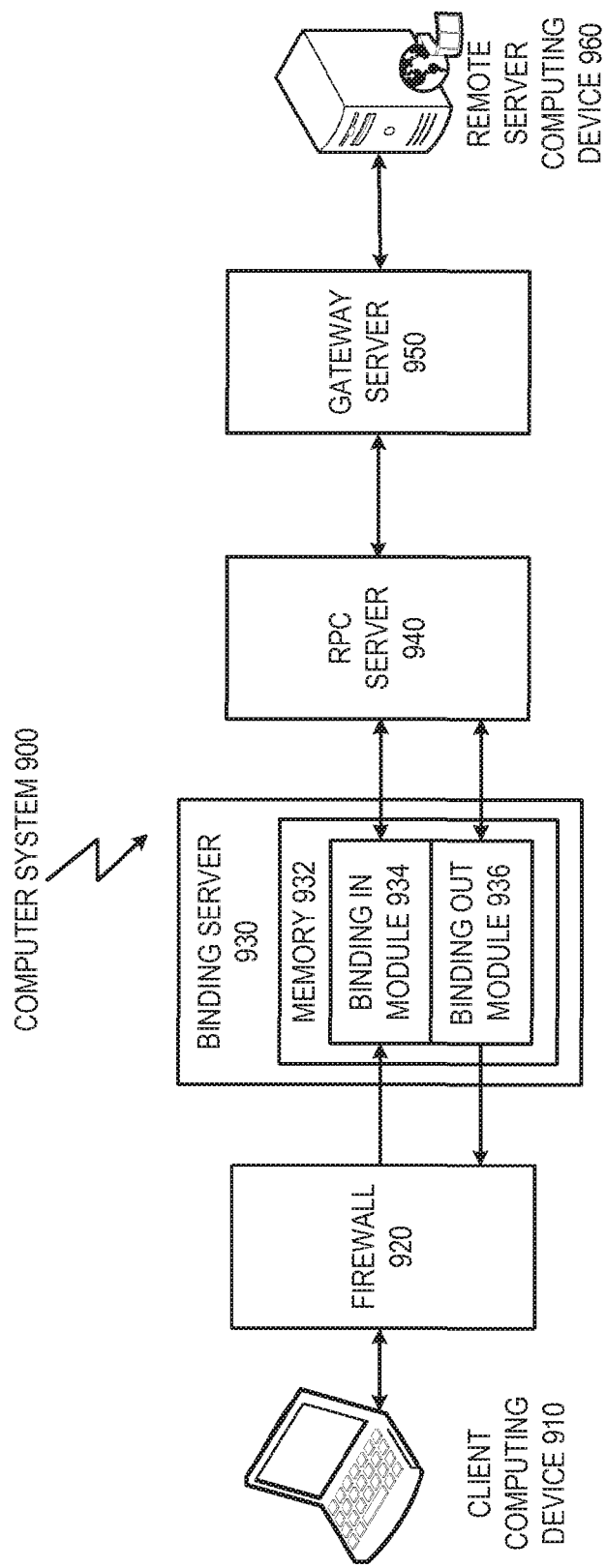
FIG. 9 illustrates an example of a client-server computer system in accordance with one aspect of the disclosure.

FIG. 9 illustrates an example of a client-server computer system 900. As shown, the computer system 900 includes client computing device 910, firewall 920, binding server 930, remote procedure call (RPC) server 940, gateway server 950, and remote server computing device 960.

The client computing device 910 can be a laptop computer, a desktop computer, a tablet computer, a personal digital assistant (PDA), a mobile phone, or any similar device. The client computing device may implement a substantially arbitrary operating system having hypertext transfer protocol secure (HTTPS) communication capabilities. As shown, the client computing device 910 is connected with the binding server 930 over the firewall 920, which may function to create or deny network connections based on a set of rules. In one aspect, a unique HTTPS connection is created for inbound data (directed to the remote server computing device 960) and outbound data (directed to the client computing device 910).

As shown, the binding server 930 includes a memory 932. The memory 932 includes a binding in module 934 and a binding out module 936. The binding in module 934 and binding out module 936 may be implemented in all software, all hardware or a combination of software and hardware. As illustrated, the binding in module 934 receives input messages from the client computing device 910 in a format associated with the client computing device, such as HTTPS, and translates the messages into a format that is associated with the remote server computing device 960, such as a format specific to the operating system of the remote server computing device 960. The binding out module 936 receives input messages from the server computing device 960 and translates the messages into a format that is associated with the client computing device 910.

As illustrated, the output from the binding out module 936 is transmitted to the RPC server 940. The input to the binding in module 934 is transmitted from the RPC server 940. In one aspect, the RPC server 940 implements an RPC protocol to allow commands in messages from the client computing device 910 to be executed on the remote server computing device 960. In one aspect, the commands in the messages from the client computing device 910 are bound to an address space of the remote server computing device 960 using the gateway server 950. In one aspect, the gateway server 950 implements Microsoft terminal services gateway (TSGW), Microsoft remote desktop gateway (RDGW) or a similar protocol that is associated with the operating system of the server computing device 960. If the gateway server 950 implements TSGW, then the gateway server 950 may exchange data using OPNUM, a specialized syntax described in the TSGW specification. In the OPNUM implementation, a tunnel and channel system may be created for transporting data from the client computing device 910 to the remote server computing device 960. The OPNUM operations occur via a specialized RPC packet filter. RPC messages may be bound to TSGW messages using marshalling or another technique of modifying memory representations of data. The remote server computing device 960 may include a remote desktop protocol (RDP) server as the target host.

To summarize, according to one aspect, the communication between the client computing device 910 and the binding server 930 over the firewall 920 is implemented in an authenticated HTTPS pathway that is independent of any operating system. The communication between the binding server 930 and the RPC server 940 is implemented using the RPC protocol. The communication between the RPC server 940 and the gateway server 950 is in RPC or a remote server computing device 960 operating system specific protocol, such as OPNUM if the gateway server 950 implements Microsoft TSGW.

In one aspect, the subject technology may include the following elements:

(1) NLA (network layer authentication) referred to as "credssp" comprising NTLM/Kerberos (NT LAN Manager/Kerberos).

(2) HTTPS/SSL (hypertext transfer protocol secure/secure socket layer)—encryption based security.

(3) RPC Authentication—provides NLA at RPC layer.

(4) RPC Bridge/Filter—This provides stack elevation and demotion without RPC.

(5) Tunnel Creation—by use of the RPC bridge/filter.

(6) Channel Creation—by use of the RPC bridge/filter.

(7) Data Exchange—by use of the RPC bridge/filter.

In one aspect of the subject technology, NLA may authenticate the user for access to the TSGW server; HTTPS/SSL may be used as the fundamental transport protocol; and RPC authentication may be a component of the RPC filter. According to one aspect, it is required to assure that a given user has permission to access the RPC layer; RPC Bridge may be the method of providing a data-path to the logical role/service known as TSGW. Tunnel Creation is one example of a command set to TSGW using RPC that creates an "hole" through a firewall. Channel Creation is one example of a command set to TSGW using RPC that creates a logical "channel" to a target host. According to one aspect, it is the channel by which data is transferred to and from a target host within a firewall. Data Exchange may be the process of using a Channel for sending or receiving data through a TSGW server.

Figure 10:
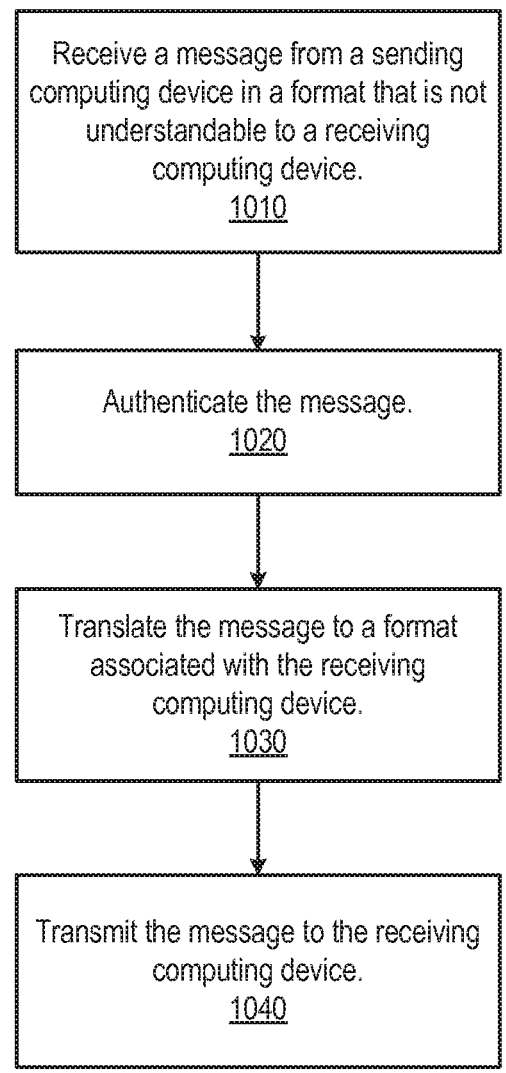
FIG. 10 illustrates an example of a process of translating a message from a format associated with a sending computing device to a format associated with the receiving computing device in accordance with one aspect of the disclosure.

In accordance with one aspect of the disclosure, FIG. 10 illustrates an example of a process of translating a message from a format associated with a sending computing device to a format understandable to a receiving computing device.

As is understood, the format associated with the sending computing device may be HTTPS, and the format understandable to the receiving computing device may be RPC. Alternatively, the format associated with the sending computing device may be RPC, and the format understandable to the receiving computing device may be HTTPS.

At process 1010, the binding out module 936 receives a message from a sending computing device, such as remote server computing device 960, in a format that is not understandable to a receiving computing device, such as RPC. At process 1020, the binding out module 936 authenticates the message as being from the remote server computing device 960 and directed to the client computing device 910.

At process 1030, the binding out module 936 translates the message to a format understandable to the receiving client computing device 910, such as HTTPS. In one aspect, marshalling is implemented to bring about the translation. At process 1040, the binding out module 936 transmits the message to the receiving client computing device 910.

In an alternative aspect, the binding in module receives a message from the sending client computing device 910 in HTTPS or a similar format and translated the message to a format understandable to the receiving server computing device 960, such as RPC, using a procedure similar to the one described above.

Figure 11:
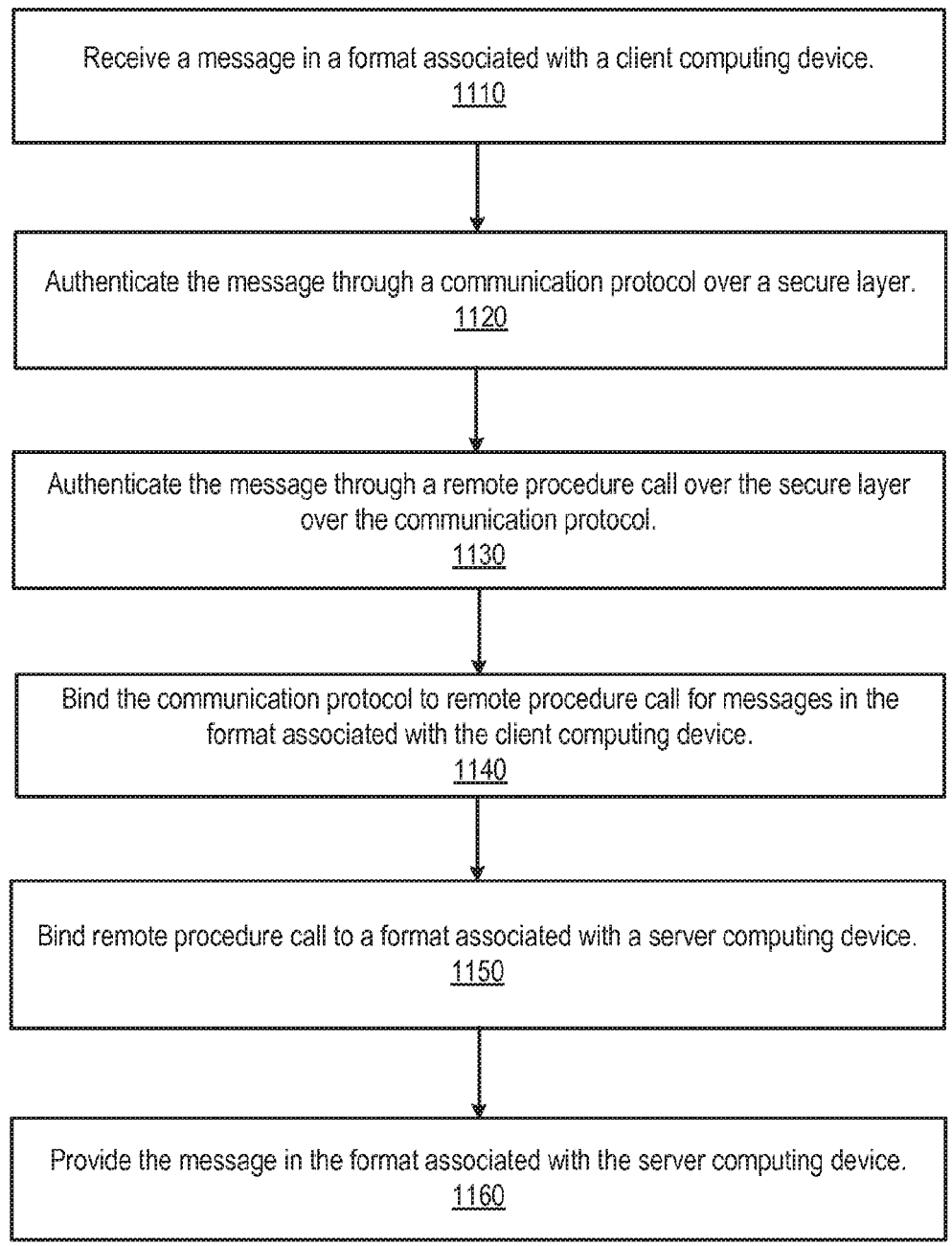
FIG. 11 illustrates an example of a process of authenticating a message received in a format associated with a client computing device format to a format associated with a server computing device in accordance with one aspect of the disclosure.

In accordance with one aspect of the disclosure, FIG. 11 illustrates an example of a process of authenticating a message received in a format associated with the client computing device 910 to a format associated with the server computing device 960.

At process 1110, the binding in module 934 receives a message in a format associated with the client computing device 910. In one implementation, the message is received from the client computing device 910.

At process 1120, the binding in module 934 authenticates the message from the client computing device 910 through a communication protocol, such as HTTPS, over a secure layer, such as secure socket layer (SSL) running in the firewall 920. In one aspect, the authentication may be completed using NT LAN Manager (NTLM).

At process 1130, the binding in module 934 authenticates the message through a remote procedure call over the secure layer, for example SSL, over the communications protocol, for example HTTPS.

At process 1140, the binding in module 934 binds the communication protocol, for example HTTPS, to remote procedure call (RPC) for messages in the format associated with the client computing device 910.

At process 1150, the binding in module 934 binds the remote procedure calls to a format associated with the remote server computing device 960, for example terminal services gateway (TSGW) if the remote server computing device 960 is implementing Microsoft Windows Server.

At process 1160, the binding in module 934 provides the message in a format associated with the server computing device 960, such as the TSGW format if the remote server computing device 960 is implementing Microsoft Windows Server. Marshalling may be used to change the format of the message.

Figure 12:
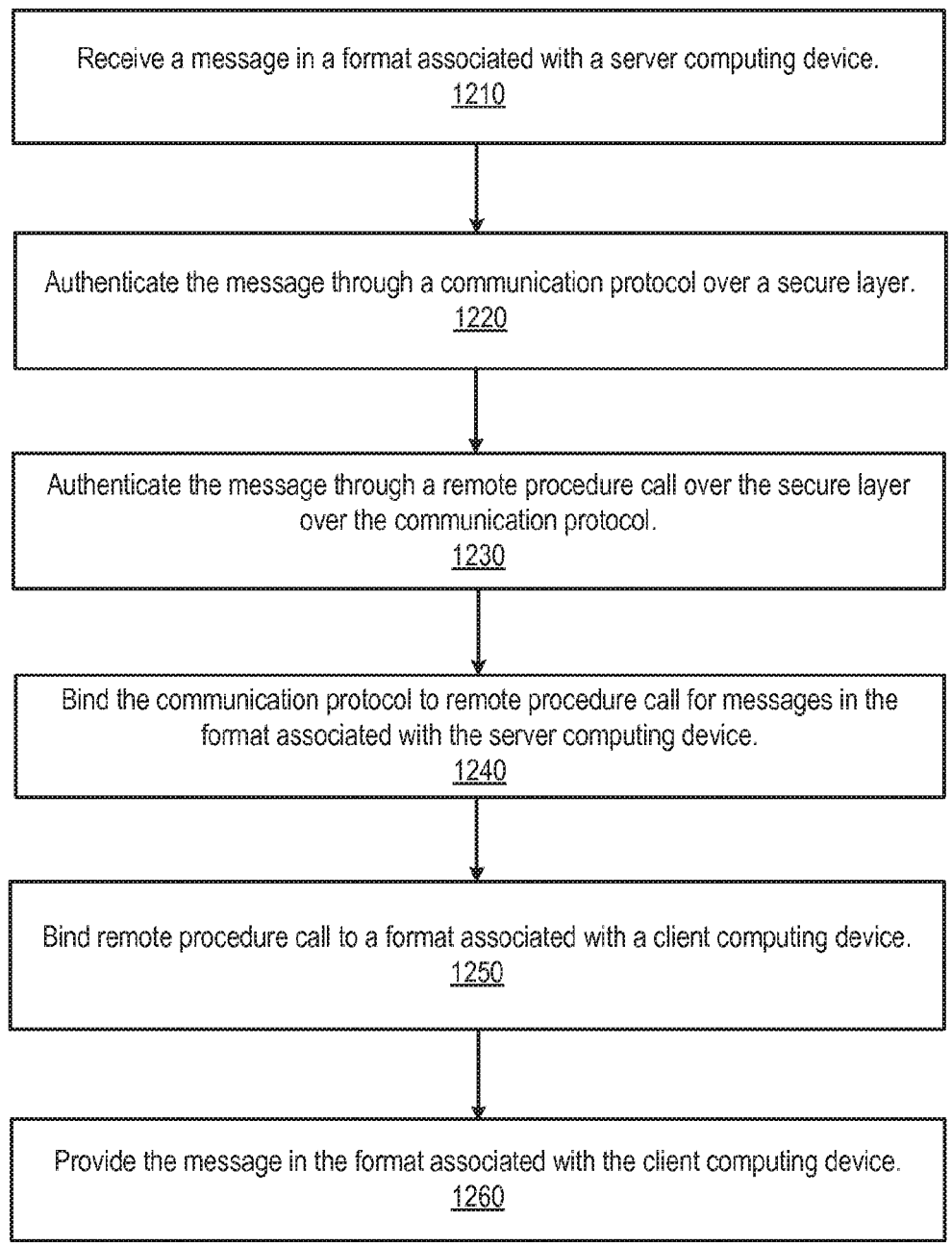
FIG. 12 illustrates an example of a process of authenticating a message received in a format associated with the server computing device to a format associated with a client computing device in accordance with one aspect of the disclosure.

In accordance with one aspect of the disclosure, FIG. 12 illustrates an example of a process of authenticating a message received in a format associated with the server computing device 960 to a format associated with the a client computing device 910.

At process 1210, the binding out module 936 receives a message in a format associated with the remote server computing device 960. In one implementation, the message is received from the remote server computing device 960.

At process 1220, the binding out module 936 authenticates the message from the server computing device 960 through a communication protocol, such as HTTPS, over a secure layer, such as SSL.

At process 1230, the binding out module 936 authenticates the message through a remote procedure call over the secure layer, for example SSL, over the communications protocol, for example HTTPS.

At process 1240, the binding out module 936 binds the communication protocol, for example HTTPS, to remote procedure call (RPC) for messages in the format associated with the server computing device 960.

At process 1250, the binding out module 936 binds the remote procedure call to a format associated with the client computing device 910.

At process 1260, the binding out module 936 provides the message in a format associated with the client computing device 910, such as the HTTPS format. Marshalling may be used to change the format of the message.

In one example, a process of the subject technology is described as follows:

Setup (Inbound)
(1) NTLM Authentication through HTTP over SSL.
(2) NTLM Authentication through RPC over SSL over HTTP.
(3) HTTP to RPC Bindings.
Setup (Outbound)
(4) NTLM Authentication through HTTP over SSL.
(5) NTLM Authentication through RPC over SSL over HTTP.
(6) HTTP to RPC Bindings.
Setup (RPC)
(7) RPC to TSGW Bindings.
(8) RPC Marshal size (32 bit).
TSGWviaRPC
(9) Operations 1-9 (OPNUM).

One function of the process outlined above may be the setup of an inbound web-service authenticated HTTPS pathway, and the setup of authenticated RPC inbound access. The process may also provide the setup of outbound web-service authenticated HTTPS pathway, and the setup of outbound authenticated RPC access. The process may also provide the setup of RPC binding to TSGW role and the setup of RPC marshalling data size (32 bit fields). The use of OPNUM can provide tunnel creation, tunnel authentication, channel creation, and channel binding. In one example, all OPNUM operations occur by use of a specialized RPC packet filter. These steps may be required to meet Microsoft's requirements for accessing TSGW role providing this service.

In one aspect, a unique HTTPS connection is created for inbound and outbound data. These are logically bound (by use of RPC protocol) to establish a single logical connection to RPC services. These are in turn bound to a TSGW using RPC protocol through a fixed filter mechanism. The result is the ability to exchange data using OPNUM. OPNUM are specialized syntax described by TSGW specification. In one aspect, these require RPC pathway from outside firewall to utilize. Once established, a Tunnel and Channel may be created for transporting of data from a client to a Target server, such as a RDP server. The result achieved may be a tunnel through the firewall 920 to Microsoft TSGW role with a channel (data path) from/to target host of the remote server computing device 960.

Example of a Client-Server Communication System

Figure 13:
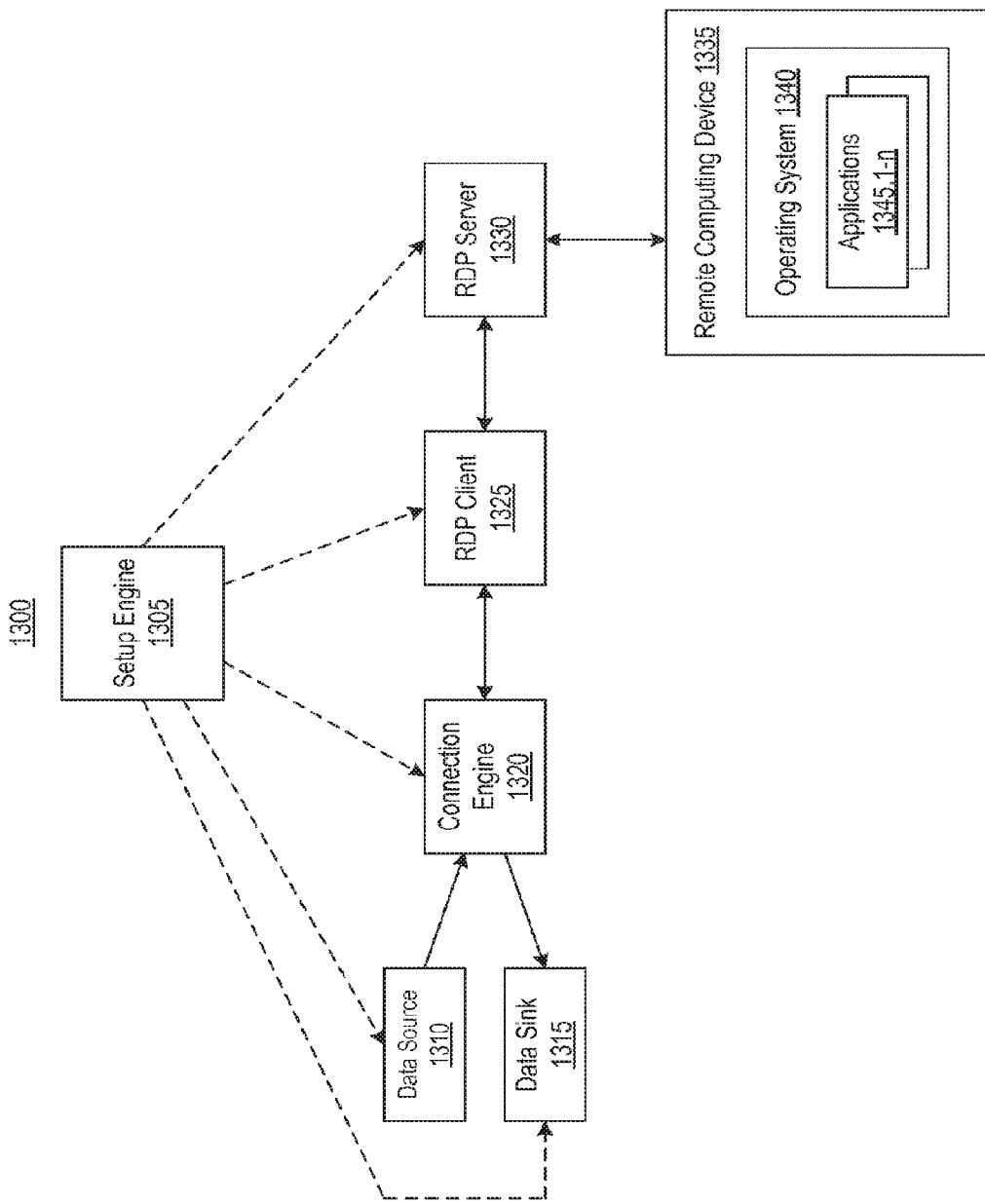
FIG. 13 is a block diagram illustrating an example of a client-server communication system.

FIG. 13 is a block diagram illustrating an example of a client-server communication system 1300.

As shown, the client server communication system 1300 includes a setup engine 1305, a data source 1310, a data sink 1315, a connection engine 1320, a remote desktop protocol (RDP) client 1325, an RDP server 1330, and a remote computing device 1335. The setup engine 1305, the data source 1310, the data sink 1315, the connection engine 1320, the RDP client 1325, the RDP server 1330, and the remote computing device 1335 may be configured to communicate with one another via one or more networks, e.g., the Internet, an intranet, a wired or wireless network, etc.

The remote computing device 1335 may be any computing device that may be accessed remotely via a desktop extension protocol (e.g., RDP, ICA, VNC, or PCoIP protocols), e.g., via a remote desktop session implementing RDP. As shown, the remote computing device 1335 may (but need not) include an operating system 1340. The operating system 1340 may include one or more applications 1345.1-*n* that may be executed within the operating system. The operating system 1340 may include a set of programs that manage the hardware resources of the remote computing device 1335 and provide common services for the applications 1345.1-*n*. Please note that applications 1345.1-*n* may refer to application 1345.1 through 1345.*n*.

The RDP server 1330 may be configured to establish an RDP connection, e.g., a remote desktop session, with the RDP client 1325, to receive RDP input from the RDP client 1325, to communicate with the remote computing device in accordance with the RDP input, and to provide RDP output to the RDP client 1325. The RDP server 1330 may be implemented in all software, all hardware, or a combination of software and hardware. The RDP server 1330 may refer to a single physical machine, multiple physical machines (e.g., a server farm), software residing on a single physical machine, or virtualized software residing on a network or "in the cloud."

The RDP client 1325 may be configured to establish an RDP connection, e.g., a remote desktop session, with the RDP server 1330, to provide RDP input to the RDP server 1330, and to receive RDP output from the RDP server 1330. The RDP client 1325 may be implemented in all software, all hardware, or a combination of software and hardware. The RDP client 1325 may refer to a single physical machine, multiple physical machines, software residing on a single physical machine, or virtualized software residing on a network or "in the cloud."

The data source 1310 may be configured to provide data that may be converted to CFE input to the RDP client 1325 for communication with the RDP server 1330 through CBE to the remote computing device 1335, e.g., in a remote desktop session. The data source 1310 may be external to the RDP client 1325. The data source 1310 may be a substantially arbitrary data source. For example, the data source 1310 may be a computer memory, a physical machine, a virtual machine, a data pipe, etc. The data source 1310 may be communicatively coupled with one or more of a keyboard, a mouse, a touch screen, a camera, or an audio input unit. The data source 1310 may be communicatively coupled with a server in a client-server communication protocol identical to or different from RDP. For example, the data source 1310 may be communicatively coupled with a HTTP server. The data source 1310 may be implemented as a physical machine or a virtual machine.

The data sink 1315 may be configured to receive and process data converted from CFE output from the RDP client 1325 from communication with the RDP server 1330 or the remote computing device 1335, e.g., in a remote desktop session. The data sink 1315 may be external to the RDP client 1325. The data sink 1315 may be communicatively coupled with one or more of a video output unit, a display output unit (e.g., an image output unit), or an audio output unit (e.g., any machine with a visual output such as a mobile phone or a laptop, or a display, monitor, or a speaker). The data sink 1315 may be communicatively coupled with a server in a client-server communication protocol identical to or different from RDP. For example, the data sink 1315 may be communicatively coupled with a HTTP server and/or a HTTP client. In one example, the data sink is communicatively coupled with a HTTP server. The data sink 1315 may also be communicatively coupled with a HTTP client, e.g., via the HTTP server. The data sink 1315 may be implemented as a physical machine or a virtual machine. The data source 1310 and the data sink 1315 may reside on the same physical device or on different physical devices. The data sink 1315 may be a substantially arbitrary data sink. The data sink 1315 may be one or more of a video output unit, a display output unit, or an audio output unit. The data sink 1315 may be a memory unit configured to write received data (e.g., a writeable disk).

In one aspect, a phrase "defining a data source" may encompass its plain and ordinary meaning, including, but not limited to identifying a data source (e.g., data source 1310) and/or communicatively coupling the data source (e.g., via the connection engine 1320) with a protocol (e.g., the RDP protocol implemented with RDP client 1325 and RDP server 1330) for transmitting data to or communicating with a remote operating system (e.g., operating system 1340 of remote computing device 1335). In one aspect, communicatively coupling can comprise facilitating communicatively coupling, e.g., providing instructions for communicative coupling, causing communicatively coupling or enabling communicatively coupling.

In one aspect, a phrase "defining a data sink" may encompass its plain and ordinary meaning, including, but not limited to identifying the data sink (e.g., data sink 1310) and/or communicatively coupling the data sink (e.g., via the connection engine 1320) with a protocol (e.g., the RDP protocol implemented with RDP client 1325 and RDP server 1330) for receiving data from or communicating with a remote operating system (e.g., operating system 1340 of remote computing device 1335). In one aspect, communicatively coupling can comprise facilitating communicatively coupling, e.g., providing instructions for communicative coupling, causing communicatively coupling or enabling communicatively coupling.

The connection engine 1320 is configured to connect the data source 1310 and the data sink 1315 with the RDP client 1325. The connection engine 1320 may be implemented in software. The connection engine 1325 may reside on a physical machine associated with the RDP client or on a different physical machine. The connection engine may reside on the same physical machine as one or more of the data source 1310 or the data sink 1315, or on a physical machine separate and distinct from a physical machine where the data source 1310 and/or the data sink 1315 reside.

The connection engine 1320 may be configured to connect to the RDP client 1325. The connection engine 1320 may also be configured to receive an indication of the data sink 1315 configured to receive and process output data from the RDP communication between the RDP client 1325 and the RDP server 1330. The indication of the data sink 1315 may include, for example, a pointer or a link to the data sink 1315 or a network address of the data sink 1315. The connection engine 1320 may also be configured to receive an indication of the data source 1310 for the RDP communication between the RDP client 1325 and the RDP server 1330. The indication of the data source 1310 may include, for example, a pointer or a link to the data source 1310 or a network address of the data source 1310. The connection engine 1320 may also be configured to receive an indication of a communication pathway between the data source 1310, the data sink 1315, the RDP client 1325, and the RDP server 1330, and to transmit data via the communication pathway. The indication of the communication pathway may include, for example, a pointer or a link to the communication pathway.

The setup engine 1305 may be configured to facilitate creating the communication pathway between the data source 1310, the data sink 1315, the RDP client 1325, and the RDP server 1330. In one implementation, the setup engine may be configured to define an RDP communication protocol between the RDP client 1325 and the RDP server 1330. The setup engine 1305 may also be configured to define a connection, e.g., of the connection engine 1320, to the RDP client 1325 and to validate the connection. The setup engine 1305 may also be configured to define the data sink 1315 configured to receive and process output data from the RDP communication between the RDP client 1325 and the RDP server 1330. The setup engine 1305 may also be configured to define the data source 1310 for the RDP communication between the RDP client 1325 and the RDP server 1330. The setup engine 1305 may also be configured to create the communication pathway between the data source 1310, the data sink 1315, the RDP client 1325, and the RDP server 1330 via the connection engine. The setup engine 1305 may also be configured to facilitate communication between the data source 1310, the data sink 1315, the RDP client 1325, and the RDP server 1330 via the communication pathway. Advantageously, as a result of the client-server communication system 1300 of FIG. 13, data from a substantially arbitrary data source 1310 may be used in RDP communications or in remote desktop sessions. Also, data from RDP communications or from remote desktop sessions may be output to a substantially arbitrary data sink 1315. As a result, an operating system 1340 of a remote computing device 1335 configured to be accessed via the RDP protocol, may be accessed with arbitrary input data from the data source 1310 and may provide output data in an arbitrary format to the data sink 1315. Thus, data received at the RDP client 1325 may be output to any source, not necessarily a user interface device of a machine implementing the RDP client 1325. Specifically, in one example, the operating system 1340 of the remote computing device 1335 may not be compatible with an operating system associated with the data source 1310 or the data sink 1315. For example, the operating system 1340 may be associated with a first operating system family (e.g., Microsoft Windows®), while the operating system of a machine associated with the data source 1310 or the data sink may be associated with a second operating system family (e.g., Apple Macintosh OS X Snow Leopard®), where the second operating system family is different from and not compatible with the first operating system family.

In one aspect, a phrase "operating system family," may encompass its plain and ordinary meaning including, but not limited to, a group of operating systems configured to communicate with one another. A first example of an operating system family may include operating systems such as Microsoft Windows XP®, Microsoft Windows Vista®, Microsoft Windows 7®, and Microsoft Windows Server 2008®. A second example of an operating system family, separate and distinct from the first example of an operating system family, may include operating systems such as Apple Macintosh OS X Snow Leopard® (client), and Apple Macintosh OS X Lion Server®.

While the subject technology is described in FIG. 13 in conjunction with an RDP client 1325 and an RDP server 1330 communicating via an RDP connection, the subject technology may be implemented with any client-server communication protocol in place of RDP. In one implementation, any screen scraping or remote desktop type protocol may replace RDP, as described in FIG. 13. For example, the RDP client 1325 and the RDP server 1330, as described in FIG. 13, may be replaced with an independent computing architecture (ICA) client and server, a personal computer over Internet protocol (PCoIP) client and server, a virtual network computing (VNC) client and server, etc. In one example, the RDP protocol as described in FIG. 13 may be replaced with any other remote desktop communication protocol. The other remote desktop communication protocol mayor may not be developed by Microsoft Corporation. The other remote desktop communication protocol may be an open-source protocol or a proprietary protocol. In one example, the RDP protocol as described in FIG. 13 may be replaced with any application layer protocol in the open systems interconnection (OSI) model for remote desktop communication. In one aspect, a remote desktop communication protocol may be a protocol that provides a client computing device (e.g., RDP client 1325) with a graphical interface for accessing data and/or instructions stored within an operating system (e.g., operating system 1340) of a remote computing device (e.g., remote computing device 1335). Using a remote desktop communication protocol, a client computing device may facilitate providing instructions to a remote computing device to run applications (e.g., one or more applications 1345.1-$n$) within the operating system of the remote computing device from the client computing device, as though the user was operating locally on the remote computing device, rather than accessing the remote computing device from the client computing device. In one aspect, a remote desktop communication protocol may be a protocol that allows control and/or manipulation of a desktop of a remote machine.

Furthermore, the blocks of FIG. 13 may exist in one or more physical machines. For example, a single physical machine may include any, some, or all of the setup engine 1305, the data source 1310, the data sink 1315, the connection engine 1320, and the RDP client 1325. Alternatively, each of the setup engine 1305, the data source 1310, the data sink 1315, the connection engine 1320, and the RDP client 1325 may reside on separate machines. In one example, the RDP server 1330 and the remote computing device 1335 may reside on the same physical machine. In another example, the RDP server 1330 and the remote computing device 1335 may reside on separate physical machines.

In FIG. 13, only a single setup engine 1305, only a single data source 1310, only a single data sink 1315, only a single connection engine 1320, only a single RDP client 1325, only a single RDP server 1330, and only a single remote computing device 1335 are illustrated. However, the subject technology may be implemented in conjunction with one or more setup engines 1305, one or more data source 1310, one or more data sink 1315, one or more connection engine 1320, one or more RDP client 1325, one or more RDP server 1330, or one or more remote computing device 1335. If there are multiple setup engines 1305, data sources 1310, data sinks 1315, connection engines 1320, RDP clients 1325, RDP servers 1330, or remote computing devices 1335, the multiple setup engines 1305, data sources 1310, data sinks 1315, connection engines 1320, RDP clients 1325, RDP servers 1330, or remote computing devices 1335 may reside on the same physical machine or on separate physical machines.

Figure 14:
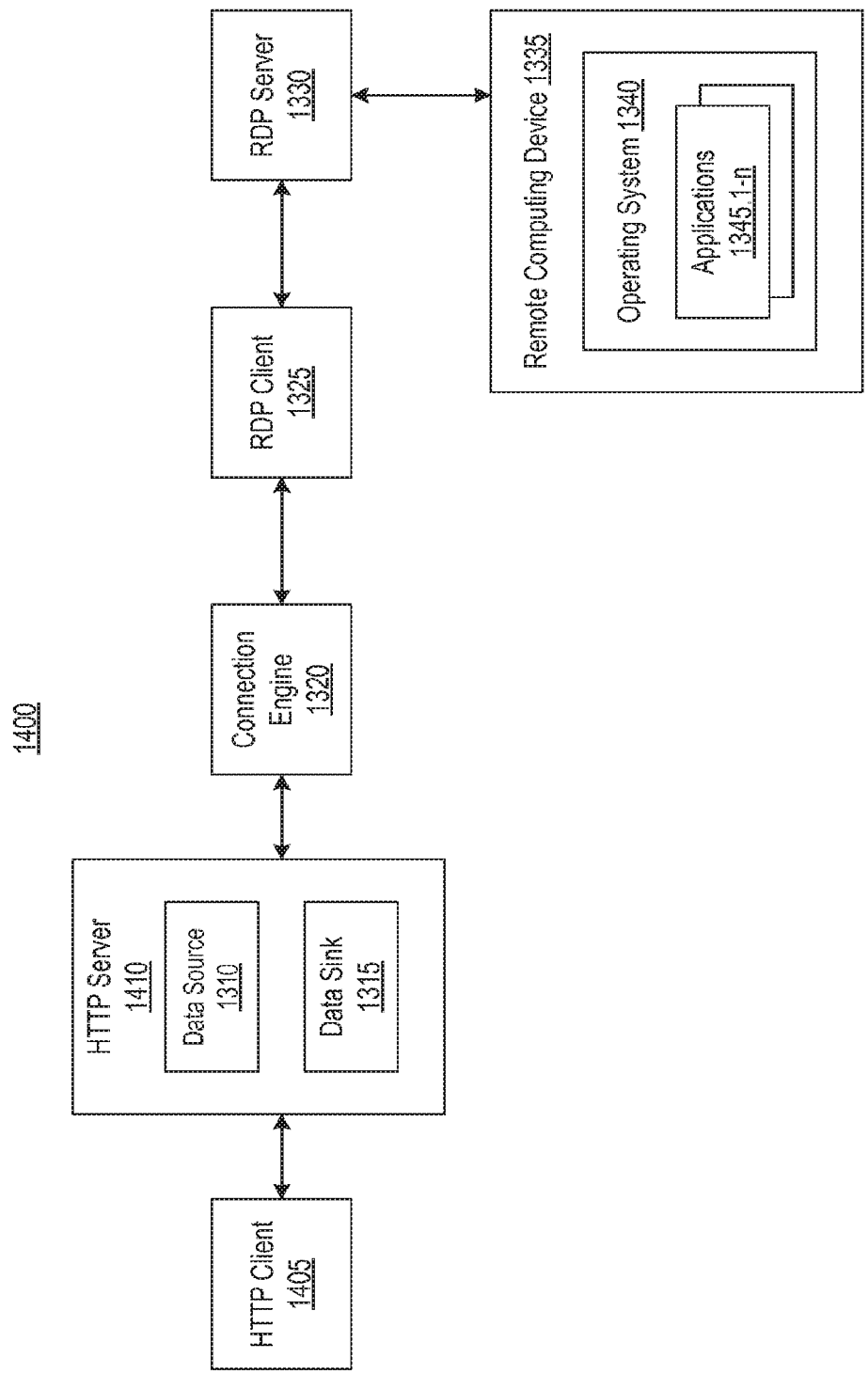
FIG. 14 is a block diagram illustrating an example of a client-server communication system configured to transcode data between remote desktop protocol and hypertext transfer protocol.

Example of a Client-Server Communication System Configured to Transcode Data Between Remote Desktop Protocol and Hypertext Transfer Protocol FIG. 14 is a block diagram illustrating an example of a client-server communication system 1400 configured to transcode data between remote desktop protocol (RDP) and hypertext transfer protocol (HTTP).

As shown, the client-server communication system 1400 includes the data source 1310, data sink 1315, connection engine 1320, RDP client 1325, RDP server 1330, and remote computing device 1335 of FIG. 13. In addition, the client-server communication system 1400 includes a HTTP client 1405 and a HTTP server 1410. The HTTP server 1410 includes the data source 1310 and the data sink 1315. HTTP server 1410 may provision and/or utilize HTTP, HTTPs, WS and/or WSs protocols, or any other suitable protocols.

The HTTP server 1410 may be connected to the CFE of RDP client 1325 via a communication pathway through the connection engine 1320. The HTTP server includes the data source 1310 and the data sink 1315. As a result, the HTTP server 1410 may provide input data to interact with the remote computing device 1335 and receive output data from interacting with the remote computing device 1335. The HTTP server 1410 may also be configured to communicate with the HTTP client 1405 via an HTTP connection.

The HTTP client 1405 may be connected to the HTTP server 1410 via an HTTP connection. As a result, the HTTP client may provide data to the data source 1310 in the HTTP server 1410 and receive data from the data sink 1315 in the HTTP server via a hypertext markup language (HTML) interface.

The connection engine 1320 may be configured to implement the functions described above. In addition, the connection engine 1320 may be configured to transcode data between HTTP and RDP. As a result, the HTTP server 1410 may be able to receive a representation of the data received via the remote desktop session on the RDP client 1325 and provide data to the RDP client 1325 for communication with the RDP server 1320 or the remote computing device 1335. Thus, the HTTP client 1405 may, via the HTTP server 1410, interface with the RDP client 1325, the RDP server 1330, or the remote computing device 1335.

Advantageously, as a result of the client-server communication system 1400 of FIG. 14, a HTTP client 1405 running a substantially arbitrary operating system may interface with an RDP client 1325, an RDP server 1330, and a remote computing device 1335 configured to communicate via RDP. The HTTP client 1405 may run any operating system configured to communicate via HTTP and does not need to run an operating system configured to communicate via RDP or run any RDP-specific software.

In one example, the operating system 1340 of the remote computing device 1335 may not be compatible with an operating system associated with the HTTP client 1405. For example, the operating system 1340 may be associated with a first operating system family (e.g., Microsoft Windows®), while the operating system of the HTTP client 1405 may be associated with a third operating system family (e.g., Linux Ubuntu®), where the third operating system family is different from and not compatible with the first operating system family.

While the subject technology is described in FIG. 14 in conjunction with an RDP client 1325 and an RDP server 1330 communicating in a remote desktop session via an RDP connection, and a HTTP client 1405 and a HTTP server 1410 communicating via a HTTP connection, the subject technology may be implemented with any client-server communication protocols in place of RDP and HTTP. For example, the RDP client 1325 and the RDP server 1330, as described in FIG. 14, may be replaced with an independent computing architecture (ICA) client and server, a personal computer over Internet protocol (PCoIP) client and server, a virtual network computing (VNC) client and server, etc. In one implementation, the HTTP client 1405 and the HTTP server 1410, as described in FIG. 14, may be replaced with a session initiation protocol (SIP) client and server. Other protocols may also replace RDP or HTTP as described in FIG. 14. As a result, a client implementing a first client-server protocol (e.g., HTTP client 1405) may interface with a server implementing a second client-server protocol (e.g., RDP server 1330), where the first client-server protocol may be different from the second client-server protocol. In one example, the RDP protocol as described in FIG. 14 may be replaced with any other remote desktop communication protocol. The other remote desktop communication protocol mayor may not be developed by Microsoft Corporation. The other remote desktop communication protocol may be an open-source protocol or a proprietary protocol. In one example, the RDP protocol as described in FIG. 14 may be replaced with any application layer protocol in the open systems interconnection (OSI) model for remote desktop communication.

Example of an Operation of a Setup Engine

Figure 15A:
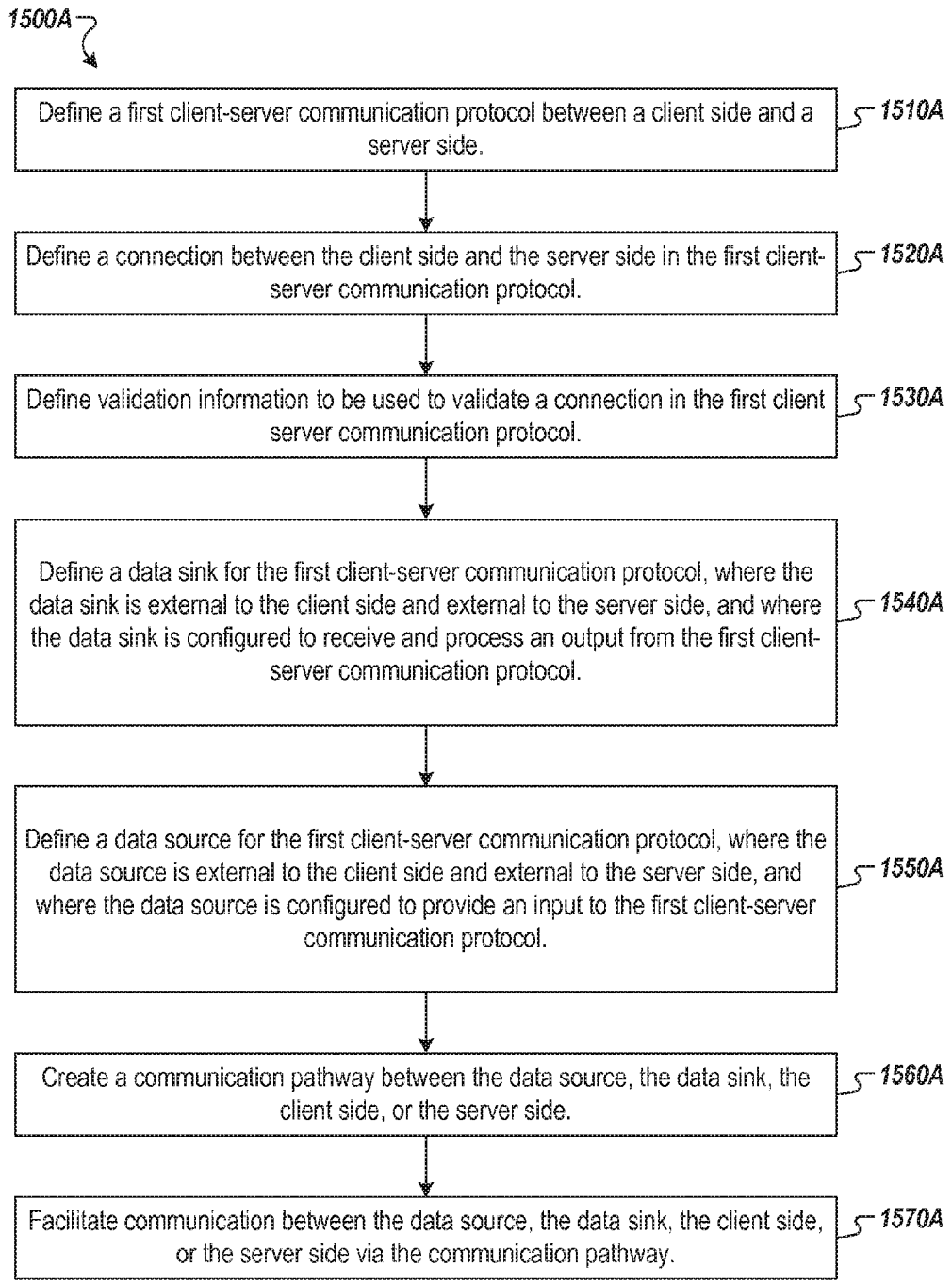
FIG. 15A is a flow chart illustrating an example of an operation of a setup engine.

FIG. 15A is a flow chart illustrating an example of a process 1500A that may be executed by a setup engine (e.g., setup engine 1305).

The process 1500A begins at operation 151OA, where the setup engine may define a first client-server communication protocol (e.g., RDP) between a client side (e.g., RDP client 1325) and a server side (e.g., RDP server 1330). The first client-server communication protocol may be communicatively coupled to an operating system (e.g., operating system 1340 of remote computing device 1335) running at least one application (e.g., applications 1345.1-$n$). The first client-server communication protocol may be an example of an application layer protocol in the open systems interconnection (OSI) model. Defining the communication protocol may include: selecting the specific application layer protocol for use (e.g., RDP).

In operation 1520A, the setup engine may define a connection for the client side (e.g., RDP client 1325), including the connection for the server side (e.g., RDP server 1330) and the connection between the client side and the server side in the first client-server communication protocol. The client side may be connected to a connection engine (e.g., connection engine 1320). For example, a connection may include communicatively coupling a connection engine to a client side. The connection engine may be configured to communicate with the client side via a network or via a direct wired or wireless connection. Defining a connection may, for example, include providing instructions as to how to provide or set up a communicative coupling, creating or facilitating creating the communicative coupling, or initiating the communicative coupling. Defining a connection may also include selecting specific protocols to use for the layers of the OSI model other than the application layer (i.e., protocols for one or more of the physical layer, data link layer, network layer, transport layer, session layer, and presentation layer). Defining a connection for a client side (e.g., including connection for a server side and connection between a client and a server) may include selecting or facilitating selecting a specified client (e.g., RDP client 1325) and/or a specified server (e.g., RDP server 1330) for the connection or communicative coupling. Two or more devices or modules may be communicatively coupled to one another if they are configured to communicate with one another. For example, two devices communicating with one another, e.g., via a network connection or via a direct wired or wireless connection, may be communicatively coupled to one another. Within a single computer system, a first module that receives input from a second module and/or provides output to the second module may be communicatively coupled with the second module.

In operation 1530A, the setup engine may define validation information that can be used to validate the connection to the client side and/or to the service side in the first client-server communication protocol. For example, the setup engine may define authentication information to be used to authenticate the connection to the client side. In one aspect, a phrase "validate a connection" may encompass its plain and ordinary meaning, including, but not limited to verifying that a connection is authorized and that data may be transmitted via the connection. In some implementations, validating a connection may include one or more of: verifying login information associated with the connection, verifying a network address of at least one terminal (e.g., the client side or the server side) of the connection, verifying that a virus scan was executed on at least one terminal of the connection, verifying that at least one terminal of the connection is turned on and connected to the network, etc.

In operation 1540A, the setup engine defines a data sink (e.g., data sink 1315) for the first client server communication protocol. The data sink may be external to the client side and external to the server side (e.g., the data sink may reside on a HTTP server 1410). The data sink may be configured to receive and process an output that is received at the data sink from the client side or the server side within the first client-server communication protocol. The output from the first client-server communication protocol may include output based on at least one application (e.g., applications 1345.1-$n$) running within an operating system (e.g., operating system 1340) of a remote computing device (e.g., remote computing device 1335) coupled to the server side. The data sink may be implemented as a virtual machine or a physical machine.

In operation 1550A, the setup engine defines a data source (e.g., data source 1310) for the first client-server communication protocol. The data source may be external to the client side and external to the server side (e.g., the data source may reside on a HTTP server 1410). The data source may be configured to provide an input to the client side or the server side in the first client-server communication protocol. The input to the client side or the server side in the first client-server communication protocol may include input to a remote computing device (e.g., at least one application running within the operating system of the remote computing device coupled to the server side). The data source may be implemented as a virtual machine or a physical machine. The data source may reside on the same physical device as the data sink or on a different physical device than the data sink.

In one example, both the data source and the data sink may reside within a HTTP server (e.g., HTTP server 1410). The HTTP server may be communicatively coupled to a HTTP client (e.g., HTTP client 1405). The data source may be configured to receive input from the HTTP client and the data sink may be configured to provide output to the HTTP client. In another example, the HTTP server and the HTTP client may be replaced with a server and client in any client-server communication protocol, for example, a session initiation protocol (SIP) server and client.

In operation 1560A, the setup engine facilitates creating a communication pathway between the data source, the data sink, the client side, and/or the server side. The communication pathway may include a connection engine (e.g., connection engine 1320).

In operation 1570A, the setup engine facilitates communication between the data source, the data sink, the client side, and/or the server side via the communication pathway. If the data source and the data sink are associated with a second client-server communication protocol (e.g., HTTP or SIP), facilitating communication via the communication pathway may involve transcoding between a format associated with the first client-server communication protocol (e.g., RDP) and a format associated with the second client-server communication protocol (e.g., HTTP or SIP). For example, the connection engine may transcode between the format associated with the first client-server communication protocol and the format associated with the second client-server communication protocol. After operation 1570A, the process 1500A may be closed.

In some aspects, the setup engine may close the communication pathway and free (e.g., make available for other purposes) resources consumed by the communication pathway upon termination of a communication session between the data source, the data sink, the client side, and/or the server side.

Example of Instructions for Operation of a Setup Engine

Figure 15B:
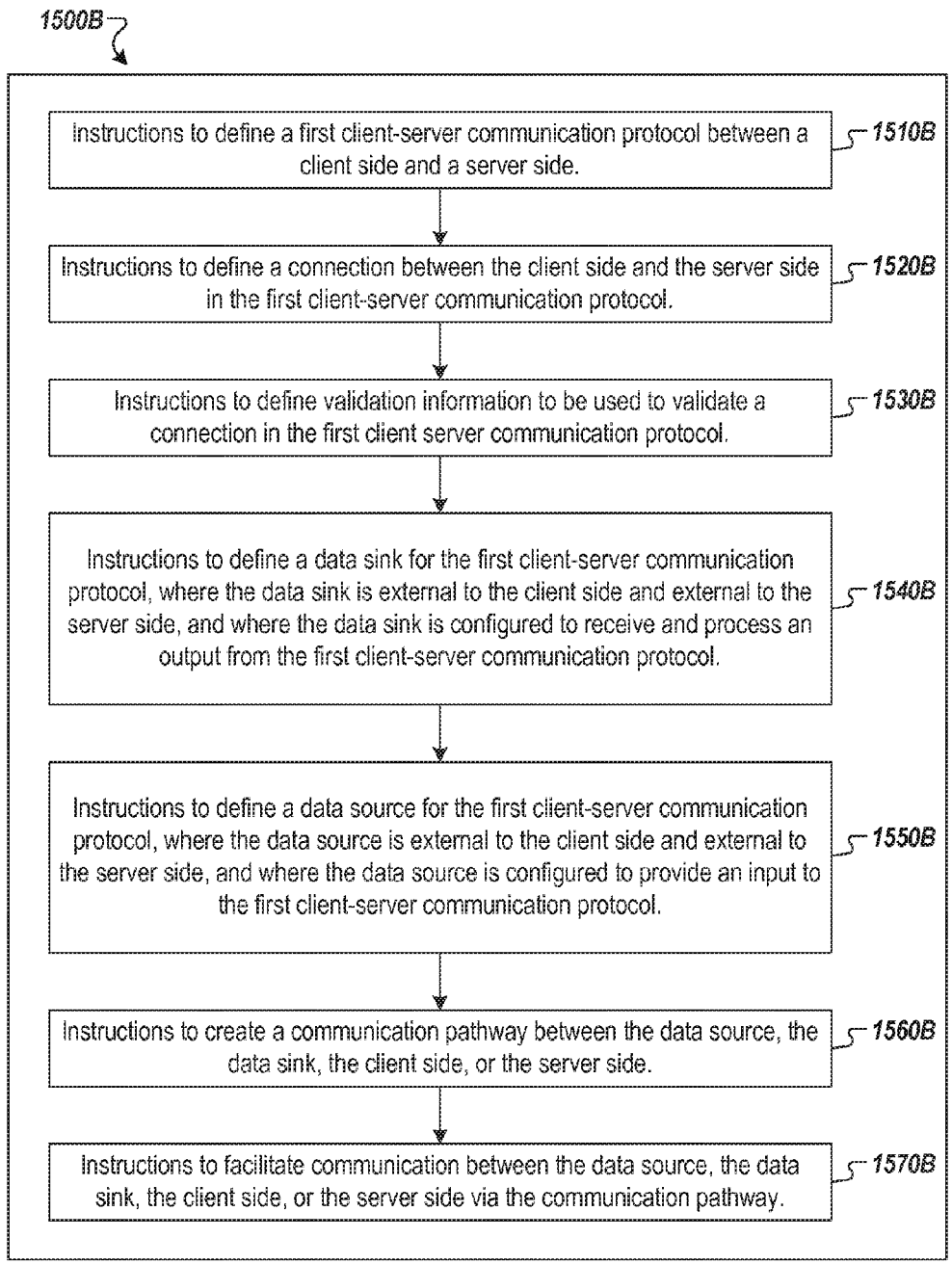
FIG. 15B is an example of a device including instructions for an operation of a setup engine.

FIG. 15B is an example of a device 1500B including instructions for an operation of a setup engine (e.g., setup engine 1305). A device 1500B may include one or more devices. A device 1500B can be, for example, one or more machine-readable medium such as one or more memories. A device 1500B can be, for example, one or more circuits and/or one or more processors.

The device 1500B may include instructions 1510B to define a first client-server communication protocol between a client-side and a server side.

The device 1500B may also include instructions 1520B to define a connection between the client side and the server side in the first client-server communication protocol.

The device 1500B may also include instructions 1530B to define validation information to be used to validate a connection in the first client-server communication protocol.

The device 1500B may also include instructions 1540B to define a data sink for the first client-server communication protocol. The data sink may be external to the client side and external to the server side. The data sink may be configured to receive and process an output from the first client-server communication protocol.

The device 1500B may also include instructions 1550B to define a data source for the first client-server communication protocol. The data source may be external to the client side and external to the server side. The data source may be configured to provide an input to the first client-server communication protocol.

The device 1500B may also include instructions 1560B to create a communication pathway between the data source, the data sink, the client side, and the server side.

The device 1500B may also include instructions 1570B to facilitate communication between the data source, the data sink, the client side, or the server side via the communication pathway.

Example of Modules for Operation of a Setup Engine

Figure 15C:
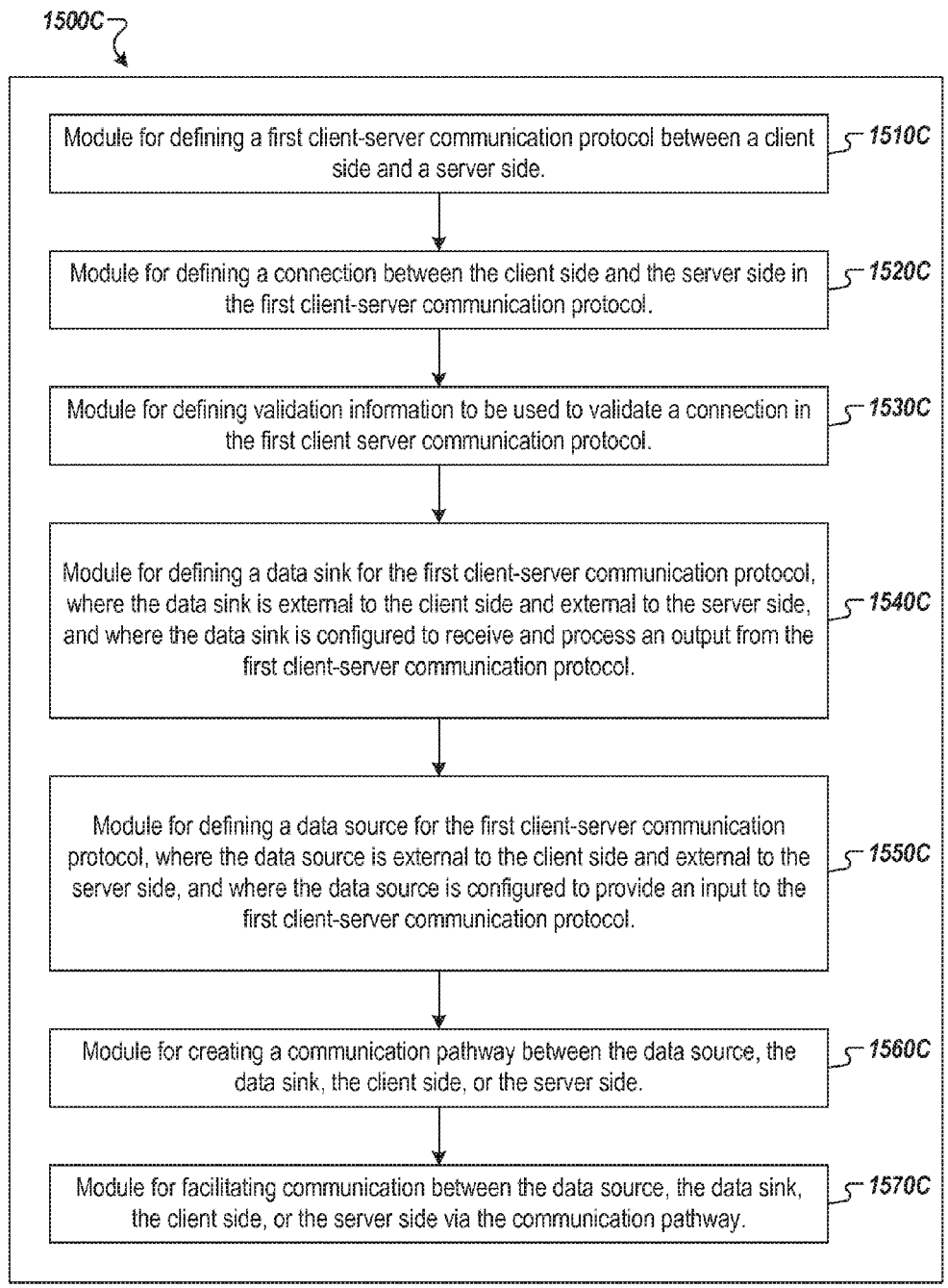
FIG. 15C is an example of a device including one or more modules for an operation of a setup engine.

FIG. 15C is an example of a device 1500C including one or more modules for an operation of a setup engine (e.g., setup engine 1305). A device 1500C may include one or more devices. A device 1500C can be, for example, one or more machine-readable medium such as one or more memories. A device 1500C can be, for example, one or more circuits and/or one or more processors. A module may be a component of a device.

The device 1500C may include a module 1510C for defining a first client-server communication protocol between a client-side and a server side.

The device 1500C may also include a module 1520C for defining a connection between the client side and the server side in the first client-server communication protocol.

The device 1500C may also include a module 1530C for defining validation information to be used to validate a connection in the first client-server communication protocol.

The device 1500C may also include a module 1540C for defining a data sink for the first client-server communication protocol. The data sink may be external to the client side and external to the server side. The data sink may be configured to receive and process an output from the first client-server communication protocol.

The device 1500C may also include a module 1550C for defining a data source for the first client-server communication protocol. The data source may be external to the client side and external to the server side. The data source may be configured to provide an input to the first client-server communication protocol.

The device 1500C may also include a module 1560C for creating a communication pathway between the data source, the data sink, the client side, and the server side.

The device 1500C may also include a module 1570C for facilitating communication between the data source, the data sink, the client side, or the server side via the communication pathway.

Example of an Operation of a Connection Engine

Figure 16A:
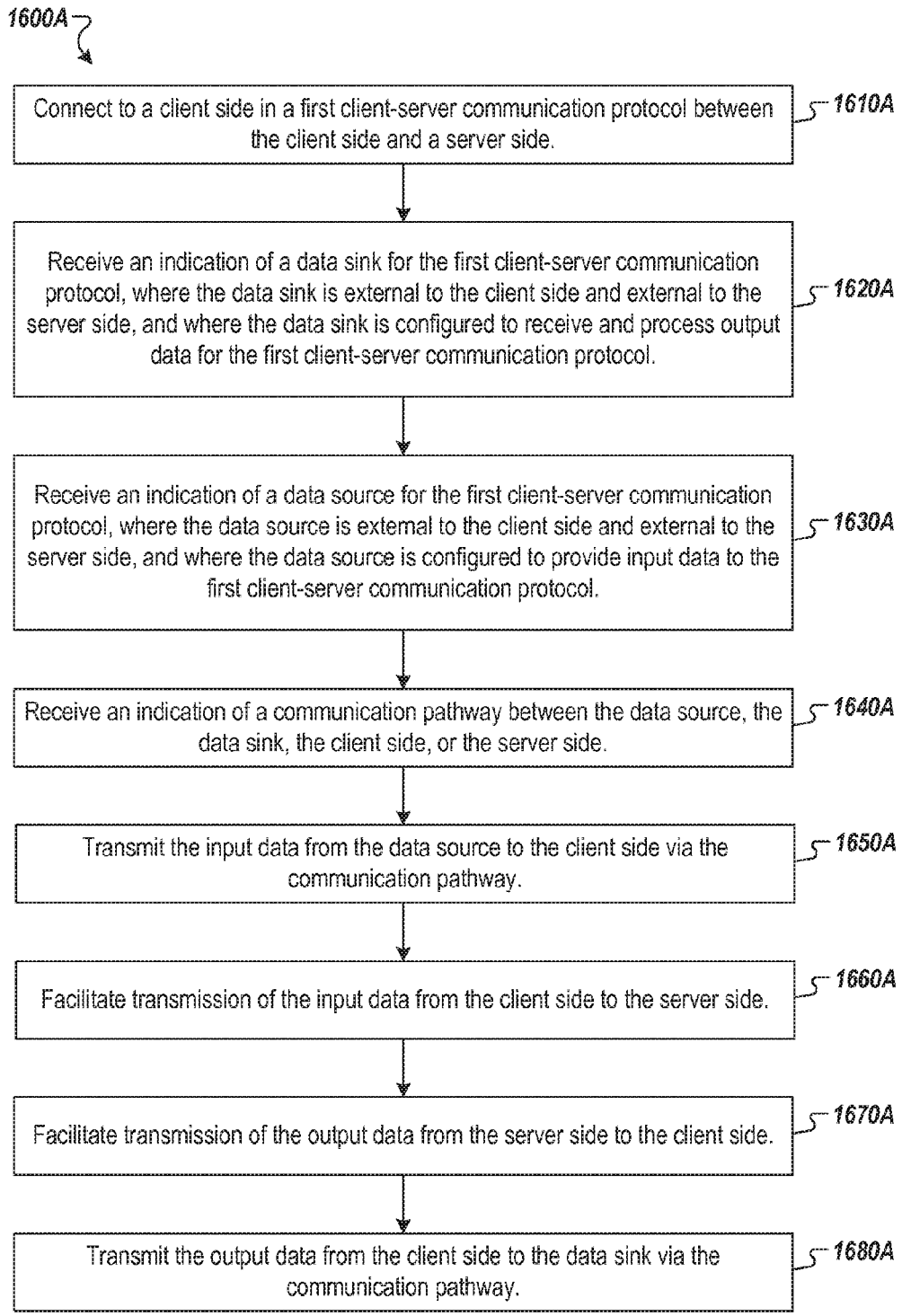
FIG. 16A is a flow chart illustrating an example of an operation of a connection engine.

FIG. 16A is a flow chart illustrating an example of a process 1600A that may be executed by a connection engine (e.g., connection engine 1320).

The process 1600A begins at operation 1610A, where the connection engine connects to a client side (e.g., RDP client 1325) in a first client-server communication protocol (e.g., RDP) between the client side and a server side (e.g., RDP server 1330).

In operation 1620A, the connection engine receives an indication of a data sink (e.g., data sink 1315) for the first client-server communication protocol. The indication of the data sink may include, for example, a network address of the data sink or a link or a pointer to the data sink. The data sink may be external to the client side and external to the server side. The data sink may be configured to receive and process output data for the first client-server communication protocol. The data sink may be communicatively coupled with a video output unit or an audio output unit. The data sink may be implemented as a virtual machine or a physical machine.

In operation 1630A, the connection engine receives an indication of a data source (e.g., data source 1310) for the first client-server communication protocol. The indication of the data source may include, for example, a network address of the data source or a link or a pointer to the data source. The data source may be external to the client side and external to the server side. The data source may be configured to provide input data to the first client-server communication protocol. The data source may be communicatively coupled with one or more of a keyboard, a mouse, a touch screen, a camera, or an audio input unit. The data source may be implemented as a virtual machine or a physical machine. The data source may reside on the same physical device as the data sink or on a different physical device than the data sink.

In one example, the first client-server communication protocol may be communicatively coupled to an operating system (e.g., operating system 1340 of remote computing device 1335) running at least one application (e.g., applications 1345.1-*n*). The input may include an input to the application(s) and the output may include an output from the application(s).

In one example, the data source and the data sink may reside within a hypertext transfer protocol (HTTP) server (e.g., HTTP server 1410). The HTTP server may be communicatively coupled with a HTTP client. The data source may be configured to receive the input from the HTTP client and the data sink may be configured to provide the output to the HTTP client.

In operation 1640A, the connection engine receives an indication of a communication pathway between the data source, the data sink, the client side, and/or the server side.

In one implementation, the data source and the data sink may be associated with any second client-server communication protocol (e.g., HTTP or session initiation protocol [SIP]), and the communication pathway may include a transcoder between a format associated with the first client-server communication protocol (e.g., RDP), and a format associated with the second client-server communication protocol (e.g., HTTP or SIP).

In operation 1650A, the connection engine facilitates transmitting the input data from the data source to the client side via the communication pathway. For example, the connection engine may include code for transmitting the input data from the data source to the client side. The connection engine may cause the data source and/or the client side to execute the code for transmitting the input data from the data source to the client side. The input data may be transmitted from the data source to the client side via the connection engine.

In operation 1660A, the connection engine facilitates transmission of the input data from the client side to the server side. For example, the connection engine may include code for transmitting the input data from the client side to the server side, so that the input data could be provided to the remote computing device. The connection engine may cause the server side and/or the client side to execute the code for transmitting the input data from the client side to the server side.

In operation 1670A, the connection engine facilitates transmission of the output data from the server side to the client side. For example, the connection engine may include code for transmitting the output data from the server side to the client side, so that the output data could be provided to the connection engine. The connection engine may cause the server side and/or the client side to execute the code for transmitting the output data from the server side to the client side.

In operation 1680A, the connection engine facilitates transmitting the output data from the client side to the data sink via the communication pathway. For example, the connection engine may include code for transmitting the output data from the client side to the data sink. The connection engine may cause the client side and/or the data sink to execute the code for transmitting the output data from the client side to the data sink. The output data may be transmitted from the client side to the data sink via the connection engine. After operation 480A, the process 400A may be closed.

Example of Instructions for Operation of a Connection Engine

Figure 16B:
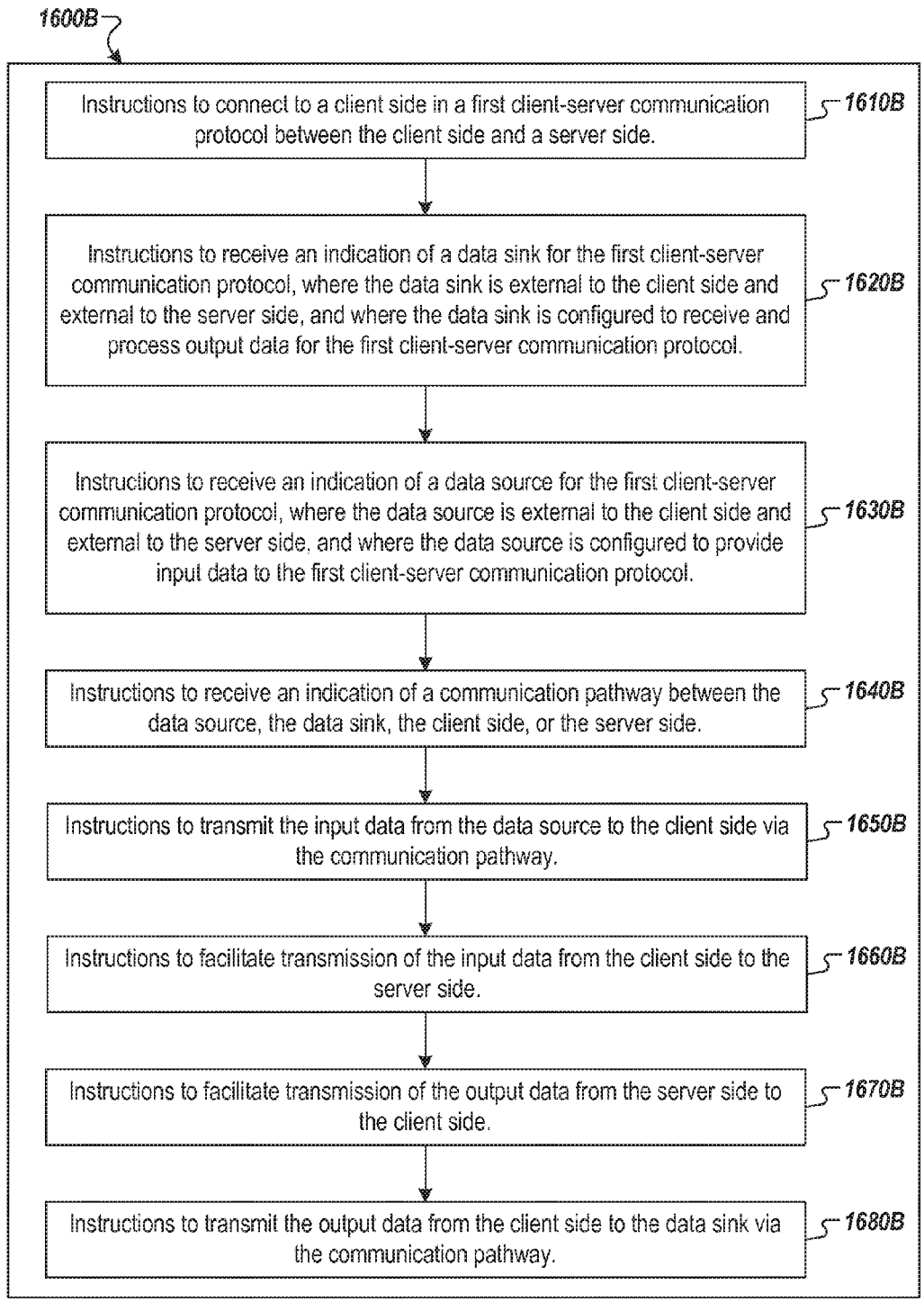
FIG. 16B is an example of a device including instructions for an operation of a connection engine.

FIG. 16B is an example of a device 1600B including instructions for an operation of a connection engine. A device 1600B may include one or more devices. A device 1600B can be, for example, one or more machine-readable medium such as one or more memories. A device 1600B can be, for example, one or more circuits and/or one or more processors.

The device 1600B may include instructions 1610B to connect to a client side in a first client-server communication protocol between the client side and a server side.

The device 1600B may also include instructions 1620B to receive an indication of a data sink for the first client server communication protocol. The data sink may be external to the client side and external to the server side. The data sink may be configured to receive and process output data for the first client-server communication protocol.

The device 1600B may also include instructions 1630B to receive an indication of a data source for the first client-server communication protocol. The data source may be external to the client side and external to the server side. The data source may be configured to provide input data to the first client-serer communication protocol.

The device 1600B may also include instructions 1640B to receive an indication of a communication pathway between the data source, the data sink, the client side, or the server side.

The device 1600B may also include instructions 1650B to transmit the input data from the data source to the client side via the communication pathway.

The device 1600B may also include instructions 1660B to facilitate transmission of the input data from the client side to the server side.

The device 1600B may also include instructions 1670B to facilitate transmission of the output data from the server side to the client side.

The device 1600B may also include instructions 1680B to transmit the output data from the client side to the data sink via the communication pathway.

Example of Modules for Operation of a Connection Engine

Figure 16C:
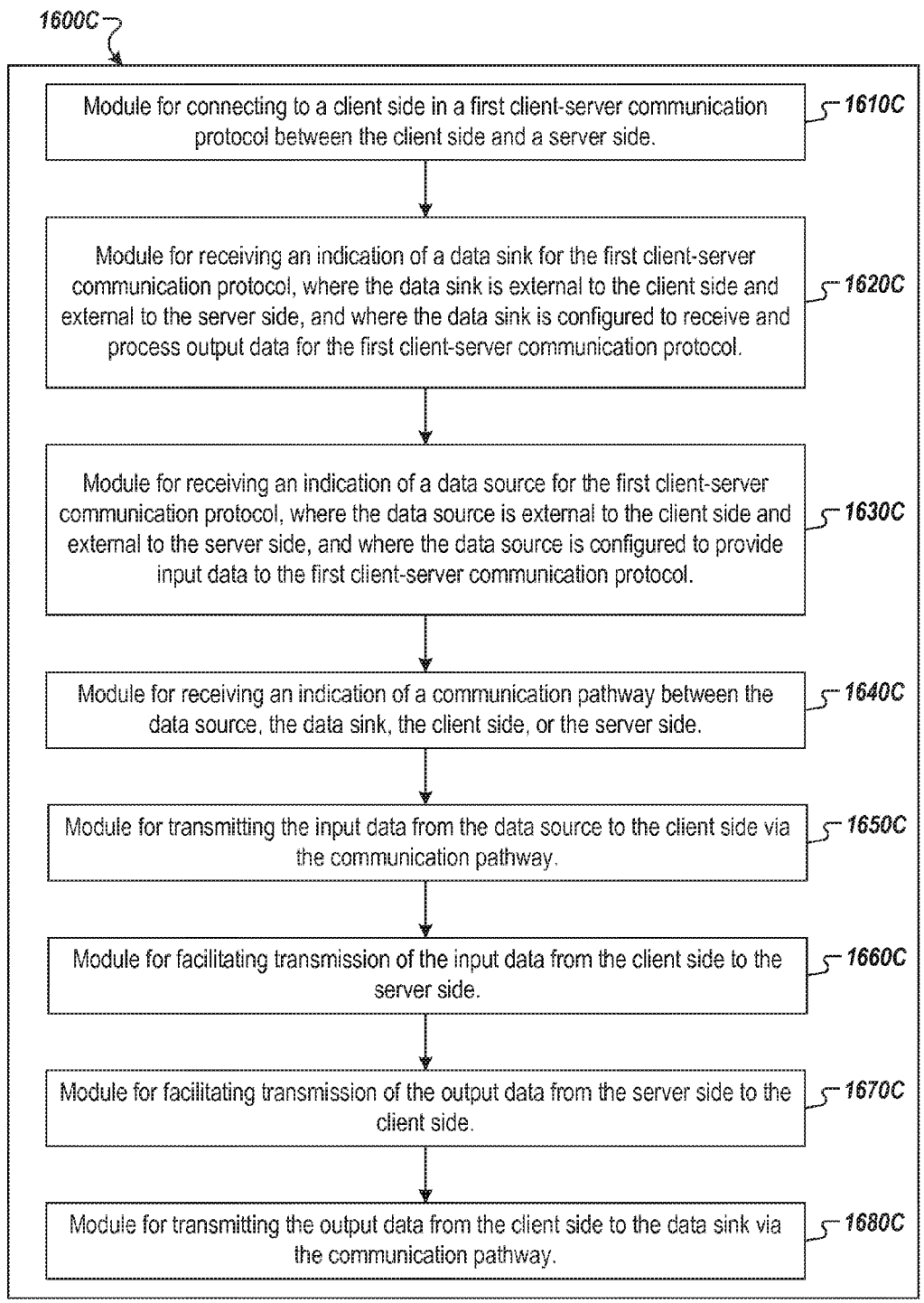
FIG. 16C is an example of a device including one or more modules for an operation of a connection engine.

FIG. 16C is an example of a device 1600C including one or more modules for an operation of a connection engine. A device 1600C may include one or more devices. A device 1600C can be, for example, one or more machine-readable medium such as one or more memories. A device 1600C can be, for example, one or more circuits and/or one or more processors. A module may be a component of a device.

The device 1600C may include a module 1610C for connecting to a client side in a first client-server communication protocol between the client side and a server side.

The device 1600C may also include a module 1620C for receiving an indication of a data sink for the first client server communication protocol. The data sink may be external to the client side and external to the server side. The data sink may be configured to receive and process output data for the first client-server communication protocol.

The device 1600C may also include a module 1630C for receiving an indication of a data source for the first client-server communication protocol. The data source may be external to the client side and external to the server side. The data source may be configured to provide input data to the first client-serer communication protocol.

The device 1600C may also include a module 1640C for receiving an indication of a communication pathway between the data source, the data sink, the client side, or the server side.

The device 1600C may also include a module 1650C for transmitting the input data from the data source to the client side via the communication pathway.

The device 1600C may also include a module 1660C for facilitating transmission of the input data from the client side to the server side.

The device 1600C may also include a module 1670C for facilitating transmission of the output data from the server side to the client side.

The device 1600C may also include a module 1680C for transmitting the output data from the client side to the data sink via the communication pathway.

Example Virtualization System

Figure 17:
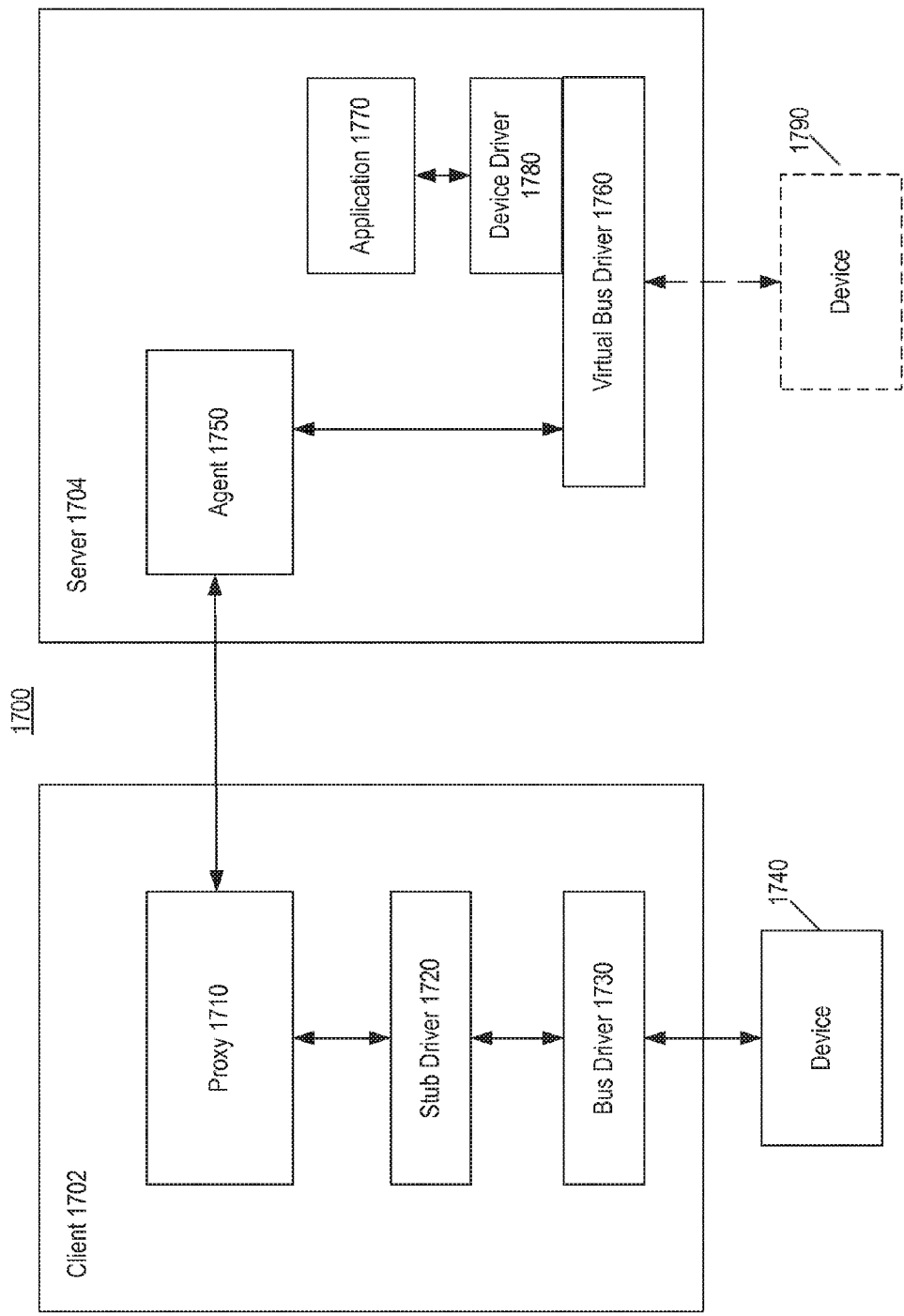
FIG. 17 is a conceptual block diagram of a local device virtualization system, in accordance with various aspects of the subject technology.

FIG. 17 is a block diagram of a local device virtualization system 1700, according to an aspect of the disclosure. The system 1700 may include the client 1702 in communication with the server 1704, for example, over a network (as illustrated in detail in FIG. 6). The client 1702 may include a proxy 1710, a stub driver 1720, and a bus driver 1730. The client 1702 can be connected to a device 1740, as shown in FIG. 17. The server 1704 may include an agent 1750, and a virtual bus driver 1760.

According to the illustrated configuration, while the device 1740 is not locally or physically connected to the server 1704 and is remote to the server 1704, the device 1740 appears to the server 1704 as if it is locally connected to the server 1704, as discussed further below. Thus, the device 1740 appears to the server 1704 as a virtual device 1790. In one implementation, one or more of the data source 1310 or the data sink 1315 of FIG. 13 may be implemented as a virtual device (e.g., virtual device 1790).

By way of illustration and not limitation, the device 1740 may be a machine-readable storage medium (e.g., flash storage device), a printer, a scanner, a camera, a facsimile machine, a phone, an audio device, a video device, a peripheral device, or other suitable device that can be connected to the client 1702. The device 1740 may be an external device (i.e., external to the client 1702) or an internal device (i.e., internal to the client 1702).

In one aspect of the disclosure, the device 1740 is a Universal Serial Bus (USB) device that can be locally connected to the client 1702 using a wired USB or wireless USB connection and communicates with the client 1702 according to a USB communications protocol. In another aspect, the device 1740 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 1740 is a local device of client 1702. Furthermore, in one aspect of the disclosure, a local device of a system or a device locally connected to a system may include a device within the system (e.g., an internal device of client 1702).

A "remote" device, or a device "remote" to a system, may be a device that is not directly connected to the system. For example, the server 1704 is remote to both client 1702 and device 1740 because server 1704 is not directly connected to client 1702 or device 1740 but connected indirectly through network 606 (illustrated in FIG. 6), which can include, for example, another server, or the Internet.

The bus driver 1730 can be configured to allow the operating system and programs of the client 1702 to interact with the device 1740. In one aspect, when the device 1740 is connected to the client 1702 (e.g., plugged into a port of the client 1702), the bus driver 1730 may detect the presence of the device 1740 and read information regarding the device 1740 ("device information") from the device 1740. The device information may include features, characteristics and other information specific to the device. For an example of a USB device, the device information may comprise a device descriptor (e.g., product ID, vender ID and/or other information), a configuration descriptor, an interface descriptor, an endpoint descriptor and/or a string descriptor. The bus driver 1730 may communicate with the device 1740 through a computer bus or other wired or wireless communications interface.

In one aspect, a program (e.g., application) running locally on the client 1702 may access the device 1740. For example, the device 1740 may be accessed locally when the client 1702 is not connected to the server 1704. In this aspect, the operating system (e.g., Microsoft Windows®) of the client 1702 may use the device information to find and load an appropriate device driver (not shown) for the device 1740. The device driver may provide the program with a high-level interface to the device 1740.

In one aspect, the device 1740 may be accessed from the server 1704 as if the device were connected locally to the server 1740. For example, the device 1740 may be accessible from the desktop running on the server 1704 (i.e., virtual desktop environment). In this aspect, the bus driver 1730 may be configured to load the stub driver 1720 as the default driver for the device 1740. The stub driver 1720 may be configured to report the presence of the device 1740 to the proxy 1710 and to provide the device information (e.g., device descriptor) to the proxy 1710.

The proxy 1710 may be configured to report the presence of the device 1740, along with the device information, to the agent 1750 of the server 1704 over the network 606 (illustrated in FIG. 6). Thus, the stub driver 1720 redirects the device 1740 to the server 1704 via the proxy 1710.

The agent 1750 may be configured to receive the report from the proxy 1710 that the device 1740 is connected to the client 1702 and the device information. The agent 1750 can provide notification of the device 1740, along with the device information, to the virtual bus driver 1760. The virtual bus driver 1760 may be configured to report to the operating system of the server 1704 that the device 1740 is connected and to provide the device information to the operating system. This allows the operating system of the server 1704 to recognize the presence of the device 1740 even though the device 1740 is connected to the client 1702. The operating system of the server 1704 may use the device information to find and load an appropriate device driver 1780 for the device 1740 at the server 1704, an example of which is illustrated in FIG. 17. As a result, the device 1740 is enumerated on the server 1704. Once the presence of the device 1740 is reported to the operating system of the server 1704, the device 1740 may be accessible from the desktop running on the server 1704 (i.e., virtual desktop environment). For example, the device 1740 may appear as an icon on the virtual desktop environment and/or may be accessed by applications running on the server 1704.

In one aspect, an application 1770 running on the server 1704 may access the device 1740 by sending a transaction request for the device 1740 to the virtual bus driver 1760 either directly or through the device driver 1780. The virtual bus driver 1760 may direct the transaction request to the agent 1750, which sends the transaction request to the proxy 1710 over the network 106. The proxy 1710 receives the transaction request from the agent 1750, and directs the received transaction request to the stub driver 1720. The stub driver 1720 then directs the transaction request to the device 1740 through the bus driver 1730.

The bus driver 1730 receives the result of the transaction request from the device 1740 and sends the result of the transaction request to the stub driver 1720. The stub driver 1720 directs the result of the transaction request to the proxy 1710, which sends the result of the transaction request to the agent 1750 over the network 106. The agent 1750 directs the result of the transaction request to the virtual bus driver 1760. The virtual bus driver 1760 then directs the result of the transaction request to the application 1770 either directly or through the device driver 1780.

Thus, the virtual bus driver 1760 may receive transaction requests for the device 1740 from the application 1770 and send results of the transaction requests back to the application 1770 (either directly or through the device driver 1780). As such, the application 1770 may interact with the virtual bus driver 1760 in the same way as a bus driver for a device that is connected locally to the server 1704. The virtual bus driver 1760 may hide the fact that it sends transaction requests to the agent 1750 and receives the results of the transaction requests from the agent 1750 instead of a device that is connected locally to the server 1704. As a result, the device 1740 connected to the client 1702 may appear to the application 1770 as if the physical device 1740 is connected locally to the server 1704.

In one implementation, one or more of the data source 1310 or the data sink 1315 of FIG. 13 may be implemented as a virtual device (e.g., virtual device 1790). The remote computing device 1335 may also be implemented as a virtual device. Alternatively, one or more of the data source 1310, the data sink 1315, or the remote computing device 1335 may be implemented as a physical device (e.g., device 1740). In one implementation, the operating system 1340 may be implemented as a virtual operating system running within a virtual device (e.g., virtual device 1790) and not tied to any physical device. The server 1704 may include the RDP server 1330 or the HTTP server 1410. The client 1702 may include the RDP client 1325 or the HTTP client 1405. In one example, the client 1702 may include one or more of items 1305, 1310, 1315, 1320, or 1325.

Generic Client Engine

RDP, ICA, VNC, PCoIP are examples of protocols that provide similar features. However, the subject technology may include the ability to load any component of any of these protocols on demand (e.g., using a setup engine 1305 and a connection engine 1320 that are components of a general client engine), not to define a client using anyone or combination of these. A client computing device that does not implement RDP client code may be configured to communicate with an RDP server using the techniques described herein.

In some implementations, RDP, ICA, PCoIP and similar protocols, may be implemented with a client including, for example, a screen, a keyboard, a mouse and a network interface. The client may be connected to a server providing operating system (OS) extension to the client by use of a protocol trafficking same. Some aspects of the subject technology may include a generic component engine that allows for each layer of operation to be loaded at the appropriate time, for the appropriate protocol. Some implementations of the subject technology may include the following.

(1) A protocol is utilized between a client and a server; for this component, a protocol layer is loaded. (E.g., the communication protocol described in operation 1610A of FIG. 16A and the corresponding disclosure.)

(2) A parser removes from the protocol screen components and sends them to a rendering routine. (The rendering routine may be within the data sink 1315, the communication with the data sink is described in steps 1620A, 1640A, and 1650A-1680A of FIG. 16A and the corresponding disclosure.)

(3) Keyboard, mouse and other user input are transmitted back to service over protocol to server. (The keyboard, mouse, and other user inputs may be within the data source 1310, the communication with the data source is described in steps 1630A, 1640A, and 1650A-1680A of FIG. 16A and the corresponding disclosure.)

(4) Entire client-side protocol is attached to devices and functions (such as screen, audio in, audio out, smart-card reader, etc) through a communication queue. (A communication queue may be a portion of the communication pathway of steps 440A-480A of FIG. 16A and the corresponding disclosure.)

(5) Communication queue enables cascade of protocols where each successive stage uses mating to client-side-queue (CSQ). (A communication queue may be a portion of the communication pathway of steps 440A-480A of FIG. 16A and the corresponding disclosure. Protocols may include protocols within the application layer of the open system interconnection model, for example, RDP.)

(6) Client-Complementary queue (CCQ) is attached to CSQ to terminate i/o; CSQ connects device(s) streams to client-side-codec/protocol. This can be written as follows: [N]DevicesCCQ::CSQclient-side-codec::server. (Devices may include input devices within the data source 1310 or output devices within the data sink 1315. Connecting devices is described in steps 1620A, 1630A, and 1650A-1680A of FIG. 16A and the corresponding disclosure.)

An N devices sourcing/sinking data through RDP client (RDPc) through RDP server (RDPs) RDP client can be written as follows: [N]DevicesCCQ::CSQRDPc::RDPs Use of CCQ/CSQ is implicit. Therefore, the same representation may be re-written as follows: [N]Devices::RDPc::RDPs That is, "N" devices are connected via CCQ/CSQ to RDPc and connected to remote RDPs.

(7) Creation of RDPc (e.g., RDP client 1325) and operating connection to RDPs (e.g., RDP server 1330) is communicated through RDPc creation service (RDPcS). The role of RDPcS is to create RDPc and attach to a specified RDPs using appropriate protocols OP, tunnel, credentials . . . ) as needed, and attach Devices as data source/sink (e.g., data source 1310 and data sink 1315) through RDPc instance. The ability to specify Devices and RDPs for each RDPc provides a dynamic means of creating clients and routing data traffic in its various forms to the proper target/source. (See, e.g., steps 420A, 430A, and 450A-480A of FIG. 16A and the corresponding disclosure.)

Other functions, redirections and features are managed in a similar fashion. Each may be logically for the same function or purpose. In one aspect, implementation, however, is protocol specific and the entire chain of responsibilities is customized for a given protocol.

In some implementations, a unique personality may be loaded for each protocol supported. No generic stack layer loads components and interprets operation differently as dictated or featured by a protocol. Moreover, the ability to utilize a remote desktop protocol as a generic codec (or compound codec) is not current art.

Cost may be higher if more than one personality (protocol) is supported. Code foot print may be larger if multiple client applications need to reside locally. Having the ability to dynamically load components on an "as needed/required" basis simplifies overall design. A client may have only screen, keyboard and USB port (or less). Code may be downloaded to provide the CODEC needed to translate data to screen. Moreover, the ability add device support continues through USB peripheral expansion and code exchange specifying actual Devices being used by the soft client (RDPc). Once the device i/o are attached, data communication to an RDPs may take place. However, one advantage of some implementations is the ability to create multiple clients on a remote host. The Device paths may be abstracted and data exchange for these trafficked through entirely different pathways than conventional pathways. This is a truly "virtual client" architecture.

Some aspects may provide simplified method to receive, interpret and exchange data in a universal protocol exchange environment. Once in place, the operation may utilize other specifications or determine operation features at run-time. This may be specified explicitly by the creation of the RDPc, connection to RDPs, and termination/sourcing of data through Device(s).

The subject technology may include a specification defining a base protocol, or a runtime "sniffer" that pre-reads opening packets to determine target client features. Once determined, a specification is loaded that provides network compatibility with the serving protocol. Another specification defines means to unpack data stream and divide to respective targets (screen, speakers, etc). Specifications define all input and output data handlers. Moreover, specifications dictate origin of specification information (method and location). Another embodiment would have a generic "protocol service" that enables an application to specify the desired protocol, connection, credentials, device termination/sourcing and the like. Moreover, a means to perform an option exchange for the validation or selection of ideal device interfaces and encoding mechanisms, as well as providing for time-stamp information for aging data.

Some implementations of the subject technology may include the following.

(1) Define protocol (or codec such as RDPc). (See, e.g., operation 310A of FIG. 15A and its corresponding disclosure.)

(2) Define connection (RDPs) to connect. (E.g., Define an RDP connection between RDP client 1325 and RDP server 1330; see, e.g., operation 320A of FIG. 15A and its corresponding disclosure.)

(3) Define credentials and other connection/user/machine validation information. (See, e.g., operation 330A of FIG. 15A and its corresponding disclosure.)

(4) Define Devices, their respective encodings and target paths. (a) Define receiver extraction (screen, sound-out, etc). (b) Define sender extraction (keyboard, mouse, touch, camera, sound-in, etc.). (E.g., define a data source 1310 and a data sink 1315, e.g., as in steps 340A-350A of FIG. 15A and its corresponding disclosure; E.g., define or facilitate defining encodings and/or target paths for various devices in the data source 1310 and the data sink 1315 for communication via the communication pathway as shown in steps 360A and 370A of FIG. 15A and its corresponding disclosure.)

(5) Create instance (RDPc) with Device stream data attachments. (E.g., create an instance of a communication session via the communication pathway, where the devices in the data source 1310 and the data sink 1315 are communicatively coupled with the RDP client 1325. In one implementation, the RDP client 1325 may behave as though the data source 1310 and the data sink 1315 are its own input/output devices. E.g., the RDP client 1325 may behave as though the data source 1310 includes its keyboard and mouse and the data sink 1315 includes its screen and audio speakers.)

(6) Use communication pathway. (See, e.g., Operation 370A of FIG. 15A and the corresponding disclosure.)

(7) Close the operation. (E.g., After operation 370A, the operation 300A may be closed.)

Defining the communication protocol may be useful to establish means of extraction and insertion of data streams. Defining receiver/sender extractions may be useful to enable data sourcing and sinking. Closing the operation may be useful to shutdown the specification created client.

A specification defined client, or generic client engine (GCE) may be provided.

Example of Connection Engine

Figure 18:
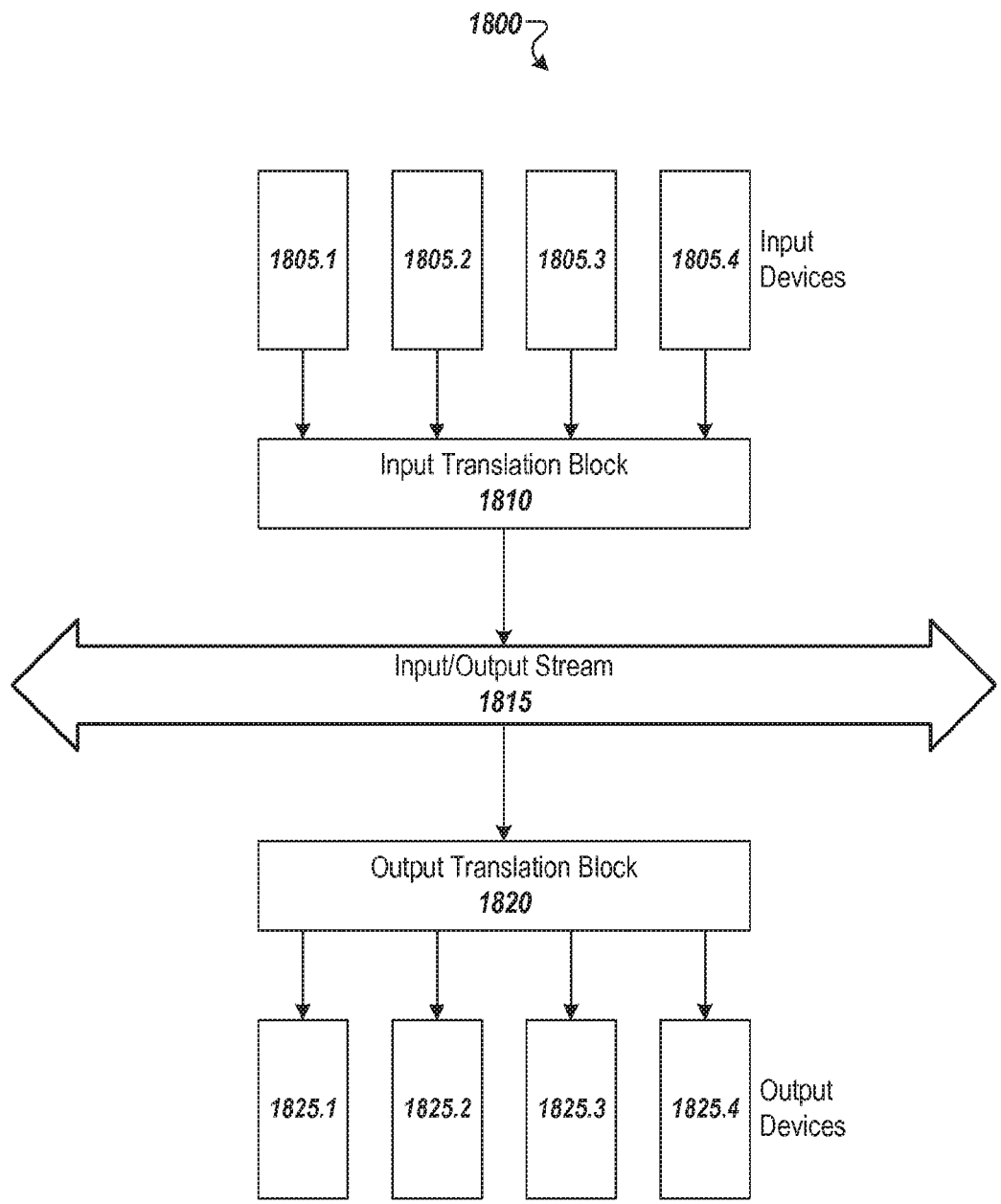
FIG. 18 illustrates an example connection engine.

FIG. 18 illustrates an example connection engine 1800. The connection engine 1800 may correspond to the connection engine 1320 of FIGS. 1 and 2, in some examples.

As shown, the connection engine 1800 may include one or more input devices 1805.1 through 1805.4, an input translation block 1810, an output translation block 1820, and one or more output devices 1825.1 through 1825.4. The connection engine 1800 may receive one or more input streams 1815 and one or more output streams 1815. While four input devices 1805.1 through 1805.4 and four output devices 1825.1 through 1825.4 are illustrated, the subject technology may be implemented with any number of input devices and/or output devices. Specifically, the subject technology may be implemented with one input device, two input devices, or more than two input devices. The subject technology may be implemented with one output device, two output devices, or more than two output devices.

The input devices 1805.1 through 1805.4 may include, for example, one or more of a keyboard, a mouse, a microphone, a camera, a touch screen input, a universal serial bus (USB) port, etc. The input devices 1805.1 through 1805.4 may reside on the connection engine 1800 or may reside remote to the connection engine 1800 and configured to communicate with the connection engine 1800. For example, the input devices 1805.1 through 1805.4 may reside on the data source 1310 of FIG. 13 or on the HTTP client 1405 of FIG. 14. The input devices 1805.1 through 1805.4 may transmit data to the input translation block 1810.

The input translation block 1810 may be configured to receive input data from one or more of the input devices 1805.1 through 1805.4, to translate the received input data to a format associated with the input/output stream 1815, and to convert the received input data to the input/output stream 1815.

The connection engine 1800 may be configured to receive input data from the input/output stream 1815, to process the input data, and to provide output data to the input/output stream 1815. The connection engine 1800 may process the input data, for example, by making calculations with the input data or providing the input data to the RDP client 1325 of FIGS. 1 and 2 for processing. The input/output stream 1815 may also include the output data from the RDP client 1325.

The output translation block 1820 may be configured to receive output data from the input/output stream 1815, to translate the received output data to a format associated with the output devices 1825.1 through 1825.4, and to provide the received output data to one or more of the output devices 1825.

The output devices 1825.1 through 1825.4 may include, for example, a screen or display unit, an audio output unit (e.g., a speaker or a headphone), a memory to which data may be written, etc. The output devices 1825.1 through 1825.4 may reside on the connection engine 1800 or may reside remote to the connection engine 1800 and configured to communicate with the connection engine 1800. For example, the output devices 1825.1 through 1825.4 may reside on the data sink 1315 of FIG. 13 or on the HTTP client 1405 of FIG. 14. The output devices 1825.1 through 1825.4 may receive data from the output translation block 1820.

Generic Client Engine with Load Balancing

In particular embodiments, a remote computing device (e.g., remote computing device 1335 or HTTP client 1405) may be a "thin client." The thin client may include hardware (e.g., display, keyboard, mouse, etc.), and devices that may be capable of operating with a remote desktop extension protocol (e.g., RDP, ICA, VNC, PcoIP, etc.). The thin client may also include a web browser and may, for example, be an HTML (e.g., HTML5) client. In particular embodiments, one or more transcoding services or appliances (which may be implemented in hardware or virtually in software) may interface a thin client's web browser with a remote desktop extension protocol. The transcoding service may, for example, be launched by the GCE (e.g., as part of setup engine 1305 or connection engine 1320). The GCE may include load balancing functionality or services to minimize the load on a given remote host (e.g., by determining which of multiple code instances to execute). The GCE architecture may transcode to HTTP via websockets, HTTP tunnels, or any other suitable HTTP client compatible protocol, and this may be performed independent of any dedicated hardware appliance or web service that intercepts and translates all data to/from a particular remote desktop protocol. The GCE architecture, therefore, may enable peer-to-peer connection and transcoding, allowing for a reduction in HTTP service overhead.

In particular embodiments, the GCE architecture includes or interacts with multiple components, to be described below. HTML syntax that is provided by a web service to an HTML client in the form of HTML or JavaScript and which may be modified (if appropriate) by the GCE. An HTML compatible stream may function as an interface to and from the HTML client using standard HTML or JavaScript compatible language for reconstructing or unpacking remote client tasks to and from the remote desktop protocol. A remote desktop socket directed client may be included to transcode data to and from the HTML or remote desktop protocol with the client-interface connection being defined by a socket (defined by a launching function). In particular embodiments, the same client socket may be used for all client connections using an elevated socket type (e.g., WS or WSS). The launching function service allows a client to connect to a remote desktop socket directed client after load balancing considerations have been analyzed.

The GCE may provide a service outlined by the steps below, resulting in an HTML-transcoded, multi-session, remote desktop:

(1) The GCE may create an HTML script with connection information (defined, e.g., as a result of connection loads and policies).

(2) The HTML client may load and execute the HTML script. This may help ensure that the best host is chosen for transcoding purposes (3) A connection page may be loaded on the HTML client. This may describe how the connection is to take place.

(4) The user may specify connection information including, for example, credentials. This may be required (e.g., if not hard-coded in the script) to define connection information.

(5) The GCE awaits a connection from the HTTP compatible client. This may be required to receive connection arguments and provide connection services.

(6) The HTML client connection is assigned a unique socket by the GCE. This may be required to create a reference that may completely define the connection information.

(7) The GCE launches a transcoding remote desktop client with the socket specification. This may begin the transcoding operation.

(8) The HTML client terminates the connection. This may end the transcoding operation (9) The GCE updates its load balancing information. This step may include the tallying (or accounting for) the connections, and feeding this information back to choose the best host for transcoding purposes (e.g., in step (2)).

In this manner, a single instance of code allows for all Graphical Device Interface (GDI) and virtual channels to be transcoded using an HTML-compatible protocol. The transcoded client is launched with a socket defined by GCE (after analyzing load conditions on different remote hosts). The HTML client receives (via standard HTML-method-compatible code, such as JavaScript) datastreams to use for interpreting transcoded data. The HTML client may extract all input streams and apply this to localized functions and devices. The HTML client may encode all output streams as specified in the script (JavaScript) and applies it to remote functions and devices. As described above, GCE may provide a service to obtain user credentials and host connection information prior to establishing a connection. GCE enables the capture of such information from a client-specified protocol to determine how a connection is to be established and may launch a unique instance to operate under those conditions. GCE may be used as a standalone service (e.g., to convert standard HTML client to the protocol of choice, including RDP, ICA, VNC, etc. and enable fully integrated device I/O). GCE may also be used to enhance web-based transcoding services.

Generic Transcoding Service

A client (e.g., an HTML client) may, in particular embodiments, be capable of HTML communication but not include functionality for a remote desktop protocol (RDP). A generic transcoding service may be provided that allows the client (e.g., an HTML5 client) to connect to an RDP server. The generic transcoding service may allow all functions of the client (or an application of the client) to be translated by 'capping' the client's operation via a specified protocol. The generic transcoding service may, for example, attach to a client (e.g., RDP client 1325) and import and export GDI, virtual channels, and I/O devices (e.g., mouse or keyboard) to the client. The generic transcoding service may function to fully provision typical operating system function calls and may serialize these function calls for use by the remote client. This may allow for end-to-end communication (including a feature-rich experience) even between incompatible protocols at the client and the server. In particular embodiments, the generic transcoding service may be used in a standalone manner. In yet other embodiments, the generic transcoding service may be used in conjunction with the generic client engine (GCE) described above (either with or without load balancing). This may, for example, provide a service that allows for any number of transcoding client instances. The GCE, as described above, may obtain user credentials and host connection information prior to launching an instance of the generic transcoding client service.

In particular embodiments, the generic transcoding service may define functional primitives for desktop and data or device I/O import and export, allowing for application extension for the client. The generic transcoding service may, for example, be a part of the client with a pre-defined export protocol. The generic transcoding service may operate with or include one or more of the following elements. HTML syntax may be provided by a web service to an HTML client in the form of HTML or JavaScript. The syntax may describe all features of the extension protocol necessary. The syntax may also include instructions on utilizing other protocols compatible with HTML5 (including, e.g., H.264, video, audio, or other codec transport definitions). The generic transcoding service may also include an HTML-compatible stream service. The stream service provides an interface to and from the client and may use standard HTML or JavaScript compatible code for reconstructing or unpacking remote client tasks to and from the remote desktop protocol. The generic transcoding service may also include a remote desktop client function, which may interpret, process, and transcode operations using the HTML-compatible stream service (e.g., rather than having device termination and sourcing on the client hardware).

In particular embodiments, the generic transcoding service performed for the HTML client may include one or more of the following steps, resulting in an HTML-transcoded multi-session remote desktop:

(1) The HTML client may load and execute the HTML script, which describes how the connection exchange is to take place.

(2) The user may specify connection information including, for example, credentials. The user may define connection information that may not be hard-coded in the script.

(3) An HTML client connection is made through the import/export protocol service on the transcoding remote desktop client with a particular port. This begins the transcoding operation.

(4) The HTML client terminates the connection, ending the transcoding operation.

In particular embodiments, the generic transcoding service is used in conjunction with HTML5, such that is may translate device I/O and functions to and from HTML5. It may re-encode and translate HTML5-based renderings for client devices and functions. Client functions may include, for example, display, keyboard, mouse, speaker, microphone, etc. The client functions may be terminates in a specialized exporting HTML protocol service that may be part of the RDP client (as a transcoding instance). This may permit an HTML5 client to connect to an RDP server using a newly defined HTML5 protocol. The generic transcoding service, therefore, may be attached to the client's device functions. The HTML5 client may interface with the generic transcoding service directly using websockets or HTML operations. The generic transcoding service may split the RDP client into protocol and device pieces.

In particular embodiments, the generic transcoding service may be used by HTTP clients by use of websockets or HTTP connections. The generic transcoding service may be used with any suitable client, including, for example, embedded headless devices (requiring I/O but having only access to data communications devices) or entire services providing access to a transcoding instance in the IP cloud. In particular embodiments, appending the generic transcoding service to an RDP protocol may result in a transcoding instance whereby the protocol (RDP, ICA, or VNC) is again encoded via a compatible client protocol directly. Device I/O at the client may make use of this specified protocol to translate operation of devices at the client. Applications such as desktop sharing or video streaming may, n particular embodiments, utilize the generic transcoding service to transparently export to alternate hosts for utilization. The generic transcoding service may also be used in conjunction with compression or decompression methods such as zlib compression or decompression.

In particular embodiments, the generic transcoding service may be attached to an RDP client within a browser. For example, a full-featured RDP instance may be created within a CHROME browser using the features of the Native Client environment of CHROME.

Web-Based Transcoding to Clients as a Service

In particular embodiments, a service may provide HTML clients the ability to send and receive information to and from RDP servers via transcoding protocol functions within an internet-based services infrastructure (e.g., Microsoft's Internet Information Services). This may be done in, in one embodiment, in the following manner.

First, a browser of the HTML client (e.g., client 1405) may connect to IIS. The browser may, for example, be the CHROME browser provided by GOOGLE. The client first connects to the IIS server (e.g., http://rdpservice.dell.com). The client may then read the index.html containing a script (e.g., JavaScript) at the IIS server. The client may provide connection information via a dialog box (e.g., specifying a remote RDP server). The client may then connect (e.g., by selecting a "connect" button) via the HTML client browser making a connection to a generic client engine (e.g., part of connection engine 1320 or setup engine 1305). The client may open a connection to the GCE with arguments indicating connection information, and the client may use any browser-compatible protocol including, for example, http, https, WS, WSS, or webrtc.

Once the connection between the client and the GCE is made, the GCE may create a new process environment and launch an RDP Client (which may, for example, include the generic transcoding service attachment described above), with the arguments specified by the user, and with the same socket identifier as the current connection. As one example, the command line entry may be "rdpclient <ARGS> --icecap SOCKET --localoff" This may produce a unique RDP Client instance with a connection through the specified socket.

Next, the RDP client may make a connection as specified in the arguments to the remote RDP Server (e.g., RDP server 1330). The HTML client browser may then be used to communicate with the RDP server by use of the defined pathway. An equation to describe this architecture in the context of Microsoft Windows is the following:

HTMLc::HTMLsGTS:RDPc::RDPs::Desktop::WindowsOS:application, where HTMLc is an HTML client, GTS stands for generic transcoding service (Described earlier). Using this framework, any client utilizing an HTML browser may connect to an application using standard MS Windows convention. If it is desired to execute an application in a different operating system (e.g., Linux), a different protocol (e.g., VNC) may be used, described by the following equation:

HTMLc::HTMLsGTS:VNCc::VNCs:Desktop:LinuxOS: application.

In this manner, a desktop running on Linux may be exported via VNC to an HTML browser.

Runtime API Framework

In particular embodiments, a runtime API framework may be provided for remote importing and exporting of all data to or from an application. The API framework may be defined for each operating system where an application may be used. All remote clients may have the same user experience wherever an application is executing using this runtime API framework. The API framework may function without use of a remote desktop extension protocol (e.g., RDP, ICA, VNC, etc.). The functions of devices may be serialized and exported or imported via the framework. For example, windowing and GDI may be exported via a defined transcoding protocol. In this manner, the API framework may, in particular embodiments, replace (or remove the need for) certain remote desktop exporting protocols while providing all related features in a generic, multi-platform manner.

The API framework may perform multiple functions. As an example, the API framework may include load balancing. The API framework may also include an authentication service that authenticates a user's credentials (based, e.g., on presence, time, and other factors) to provide permission to access an application. The authentication service may also include provisioning and may include services such as OAUTH2. The API framework may also include a licensing service, which provides a license for a given duration or for a given purpose (based, e.g., on credentials or other data, such as payment information). The API framework may also include an import/export service, which provides an API for attaching all import/export data stream types to/from the remote client and application. This import/export service may include GDI (for windowing) and remote channels such as virtual channels (for custom data transports).

Applications may be ported or created to run atop the API framework, which itself may run on top of a given operating system. Libraries of the API framework may enable an application to be built and run on a given operating system, with all I/O in its various forms imported and exported to a remote client. If the framework is used with the GCE (described above), the framework may allow for concurrent, multi-session, multi-instance operation of the same application for different users. The framework may, however, function without use of the GCE.

The framework may, therefore, provide a means for operating-system-agnostic operations that provide authentication, licensing, exporting of GDI, importing/exporting of video and audio, and general virtual channel data to an application running on any operating system. This may, therefore, prevent the need for a complex or time-consuming port of an operating-system-specific code base.

In particular embodiments, the API framework may operate in conjunction with the generic transcoding service (described earlier) to render the conventions of an operating system irrelevant for use of an application. The following equation expresses the operation:

HTMLc::HTMLsGTS:APIFrameWork:OS:application

Figure 20:
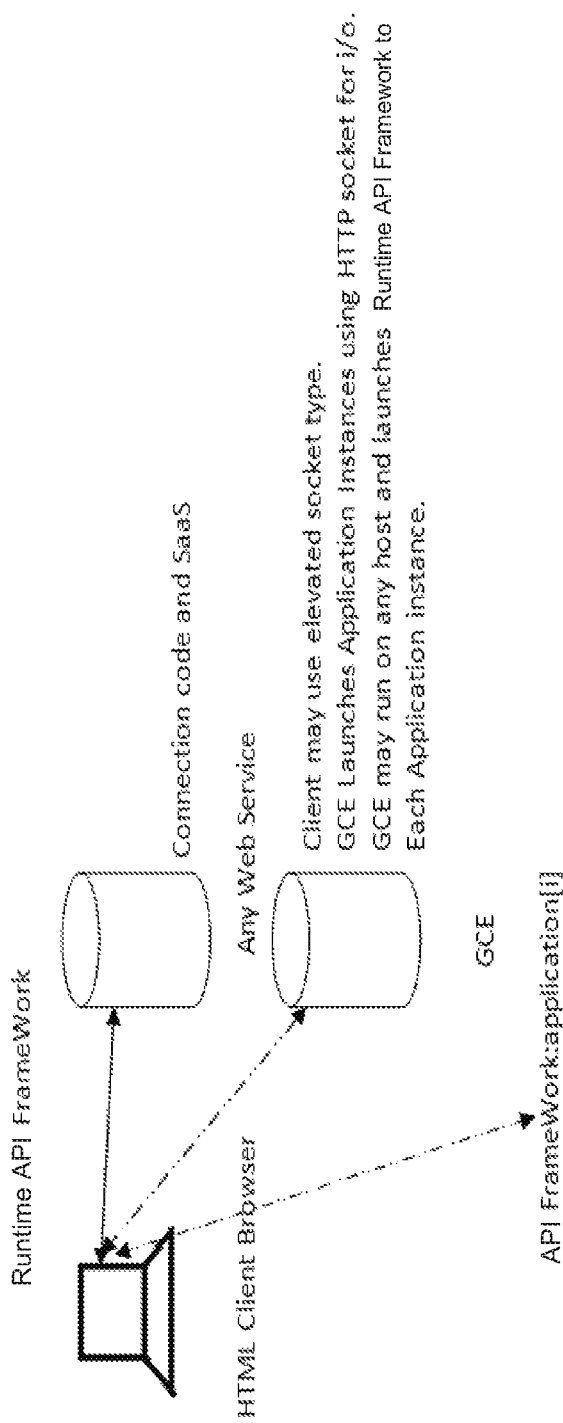
FIG. 20 illustrates a Runtime API framework.

This equation embodies an alternative to a special desktop exporting protocol. The framework exports the entire desktop, and all logical device functions are a function of the framework. The API framework need not be contained with an operating system where the application of interest is executed. Rather, the framework may function atop an existing operating system and, for example, validate user credentials and licenses where applicable. The API framework in combination with the generic transcoding service may be located on the same host or on any host having authorization authority. Any HTTP browser may, therefore, connect to or open any application on any host after a server validates credentials, license, and payment information by using the API framework. FIG. 20 illustrates an example of the API framework operating in conjunction with the GCE. In this example, any HTTP web browser may open any application on any host after the server validates credentials, licensing, and payment information.

In particular embodiments, the API framework in combination with the generic transcoding service may use a functional API to intercept system calls for I/O and related functions. A functional API may be, for example, IPC, socket, function interface, etc. The functional API may receive data related to a standard localized function and export this data. The process of converting data designed for a local function and exporting for use or operation on a different device is referred to as "serialization". Device-related functions may be serialized through a communication method. Such a method may "serialize" arguments and function descriptions. For instance, Graphical Device Interface (GDI) may require the x,y coordinate and data representing pixel information for proper operation. Moreover, additional information may define bit depth (number of bits used to describe a pixel). Such an example function would be called as follows:

code1: write_Gdi(x1, y1, x2, y2, bits, Pixel_data);

This may be serialized by encoding through a communications pathway the same information as follows:

code2: send(DESTINATION, "write_gdi", x1, y1, x2, y2, bits, Pixel_data);

code2 may be the same information encoded using a transport. The name of the function may also be encoded as literal text. The function may now be exported to a remote host, where the operation may take place as follows:

code3: packet=receive(SOURCE);

The entire operation may now be placed into a packet string on the receiving host. This may be further parsed for data as follows:

code4: operation=GET_OPERATION(packet); //this will retrieve the operation to perform (write_gdi)

Once the operation is received, arguments related to this operation may be satisfied:

```
code5: if(operation == "write_gdi") {
    x1-coord = GET_ARGUMENT(packet);
    y1-coord = GET_ARGUMENT(packet);
    ...
}
```

Finally, the operation may be executed on the DESTINATION HOST:

code6: write_Gdi(x1, y1, x2, y2, bits, Pixel_data);

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow.

In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., the service incompatible client 210, the proxy machine 220, the firewall 120, the binding interface 130, the network-based procedure call interface 140, the gateway interface 150, the remote server computing device 160, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a sub-routine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc., or a portion or a combination of any of the foregoing). Those skilled in the art will recognize how to implement the instructions, circuits, and processing systems.

A reference to an element in the singular is not intended to mean "one and only one" unless specifically so stated, but rather "one or more." For example, a message may refer to one or more messages.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., receiving, determining, providing, generating, converting, displaying, notifying, accepting, selecting, controlling, transmitting, reporting, sending, authenticating, verifying, binding, creating, or any other action or function), it is understood that such actions or functions may be performed by the item directly. In another example, when an item is described as performing an action, the item may be understood to perform the action indirectly, for example, by facilitating (e.g., enabling, causing or performing a portion of) such an action. For example, generating can refer to facilitating generation. In one aspect, performing an action may refer to performing a portion of the action (e.g., performing a beginning part of the action, performing an end part of the action, or performing a middle portion of the action).

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. Infs addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

The invention claimed is:

1. A method comprising:
   loading and executing a script with a client specification for creation of a tunnel;
   receiving connection information for the tunnel, wherein the connection information comprises one or more credentials for the tunnel;
   initiating a communication between the client and a proxy machine;
   creating the tunnel between the proxy machine and a host;
   creating an encrypted channel, by the proxy machine, within the tunnel;
   providing to the client, by the proxy machine, remote access to the host through a firewall via a protocol of the tunnel;
   transmitting, by the proxy machine, encoded client data via the tunnel to the client, wherein the client comprises an import/export framework, and wherein the client data is encoded by a generic transcoding service, wherein the generic transcoding service imports and exports a graphical device interface, a virtual channel, and an input/output device;
   performing load balancing based at least in part on the client data, wherein the load balancing comprises tallying one or more connections;
   authorizing the client's access of a remote service;
   attaching the client to the remote service by an export data stream via the import/export framework; and
   exporting, by the export data stream, the encoded client data to the remote service via the tunnel.

2. The method of claim 1, wherein the import/export framework comprises a graphical device interface (GDI) and a virtual channel.

3. The method of claim 1, wherein the proxy machine resides within a router.

4. The method of claim 1, wherein authorizing the client's access of the remote service is performed by the proxy machine by verifying one or more client credentials, and wherein the one or more client credentials comprise at least one of a username, a password, a domain name and a host name.

5. The method of claim 1, further comprising: authenticating, by the proxy machine, the remote service, wherein authentication comprises verifying one or more service credentials, and wherein the one or more service credentials comprise at least one of a valid username of a user of the remote service, a valid password associated with the valid username, a domain name and a host name.

6. The method of claim 1, further comprising: translating, by the proxy machine, one or more encoded messages from the remote service to the client.

7. The method of claim 6, wherein the proxy machine translates the one or more messages into a universal format.

8. The method of claim 1, wherein the generic transcoding service comprises at least one of hypertext markup language (HTML) syntax, an HTML-compatible stream service, and a 20 remote desktop client function.

9. One or more computer-readable non-transitory storage media embodying software that is operable when executed to:
   load and execute a script with a client specification for creation of a tunnel;
   receive connection information for the tunnel, wherein the connection information comprises one or more credentials for the tunnel;
   initiate a communication between the client and a proxy machine;
   create the tunnel between the proxy machine and a host;
   create an encrypted channel, by the proxy machine, within the tunnel;
   provide to the client, by the proxy machine, remote access to the host through a firewall via a protocol of the tunnel;
   transmit, by the proxy machine, encoded client data via the tunnel to the client, wherein the client comprises an import/export framework, wherein the client data is encoded by a generic transcoding service, wherein the generic transcoding service imports and exports a graphical device interface, a virtual channel, and an input/output device;
   perform load balancing based at least in part on the client data, wherein the load balancing comprises tallying one or more connections;
   authorize the client's access of a remote service;
   attach the client to the remote service by an export data stream via the import/export framework; and
   export, by the export data stream, the encoded client data to the remote service via the tunnel.

10. The media of claim 9, wherein the import/export framework comprises a graphical device interface (GDI) and a virtual channel.

11. The media of claim 9, wherein the proxy machine resides within a router.

12. The method of claim 9, wherein the authorization of the client's access of the remote service is performed by the proxy machine by verifying one or more client credentials, and wherein the one or more client credentials comprise at least one of a username, a password, a domain 30 name and a host name.

13. The media of claim 9, wherein the software is further operable when executed to: authenticate, by the proxy machine, the remote service, wherein authentication comprises verifying one or more service credentials, and wherein the one or more service credentials comprise at least one of a valid username of a user of the remote service, a valid password associated with the valid username, a domain name and a host name.

14. The media of claim 9, wherein the software is further operable when executed to: translate, by the proxy machine, one or more encoded messages from the remote service to the client.

15. The media of claim 9, wherein the proxy machine translates the one or more messages into a universal format.

16. The media of claim 9, wherein the generic transcoding service comprises at least one of a hypertext markup language (HTML) syntax, an HTML-compatible stream service, and a remote desktop client function.

17. A system comprising: a computing device comprising one or more processors and an import/export framework; and a memory coupled to the processors comprising instructions executable by the processors, the processors operable when executing the instructions to:
load and execute a script with a client specification for creation of a tunnel;
receive connection information for the tunnel, wherein the connection information comprises one or more credentials for the tunnel;
initiate a communication between the client and a proxy machine;
create the tunnel between the proxy machine and a host;
create an encrypted channel, by the proxy machine, within the tunnel;
provide to the client, by the proxy machine, remote access to the host through a firewall via a protocol of the tunnel;
transmit, by the proxy machine, encoded client data via the tunnel to the client, wherein the client comprises an import/export framework, and wherein the client data is encoded by a generic transcoding service, wherein the generic transcoding service imports and exports a graphical device interface, a virtual channel, and an input/output device;
perform load balancing based at least in part on the client data, wherein the load balancing comprises tallying one or more connections;
authorize the client's access of a remote service;
attach the client to the remote service by an export data stream via the import/export framework; and
export, by the export data stream, the encoded client data to the remote service via the tunnel.

18. The system of claim 17, wherein the processors are further operable when executing he instructions to: authenticate, by the proxy machine, the remote service, wherein authentication comprises verifying one or more service credentials, and wherein the one or more service credentials comprise at least one of a valid username of a user of the remote service, a valid password associated with the valid username, a domain name and a host name; and translate, by the proxy machine, one or more encoded messages from the remote service to the client.

* * * * *